US006205989B1

(12) United States Patent

Aoki

(10) Patent No.: US 6,205,989 B1
(45) Date of Patent: Mar. 27, 2001

(54) CONTROL DEVICE FOR AIR-FUEL RADIO SENSOR

(75) Inventor: Keiichiro Aoki, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/315,637

(22) Filed: May 20, 1999

(30) Foreign Application Priority Data

May 27, 1998 (JP) ................................................ 10-145822
Dec. 28, 1998 (JP) ................................................ 10-374543

(51) Int. Cl.[7] ......................... F02D 41/14; G01N 27/419

(52) U.S. Cl. .......................... 123/688; 123/694; 73/1.07; 204/406

(58) Field of Search .................................... 123/688, 694, 123/697; 73/1.06, 1.07, 23.32; 204/401, 406, 408

(56) References Cited

U.S. PATENT DOCUMENTS 4,626,338 * 12/1986 Kondo et al. ........................ 204/406
5,980,728 * 11/1999 Farber et al. ........................ 204/401

FOREIGN PATENT DOCUMENTS 59-87246 * 5/1984 (JP) .
8-271475 10/1996 (JP) .

* cited by examiner

*Primary Examiner*—Andrew M. Dolinar
(74) *Attorney, Agent, or Firm*—Kenyon & Kenyon

(57) ABSTRACT

A control device for an air-fuel ratio sensor for detecting, from an oxygen concentration detecting device, a current corresponding to a concentration of oxygen contained in a gas by applying a voltage to the oxygen concentration detecting device. The control device detects an alternating impedance of the oxygen concentration detecting device corresponding to each frequency by applying alternating voltages of a plurality of frequencies to the oxygen concentration detecting device and analyzing each of the alternating impedances detected by the impedance detecting means so as to calculate a parameter indicating a change in the characteristic of the oxygen concentration detecting device, and thereby achieve control of the air-fuel ratio sensor.

10 Claims, 41 Drawing Sheets

FIG. 13

| Zac3 [Ω] | 40 | 45 | 50 | 55 | 60 |
|---|---|---|---|---|---|
| Zactggk [Ω] | 2 | 0 | 0 | 0 | −1 |

FIG. 14

| Ims / $Zac_1$ | −6 mA | 0 mA | 6 mA |
|---|---|---|---|
| 30Ω | 13 | 14.5 | 18 |
| 40Ω | 12 | 14.5 | 20 |
| 50Ω | 11 | 14.5 | 21 |

| | | | | | |
|---|---|---|---|---|---|
| Zactg (Ω) | 20 | 25 | 30 | 35 | 40 |
| Zacact (Ω) | 23 | 28 | 32 | 37 | 42 |

CONTROL DEVICE FOR AIR-FUEL RADIO SENSOR

INCORPORATION BY REFERENCE

The disclosure of each of Japanese Patent Applications No. HEI 10-145822 filed on May 27, 1998 and No. HEI 10-374543 filed on Dec. 28, 1998, including the specifications, drawings and abstracts thereof, is incorporated herein by reference in their entirety.

BACKGROUND OF THE INVENTION

1. Field of the Invention

The present invention relates to a control device for an air-fuel ratio sensor, and more particularly, to a control device for an air-fuel ratio sensor which detects an impedance of an air-fuel ratio sensor device such as an oxygen concentration detecting device for rapidly and accurately detecting the air-fuel ratio of exhaust air from an internal combustion engine. The control device determines a fault or activation state of the air-fuel ratio sensor based on the detected impedance, calculates the air-fuel ratio from an output value of the air-fuel ratio sensor and corrects a target temperature to which the air-fuel ratio sensor device is to be heated by energizing a heater so that an activation state of the air-fuel ratio sensor device is maintained.

2. Description of the Related Art

In a recent trend to control air-fuel ratio of engines, an air-fuel ratio sensor and catalyst are disposed in the exhaust system of the engine and feedback control is performed to set an exhaust air-fuel ratio detected by the air-fuel ratio sensor to a target air-fuel ratio, for example, a stoichiometric air-fuel ratio to maximize purification of harmful exhaust components (HC, CO, NOx and the like) by the catalyst. Limit current type devices for detecting oxygen concentration have generally been employed as air-fuel ratio sensors to output a limit current proportional to the concentration of oxygen contained in the exhaust gas. The limit current type oxygen concentration detecting device detects the air-fuel ratio of the exhaust based on the oxygen concentration widely and linearly. It is useful for improving the air-fuel ratio control accuracy and controlling the air-fuel ratio of the exhaust to a target air-fuel ratio in a wide range from rich to the theoretical air-fuel ratio (stoichiometric) and further to lean.

The aforementioned oxygen concentration detecting device must be kept activated to maintain the air-fuel ratio detecting accuracy. In order to activate the device as soon as possible after a cold engine start, such devices are usually heated by energizing a heater provided therein at the startup of the engine. Further, the heater is controlled to maintain the activation state.

FIG. 19 is a diagram showing a correlation between the temperature of the oxygen concentration detecting device and the impedance thereof. There is a correlation indicated by a bold line of FIG. 19 between the temperature of the aforementioned oxygen concentration detecting device (hereinafter referred to as a device) and impedance, that is, the impedance of the device damps with a rise in the device temperature. In conjunction with this relation, during the heater energizing control, the impedance of the device is detected to derive the device temperature, and feedback control is carried out to set the device temperature to a desired activation temperature, for example, 700° C. For example, when the impedance Zac of the device is equal to or greater than a device impedance 30Ω (Zac>30) corresponding to the initial control device temperature of 700° C., that is, when the device temperature is less than or equal to 700° C., the heater is energized. When the Zac is smaller than 30Ω (Zac<30), that is, when the device temperature exceeds 700° C., the heater is de-energized. As a result, the device temperature is maintained equal to or greater than the activation temperature of 700° C. so as to maintain the activation state. Further, when the heater is energized, duty control is carried out to obtain an energization amount required to eliminate deviation of the device impedance (Zac−30) from the target value, and to energize for the required power supply.

For example, as disclosed in Japanese Patent Application Laid-Open No. HEI 9-292364, when detecting the impedance of the aforementioned oxygen concentration detecting device, an alternating voltage of a single frequency required for detecting a temperature of such device is applied to detect the impedance. By applying a voltage of this frequency, a resistance of the electrolytic portion of the device can be measured. However, the resistance of the electrolytic portion does not change remarkably over time and the impedance of the device does not vary greatly. Thus, in the prior art the relation between the temperature of the device and impedance shown by the bold line of FIG. 19 has been maintained substantially constant, irrespective of a change over time.

However, once the durability of the aforementioned oxygen concentration detecting device has deteriorated, the correlation between the temperature of the device and the impedance resembles the dotted line shown in FIG. 19.

The structure of the air-fuel ratio sensor device, the equivalent circuit and impedance characteristics thereof will be described hereinafter.

FIG. 20 is a diagram showing the structure of the air-fuel ratio sensor device, FIG. 20A is a sectional view thereof and FIG. 20B is a partially enlarged view of an electrolytic portion thereof.

FIG. 21 is a diagram showing a circuit equivalent to the air-fuel ratio sensor. In FIG. 21, the code R1 denotes a bulk resistance of the electrolyte formed of, for example, zirconia (grain in FIG. 20); R2 denotes a grain boundary resistance of the electrolyte (grain boundary portion in FIG. 20); R3 denotes an interface resistance of an electrode formed of, for example, platinum; C2 designates a capacitive component of the grain boundary of the electrolyte; C3 designates a capacitive component of the electrode interface, and Z(W) designates impedance (Warburg Impedance) generated owing to periodic changes in the interface concentration upon polarization by an alternating current.

FIG. 22 is a diagram showing the impedance characteristics of the air-fuel ratio sensor device. The abscissa indicates a real part Z' of the impedance and the ordinate indicates an imaginary part Z". The impedance Z of the air-fuel ratio sensor device is expressed as Z=Z'+jZ". As FIG. 22 shows, it is evident that, as the frequency approaches the range of 1–10 KHz, the electrode interface resistance R3 converges to 0. A curve indicated by a broken line represents the change in the impedance upon deterioration of the air-fuel ratio sensor device. From the part of the impedance characteristic indicated by the broken line, it is evident that R3 varies as time elapses. When the oxygen concentration of gas detected by the air-fuel ratio sensor device sharply changes, the impedance characteristic varies as indicated by the broken line.

FIG. 23 is a diagram showing a relation between the frequency of an alternating voltage applied to the air-fuel ratio sensor device and the impedance of the device. In FIG. 23, the abscissa of FIG. 22 is converted to frequency f and the ordinate is converted to impedance Zac. Referring to FIG. 22, it is evident that the impedance Zac converges to a predetermined value (R1+R2) in a range from about 1–10 KHz to 10 MHz in frequency and the impedance Zac is reduced at a frequency higher than 10 MHz so as to converge to R1. This fact indicates that a range from about 1–10 KHz to about 10 MHz in which the Zac becomes constant irrespective of the frequency, is preferable so that the impedance Zac may be detected in a stable condition. The curve indicated by the broken line shows the variation of R3 over time or an impedance obtained when applying an alternating current at a low frequency as far as it can be measured (less than 1 KHz). A degree of the deterioration of the air-fuel ratio sensor device can be derived from the impedance at the low frequency.

As shown by the broken line of FIG. 19, the correlation between the temperature of the oxygen concentration detecting device as the air-fuel ratio sensor device and an impedance in a range from about 1–10 KHz to about 10 MHz greatly varies after the device has been deteriorated in comparison with the device before deterioration.

However, according to Japanese Patent Application Laid-Open No. HEI 9-292364, as only the resistance of the air-fuel ratio sensor device, R1+R2, is measured, the change in the characteristic of the air-fuel ratio sensor device cannot be clarified. Therefore, if the heater energization control is continued while maintaining the device impedance Zac as a target value for controlling the device temperature at 30Ω, the control device temperature is gradually increased after deterioration of the device up to, for example, 800° C. Therefore, the device is excessively heated, thereby further accelerating the deterioration and reducing the service life of the device.

Further, if the change in the device temperature or device characteristic causes inaccurate calculation of the air-fuel ratio based on an output value of the air-fuel ratio sensor, engine emissions may deteriorate. Likewise the fault or activation of the air-fuel ratio sensor cannot be determined accurately based on the device impedance detected in a state where the device temperature or device characteristics have changed.

SUMMARY OF THE INVENTION

Accordingly, the present invention has been made to solve these problems, and therefore an object of the invention is to provide a control device for an air-fuel ratio sensor for detecting an impedance of the air-fuel ratio sensor device accurately in a short time, determining a fault or activation state of the air-fuel ratio sensor considering the change in characteristic of the air-fuel ratio sensor based on the detected impedance, and calculating an air-fuel ratio and correcting the device temperature to a target temperature of the air-fuel ratio sensor device according to the output value of the air-fuel ratio sensor.

To achieve the above object, the present invention provides a control device for air-fuel ratio sensor for detecting a current corresponding to concentration of oxygen contained in a detection object gas from an oxygen concentration detecting device by applying a voltage to the oxygen concentration detecting device, the air-fuel ratio sensor control device including: impedance detecting means for detecting an alternating impedance of the oxygen concentration detecting device corresponding to each frequency by applying alternating voltages of plural frequencies to the oxygen concentration detecting device; and parameter calculating means for analyzing each of the alternating impedances of plural frequencies detected by the impedance detecting means so as to calculate a parameter indicating a change in the characteristic of the oxygen concentration detecting device.

With the above structure, the plural alternating impedances of the air-fuel ratio sensor device are detected, each of the detected alternating impedances is analyzed and the characteristic parameters indicating the change in characteristic of the air-fuel ratio sensor device is obtained. The parameter makes it possible to conduct various controlling operation.

Further, the present invention provides the control device for air-fuel ratio sensor mentioned above, further including fault determining means for determining a fault of the oxygen concentration detecting device depending on a parameter calculated by the parameter calculating means.

Further, the present invention provides a control device for air-fuel ratio sensor mentioned above further comprising an air-fuel ratio calculating means for calculating an air-fuel ratio of a detecting object gas from an output value of the oxygen concentration detecting device depending on a parameter calculated by the parameter calculating means.

Further, the present invention provides a control device for air-fuel ratio sensor mentioned above, further comprising an activation determining means for determining whether or not the oxygen concentration detecting device is activated depending on the parameter calculated by the parameter calculating means.

Further, the present invention provides a control device for air-fuel ratio sensor mentioned above, further comprising a device temperature control means for controlling the temperature of the device by heating the device by supplying a power to a heater provided in the oxygen concentration detecting device depending on the parameter calculated by the parameter calculating means.

Further, the present invention provides a control device for air-fuel ratio sensor mentioned above, wherein the impedance detecting means applies alternating voltages of two different frequencies selected from plural frequencies to the oxygen concentration detecting device.

Further, the present invention provides a control device for air-fuel ratio sensor mentioned above, wherein the alternating voltages of plural frequencies applied to the oxygen concentration detecting device by the impedance detecting means are instantaneous.

Further, the present invention provides a control device for air-fuel ratio sensor mentioned above, wherein the parameter calculating means calculates the parameter from a difference between the alternating impedances of the oxygen concentration detecting device corresponding to two different frequencies selected from plural frequencies.

Further, the present invention provides a control device for air-fuel ratio sensor mentioned above, wherein of the two different frequencies, a first frequency is selected from a frequency band in which a resistance of electrolytic quality of the oxygen concentration detecting device is detected and a second frequency is selected from a frequency band in which an impedance including an electrode interface resistance of the oxygen concentration detecting device is detected.

Further, the present invention provides a control device for air-fuel ratio sensor mentioned above, wherein the impedance detecting means changes the frequency in a predetermined order when the alternating voltages of plural different frequencies are applied to the oxygen concentration detecting device.

Further, the present invention provides a control device for air-fuel ratio sensor mentioned above, wherein the impedance detecting means applies the alternating voltages through a filter capable of changing a filter constant depending on the frequency when the alternating voltages of plural different frequencies are applied to the oxygen concentration detecting device.

The above described structure may improve the impedance detecting accuracy.

Further, the present invention provides a control device for air-fuel ratio sensor mentioned above, wherein during an interval since an alternating voltage of a predetermined frequency is applied to the oxygen concentration detecting device until that application is terminated and a current value detected from the oxygen concentration detecting device is converged, the impedance detecting means sets a filter constant of a filter corresponding to that frequency.

The above described structure may also improve the impedance detecting accuracy.

Further, the present invention provides a control device for air-fuel ratio sensor mentioned above, wherein during an interval since an alternating voltage of a predetermined frequency is applied to the oxygen concentration detecting device until that application is terminated and a current value detected from the oxygen concentration detecting device is converged, the impedance detecting means inhibits switching to an alternating voltage of a frequency different from the predetermined frequency.

Further, the present invention provides a control device for air-fuel ratio sensor mentioned above, wherein during an interval since an alternating voltage of a predetermined frequency is applied to the oxygen concentration detecting device until that application is terminated and a current value detected from the oxygen concentration detecting device is converged, the impedance detecting means inhibits calculation of the air-fuel ratio of the detecting object gas from an output value from the oxygen concentration detecting device.

More specifically, for example, when detecting the low frequency impedance, if an air-fuel ratio of the gas to be detected is calculated from an output (limit current) value of the oxygen concentration detecting device while the applied voltage is in oscillation, the value of the air-fuel ratio results in inaccurate. Therefore, the aforementioned structure is designed to inhibit the calculation of the air-fuel ratio.

Further, the present invention provides a control device for air-fuel ratio sensor mentioned above, wherein the air-fuel ratio calculating means calculates an air-fuel ratio based on an alternating impedance of the oxygen concentration detecting device corresponding to the highest frequency of the plural frequencies.

Further, the present invention provides a control device for air-fuel ratio sensor mentioned above, wherein the activation determining means determines whether or not the oxygen concentration detecting means is activated based on an alternating impedance of the oxygen concentration detecting device corresponding to the highest frequency of the plural frequencies.

Further, the present invention provides a control device for air-fuel ratio sensor mentioned above, wherein the impedance detecting means, when applying an alternating voltage of a predetermined frequency to the oxygen concentration detecting device by a single cycle, switches to a second half cycle during a first half cycle of the alternating voltage, releases the application of the alternating voltage during the second half cycle, and measures a voltage applied to the oxygen concentration detecting device in the first half cycle and a current flowing in the oxygen concentration detecting device so as to calculate the alternating impedance.

The above structure may improve the impedance detecting accuracy, and shorten both the detecting time and the calculation disable time for the air-fuel ratio detected from the sensor current at application of the direct voltage, thus reducing the air-fuel ratio feedback control disable time.

Further, the present invention provides a control device for air-fuel ratio sensor mentioned above, wherein the impedance detecting means, when applying an alternating voltage of a predetermined frequency to the oxygen concentration detecting device by a single cycle, switches to a second half cycle during a first half cycle of the alternating voltage, releases the application of the alternating voltage during the second half cycle, and measures a current flowing in the oxygen concentration detecting device in the first half cycle at least twice so as to calculate a converging current value of the oxygen concentration detecting device caused by the application of the alternating voltage to calculate an alternating impedance from the alternating voltage and converging current value.

The above described structure may improve the impedance detecting accuracy and reduce the detecting time.

Further, the present invention provides a control device for air-fuel ratio sensor wherein just after the alternating voltage of a low frequency is applied to the oxygen concentration detecting device by a single cycle, the impedance detecting means applies an alternating voltage of a single cycle having a higher frequency than the low frequency.

The above described structure terminates electric discharge in capacitive component of the sensor device after the end of application of the alternating voltage pulse in a short time, and converges the current flowing through the sensor device so as to reduce the air-fuel ratio calculation disable time.

Further, the present invention provides a control device for air-fuel ratio sensor mentioned above, wherein, of the plural frequencies, the impedance detecting means detects an impedance of low frequency only when gas environment is stabilized, for example, when the exhaust air velocity or air-fuel ratio is stabilized.

The above described structure reduces frequency of detecting the low frequency impedance, thus reducing the air-fuel ratio feedback control disable time for the engine.

Further, the present invention provides a control device for air-fuel ratio sensor mentioned above, wherein a state in which the gas environment for the oxygen concentration detecting device is stabilized refers to a state in which an engine whose air-fuel ratio is controlled by using the oxygen concentration detecting device is warmed up so that a change in the exhaust air velocity is small.

The above described structure improves the low frequency impedance detecting accuracy, reliability of determining a deterioration or activation of the sensor device, and increases the accuracy of calculations of the air-fuel ratio at low temperatures until the air-fuel ratio sensor reaches its activated state and correction of the target temperature of the air-fuel ratio sensor device.

To achieve the above object, the present invention provides a control device for air-fuel ratio sensor for detecting a current corresponding to concentration of oxygen contained in a detection object gas from an oxygen concentration detecting device by applying a voltage to the oxygen concentration detecting device, the air-fuel ratio sensor control device including: impedance detecting means for applying an alternating voltage of a single frequency to the oxygen concentration detecting device to detect an alternating impedance of the oxygen concentration detecting device corresponding to that frequency; and air-fuel ratio calculating means for calculating an air-fuel ratio of the detecting object gas corresponding to the alternating impedance detected by the impedance detecting means.

Further, the present invention provides a control device for air-fuel ratio sensor mentioned above, wherein the frequency is selected from frequency band of 1–10 KHz.

With the above structure, in the air-fuel ratio calculated from an alternating impedance detected by applying an alternating voltage of a single frequency, for example, a frequency selected from a range of 1–10 KHz, the temperature dependency of the output of the oxygen concentration detecting device is corrected so as to improve the air to fuel detecting accuracy. Further, according to the above structure, when the oxygen concentration detecting device is deteriorated, the impedance of the oxygen concentration detecting device is activated with a value greater than that of the device before deterioration. Therefore, the time required for the activation is shortened such that the air-fuel ratio feedback control can be started at an earlier stage, thus decreasing emission of the exhaust gas at start of the engine.

Therefore, the control device for the air-fuel ratio sensor may detect the impedance of the air-fuel ratio sensor device accurately and provide the parameter indicating the change in characteristic of the air-fuel ratio sensor according to the detected impedance. Therefore it is possible to provide the control device for the air-fuel ratio sensor device capable of determining a fault or activation of the air-fuel ratio sensor, calculating the air-fuel ratio from an output of the air-fuel ratio sensor and correcting the target temperature of the air-fuel ratio sensor device based on this parameter.

Further, according to the aforementioned parameter, it is possible to correct the output value of the air-fuel ratio sensor device corresponding to the change of the air-fuel ratio sensor at the elapse of time, and improve the accuracy of the air-fuel ratio feedback control, thus preventing deterioration of emission of the exhaust air from the engine. Further, as the device temperature control target value of the air-fuel ratio sensor device can be varied depending on the change of the air-fuel ratio sensor at the elapse of time, it is also possible to prevent disconnection of the heater due to excessive temperature rise and the shortened service life of the air-fuel ratio sensor device.

Further, according to the control device for the air-fuel ratio sensor device, as the filter constant and its constant setting period are modified depending on the frequency of an alternating voltage to be applied to the air-fuel ratio sensor device and the converging time of the alternating voltage, the detection accuracy of the impedance of the air-fuel ratio sensor device can be improved.

According to the control device for the air-fuel ratio sensor of the present invention, as the application time of the alternating voltage to be applied to the air-fuel ratio sensor device is reduced, the detecting time for the impedance of the air-fuel ratio sensor device can be reduced, so that the calculation disable time for an air-fuel ratio detected from the current in the air-fuel ratio sensor device when a direct voltage is applied can be reduced and further, the air-fuel ratio feedback control disable time can also be reduced.

Further, according to the control device for the air-fuel ratio sensor device of the present invention, as the impedance detecting means detects the impedance at the low frequency generated only when the environment of the air to fuel sensor device is stabilized, the frequency of detecting the impedance of the low frequency is reduced, thus reducing the control disable time for the engine air-fuel ratio feedback control.

Further, according to the control device for the air-fuel ratio sensor device of the present invention, as the state where the environment of the air-fuel ratio sensor device is stabilized for detecting an impedance of the low frequency with the impedance detecting means refers to a time when the engine is warmed up so that the change in the exhaust air velocity is small, the detecting accuracy for the impedance of the low frequency is improved, thus improving reliability of determining a deterioration of activation of the sensor device can be improved. As a result, this makes it possible to improve the accuracy of the air-fuel ratio calculated at low temperatures until the air-fuel ratio sensor reaches its activation state and a correction accuracy for the target temperature in the air-fuel ratio sensor device.

Further, according to the present invention, an alternating voltage of a single frequency is applied to the air-fuel ratio sensor device so as to detect an alternating impedance of the air-fuel ratio sensor device corresponding to the frequency and an air-fuel ratio of the gas to be detected is calculated corresponding to the detected alternating impedance according to a map. Therefore, in the calculated air-fuel ratio, the temperature dependency of the output of the air-fuel ratio sensor device is corrected so that the detecting accuracy for the air-fuel ratio is improved. Further, when the air-fuel ratio sensor device is deteriorated, the impedance of the device is activated with the value greater than that of the device before deterioration, the time required for the activation is reduced, such that the air-fuel ratio control can be started at an early state, thus improving the emission of the exhaust air at start of the engine.

BRIEF DESCRIPTION OF THE DRAWINGS

FIG. 2 is a diagram showing input/output signal of the air-fuel ratio sensor.

FIG. 13 is a map showing a relation between the device temperature control target value Zactg of the air-fuel ratio sensor device and Zac3.

FIG. 14 is a two-dimensional map of a relation between the first impedance Zac1 and sensor current Ims.

FIG. 20 are diagrams showing a structure of the air-fuel ratio sensor device.

FIG. 36 shows diagrams of an output of the sensor device when the low frequency impedance is measured according to 1-point detecting method.

FIG. 37 shows diagrams of an output of the sensor device when the low frequency impedance is measured according to 2-point detecting method.

DESCRIPTION OF THE PREFERRED EMBODIMENTS

Hereinafter, the embodiments of the present invention will be described in detail with reference to the accompanying drawings.

Figure 1:
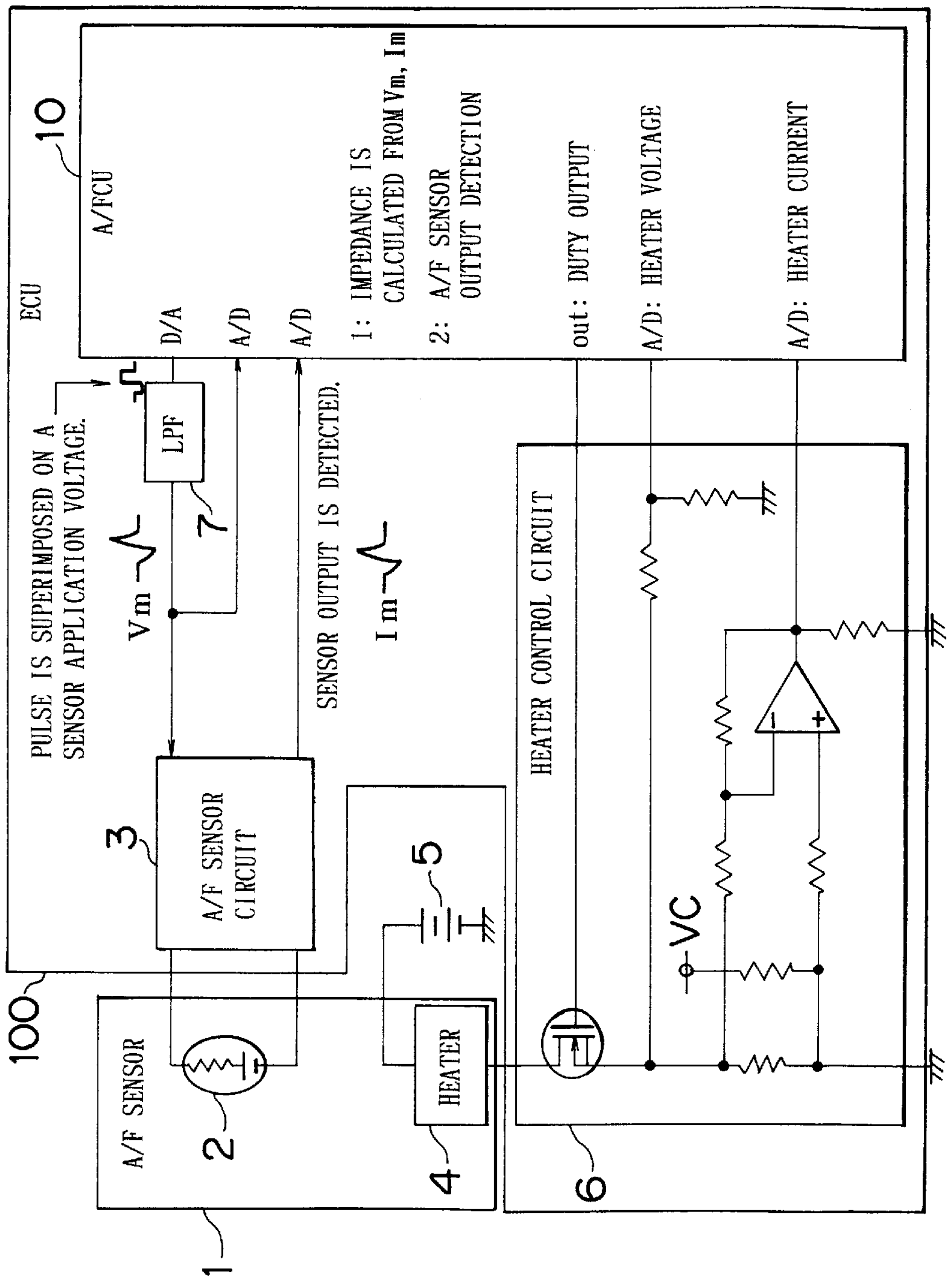
FIG. 1 is a schematic diagram showing a structure of an embodiment of a control device for an air-fuel ratio sensor of the present invention.

FIG. 1 is a schematic structure diagram of an embodiment of the control device for an air-fuel ratio sensor according to the present invention. The same components are designated as the same reference numeral. The air to fuel sensor 1 which is disposed in an exhaust air passage of an internal combustion engine (not shown) for detecting an air-fuel ratio of the exhaust air from the engine is formed of an air to fuel sensor device (hereinafter referred to as a sensor device) 2 and a heater 4. A voltage is applied to the sensor device 2 from the air-fuel ratio sensor circuit (hereinafter referred to as a sensor circuit) 3 and an electric power is supplied to the heater 2 from a battery 5 upon control by a heater control circuit 6. The air-fuel ratio sensor circuit 3 receives an analog application voltage from an air-fuel ratio control unit (A/FCU) 10 constituted of a micro computer through a low pass filter (LPF) 7 and applies the voltage to the sensor device 2.

The A/FCU 10 constitutes a part of an electronic control unit (ECU) 100 together with the sensor circuit 3, heater control circuit 6 and LPF 7 and after converting digital data calculated through processing described later to rectangular analog voltage by a build-in D/A converter, which will be output to the sensor circuit 3 through the LPF 7. The LPF 7 outputs raw signal in which a high frequency component of the rectangular analog voltage signal is removed so as to prevent an output current detection error of the sensor device 2 due to high frequency noise. When a voltage of the raw signal is applied to the sensor device 2, the A/FCU 10 detects a current flowing through the sensor device 2 which changes in proportion to an oxygen concentration in the exhaust gas and a voltage applied to the sensor device 2 at that time. The A/FCU 10 receives an analog voltage which corresponds to a current flowing through the sensor device 2 from the sensor circuit 3 and a voltage applied to the sensor device 2, and converts them to digital data by means of the respective A/D converters provided internally for detecting the current and voltage, such that these digital data are used for the processing described later.

The air-fuel ratio sensor 1 is not capable of using an output of the sensor device 2 for air-fuel ratio control until the sensor device 2 is activated. Thus, the A/FCU 10 supplies an electric power from the battery 5 to energize a heater 4 incorporated in the sensor device 2 for activating the sensor device 2 at the earlier state. Once the sensor device 2 is activated, the heater 4 is maintained in the activated state through power supply to the heater 4.

As it is focused that a resistance of the sensor device 2 is governed by the temperature thereof, namely, the resistance is damped with the increase in the temperature of the sensor device 2, an electric power is supplied to the heater 4 such that the resistance of the sensor device 2 is set to the value corresponding to the temperature enough to maintain its activated state, for example 30, thus maintaining the temperature of the sensor device 2 at a target temperature, for example, 700° C. Further, the A/FCU 10 receives an analog voltage corresponding to the voltage and current of the heater 4 from the heater control circuit 6 for heating the sensor device 2 by means of the AID converters incorporated therein, which is converted to digital data used for the processing described later. For example, a resistance of the heater 4 is calculated to supply power thereto on the basis of the calculated resistance corresponding to the operating state of the engine and to control the temperature of the heater 4 so as to prevent over temperature (OT) of the heater 4.

The air-fuel ratio control unit (A/FCU) 10 is provided with CPU, ROM, RAM, B (battery backup), RAM, input port, output port, A/D converter and D/A converter, which are connected to each other through bi-directional bus (not shown) or the like, to control the air-fuel ratio sensor 1 of the present invention (to be later described in detail).

Figure 2A:
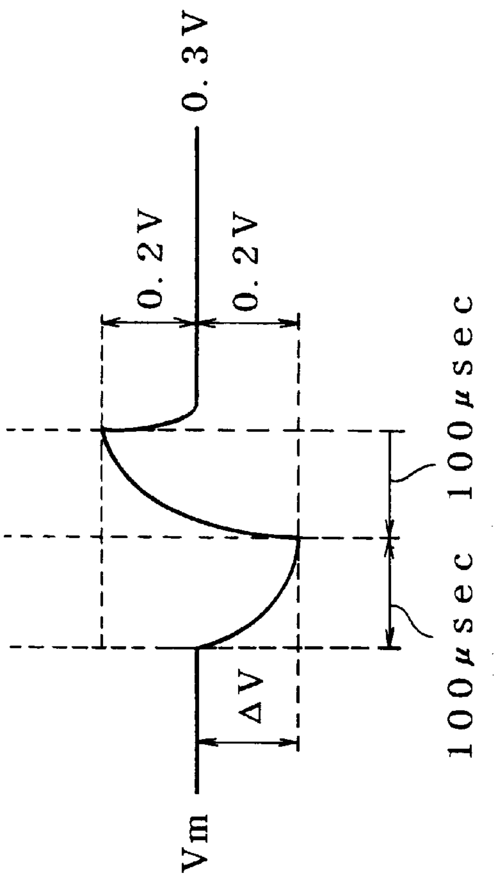
FIG. 2A is a diagram showing a waveform of an input voltage applied to the air-fuel ratio sensor.
Figure 2B:
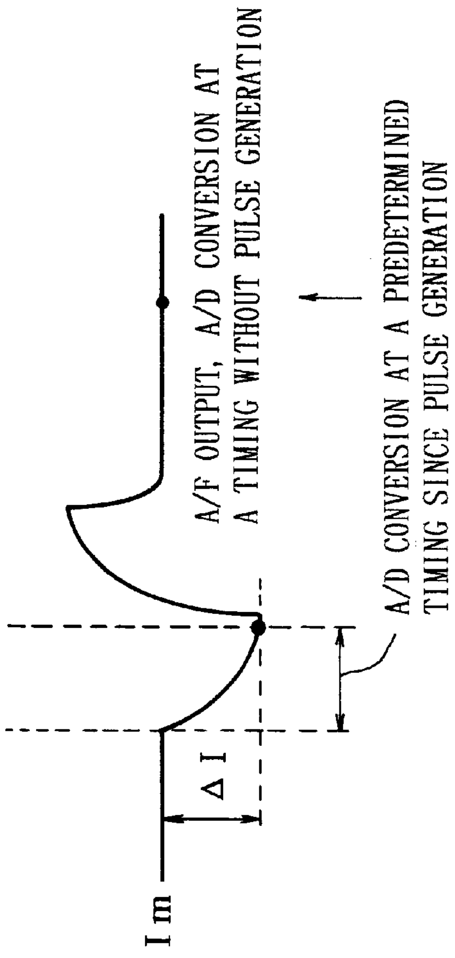
FIG. 2B is a diagram showing an output current waveform to be detected from the air-fuel ratio sensor.
Figure 22:
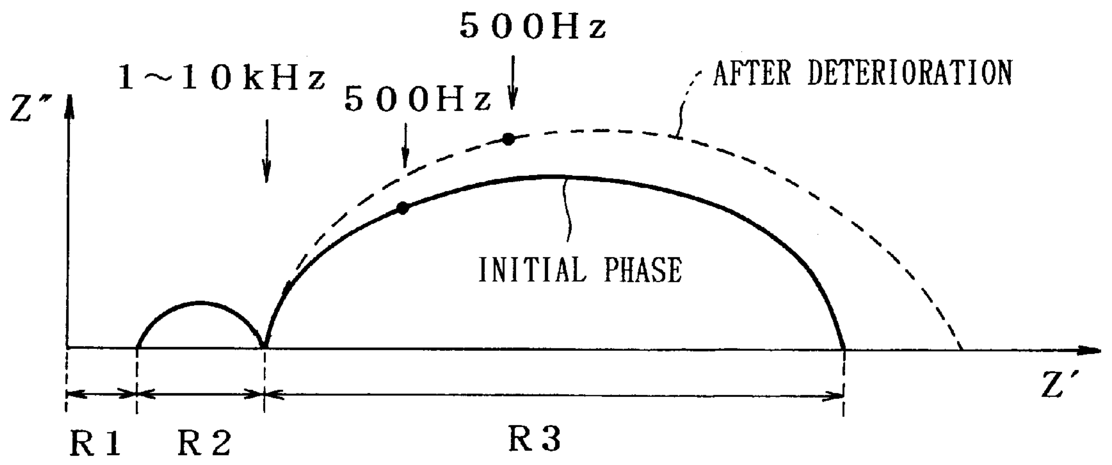
FIG. 22 is a diagram showing the impedance characteristic of the air-fuel ratio sensor device.
Figure 23:
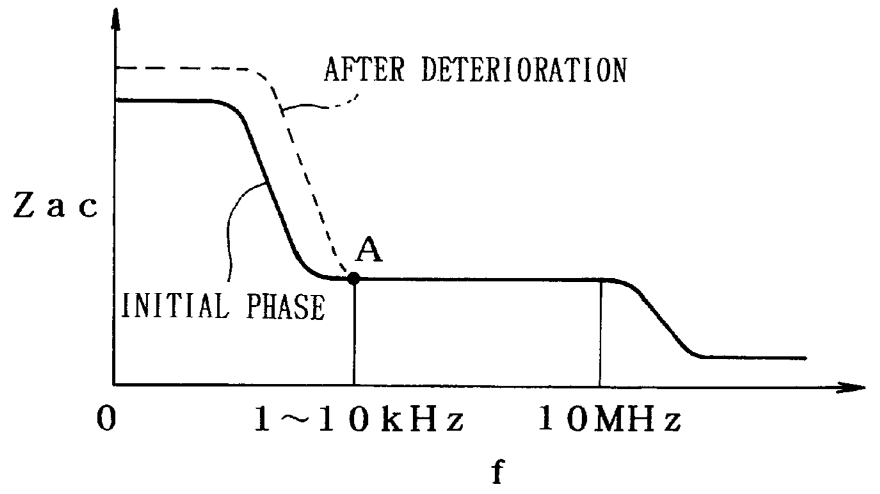
FIG. 23 is a diagram showing a relation between the frequency of an alternating voltage applied to the air-fuel ratio sensor device and the impedance of the device.

FIG. 2 is a diagram showing input/output signal of the air to fuel sensor, that is, FIG. 2A is a diagram showing a waveform of the input voltage to be applied to the air-fuel ratio sensor and FIG. 2B is a diagram showing a waveform of the output current detected from the air-fuel ratio sensor. The abscissa indicates time and the ordinate indicates voltage. As shown in FIG. 2A, assuming that the input voltage to be applied to the air-fuel ratio sensor is set to Vm, a DC current of 0.3 V is always applied. In order to measure an impedance of the sensor device, a pulse voltage of the first frequency of +0.2 V is applied to the air-fuel ratio sensor so as to be superimposed on the aforementioned DC current of 0.3 V. Meanwhile, referring to FIG. 2B, only when the DC current of 0.3 V is applied to the air-fuel ratio sensor, the output current Im detected from the air-fuel ratio sensor indicates a value (limit current value) corresponding to an oxygen concentration of the gas obtained by each measurement. If the aforementioned pulse voltage of ±0.2 V is applied to the air-fuel ratio sensor so as to be superimposed on the DC current of 0.3 V, the sensor current will change in accordance with the resistance value of the device. At this time, by detecting an applied voltage to the air-fuel ratio sensor and a change in output current from the air-fuel ratio sensor, the impedance of the sensor device is calculated. The impedance characteristic of this air-fuel ratio sensor is as shown in FIGS. 22 and 23.

Figure 3:
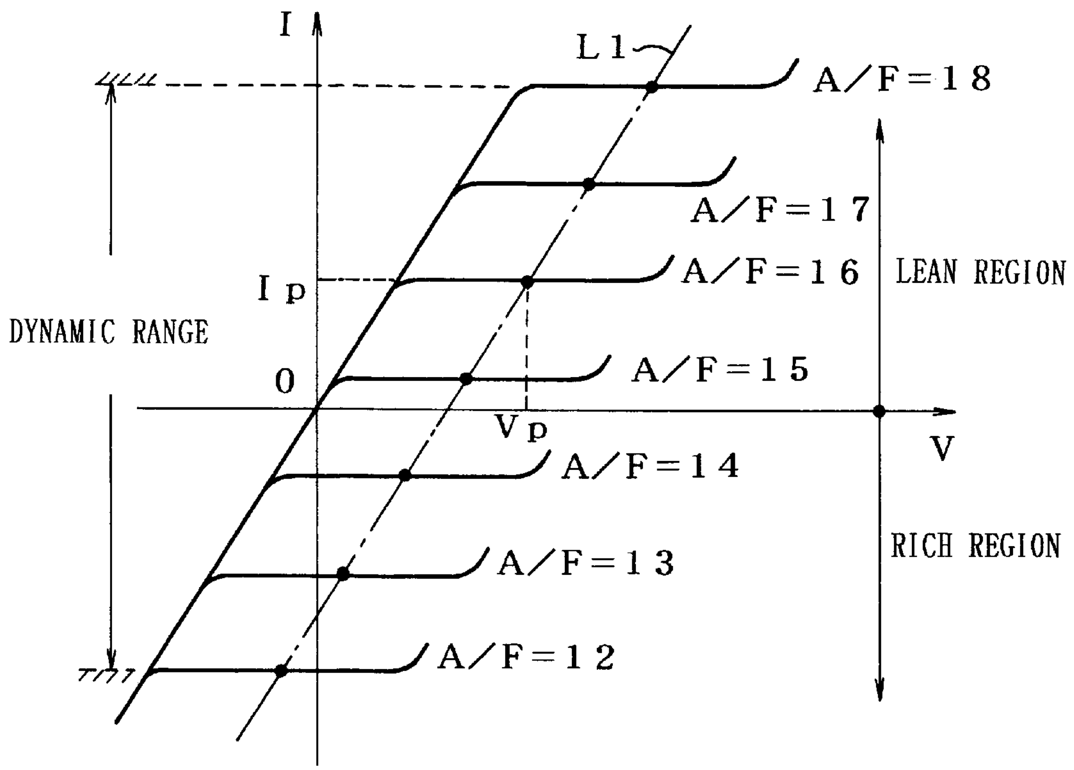
FIG. 3 is a diagram showing a voltage-current characteristic of the air-fuel ratio sensor.

FIG. 3 is a diagram showing voltage-current characteristic of the air-fuel ratio sensor. The abscissa indicates an application voltage V to the air to fuel sensor and the ordinate indicates output current I from the air-fuel ratio sensor. As evident from FIG. 3, the application voltage V is substantially proportional to the output current I. That is, if the air-fuel ratio is lean, the current value changes to the positive side and if the air-fuel ratio is rich, the value changes to the negative side (see the characteristic line indicated with a dot and dash line of FIG. 3). That is, as the air-fuel ratio becomes leaner, the limit current increases, and as the air-fuel ratio becomes richer, the limit current decreases. When the output current I is 0 mA, the air-fuel ratio becomes the stoichiometric air-fuel ratio (=14.5).

Next, the impedance calculation routine in this sensor device will be described in detail.

Figure 4:
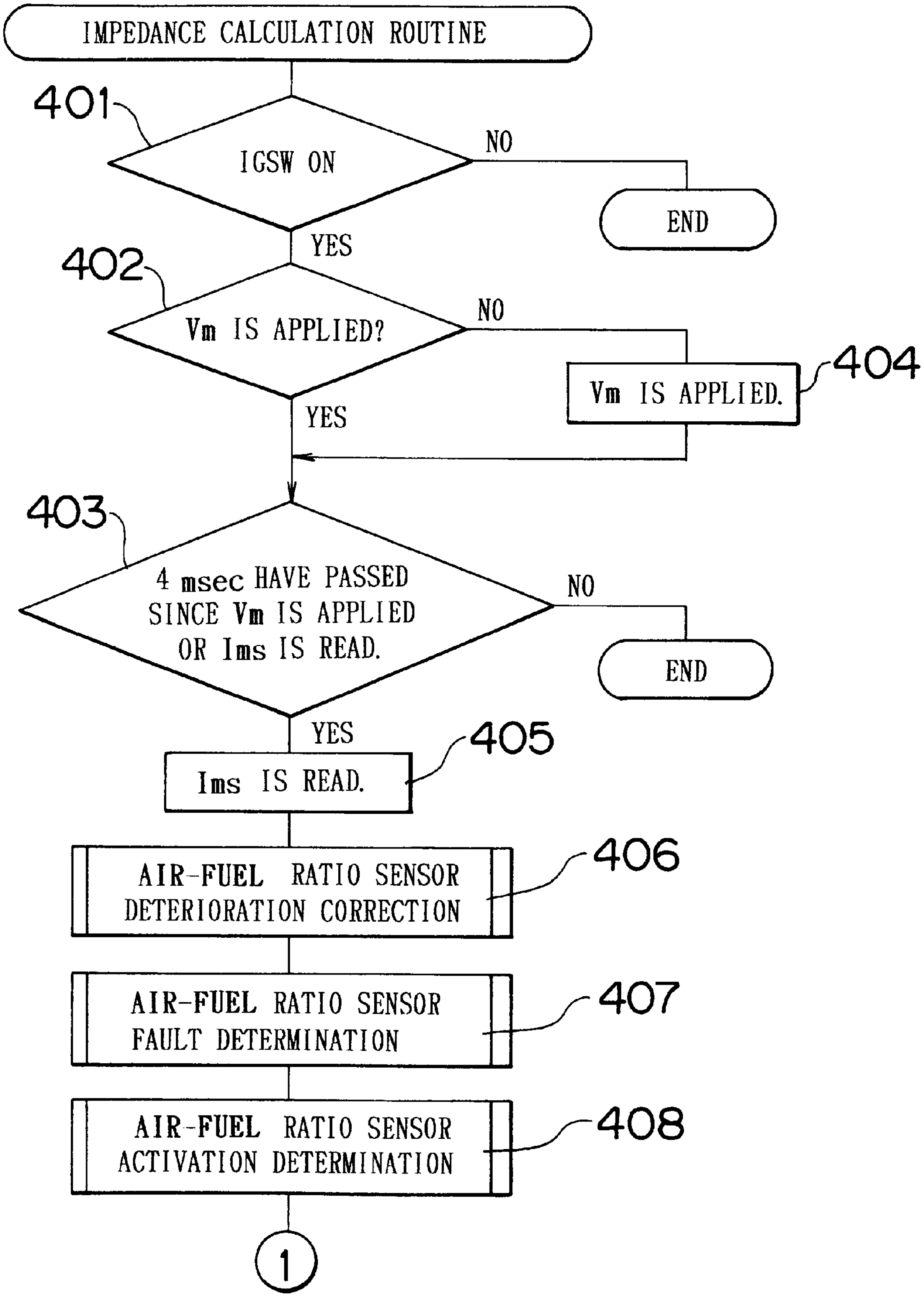
FIG. 4 is a flow chart representing a first half impedance calculation routine for a sensor device according to the first embodiment of the present invention.
Figure 5:
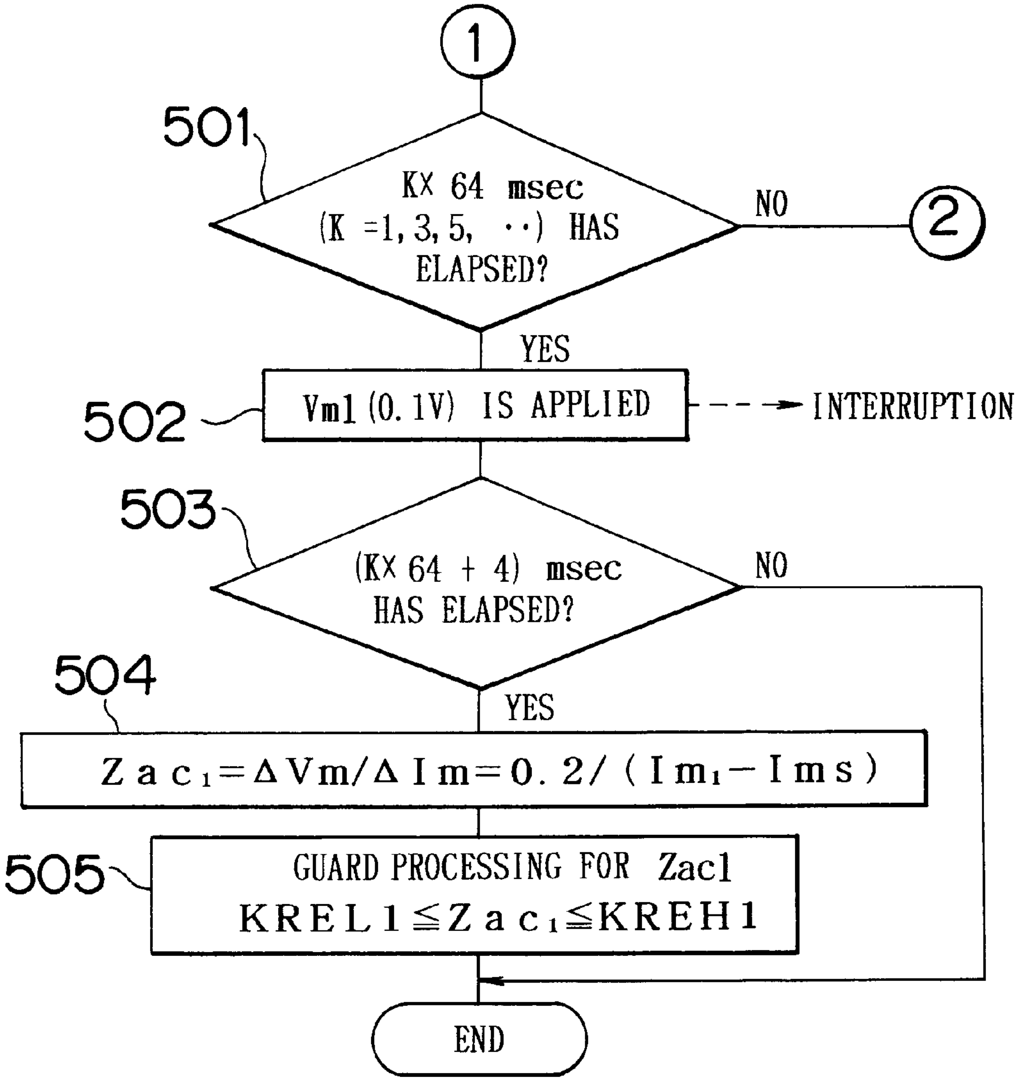
FIG. 5 is a flow chart representing the first frequency superimposing processing in a sensor device impedance calculation routine.
Figure 6:
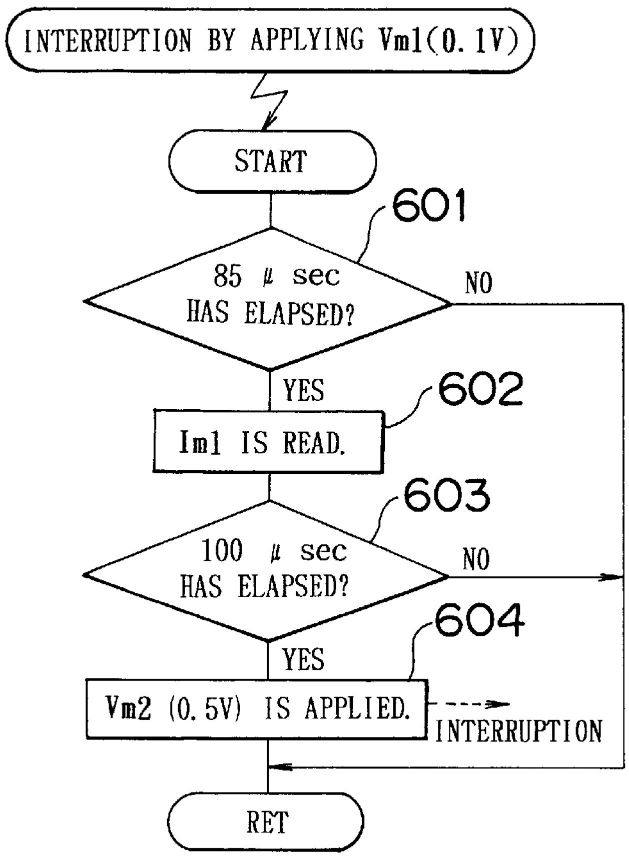
FIG. 6 is a flow chart representing the first interruption processing routine for achieving the first frequency superimposing processing.
Figure 7:
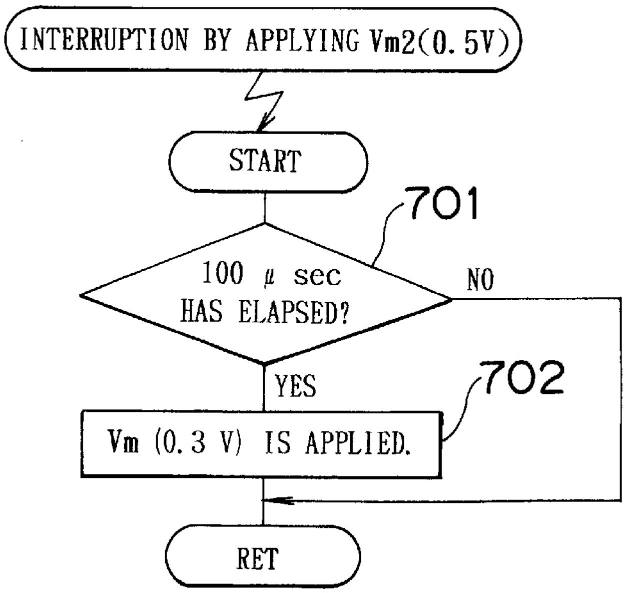
FIG. 7 is a flow chart representing the second interruption processing routine for achieving the first frequency superimposing processing.
Figure 8:
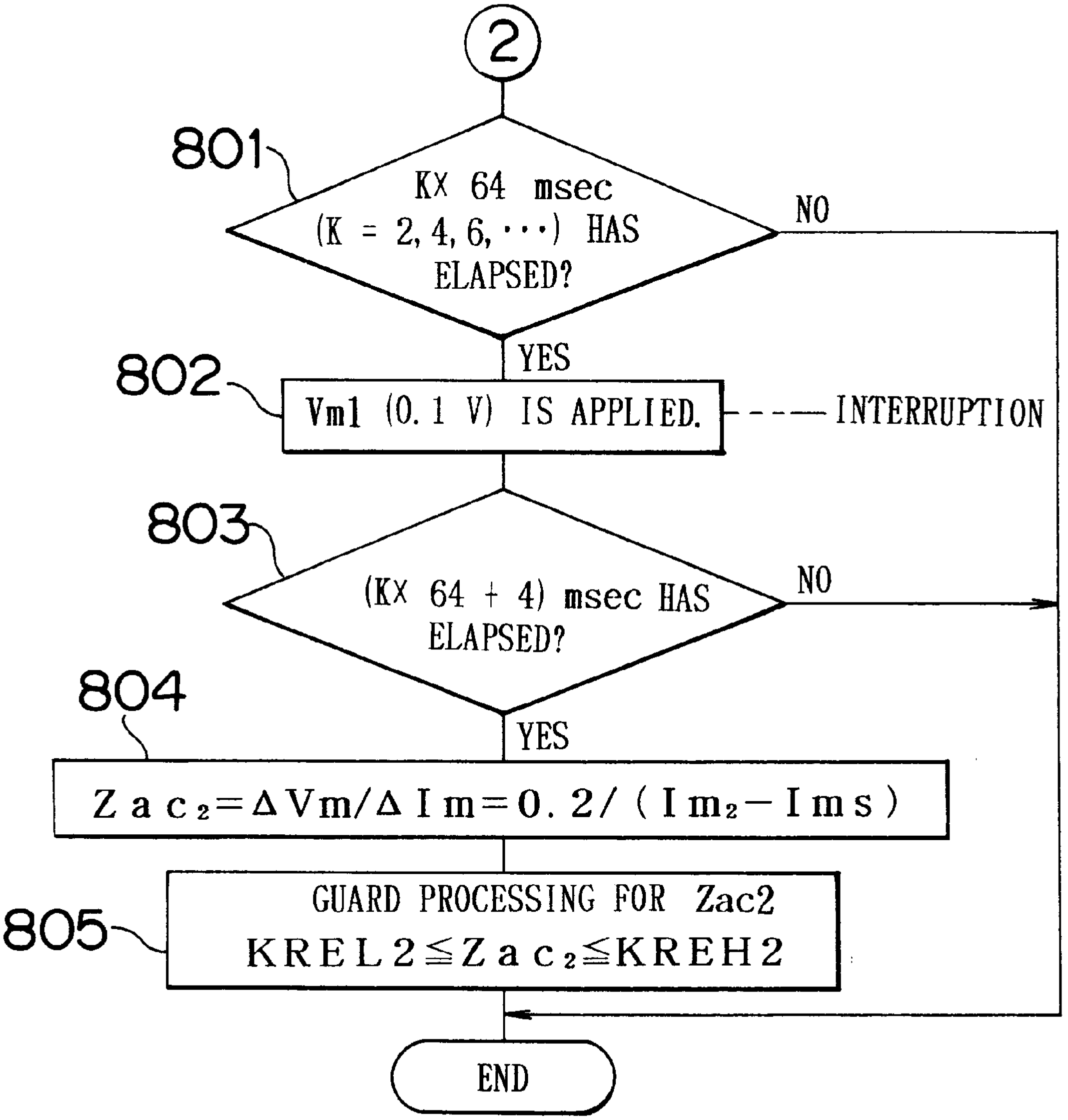
FIG. 8 is a flow chart representing the second frequency superimposing processing in the sensor device impedance calculation routine.
Figure 9:
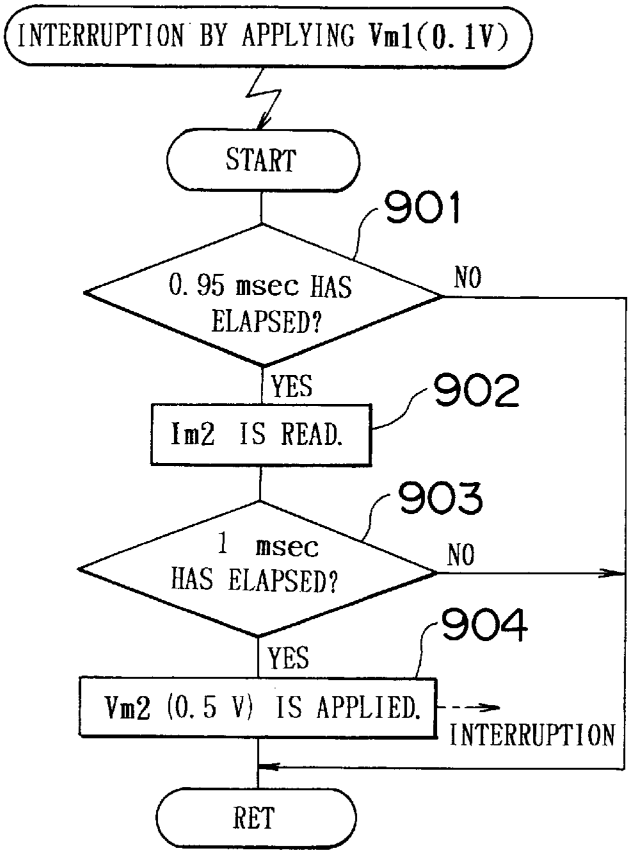
FIG. 9 is a flow chart representing the third interruption processing routine for achieving the second frequency superimposing processing.
Figure 10:
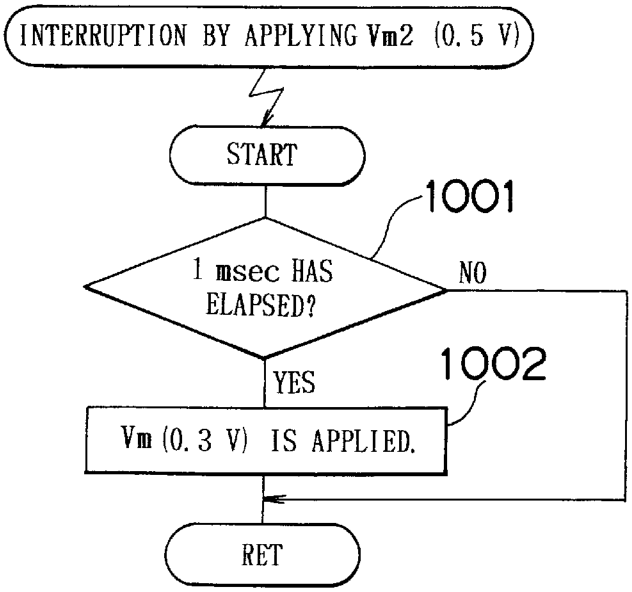
FIG. 10 is a flow chart representing the fourth interruption processing routine for achieving the second frequency superimposing processing.

FIG. 4 is a flow chart of the former half part of the impedance calculation routine for the sensor device according to the first embodiment of the present invention and FIGS. 5–10 are flow charts of the latter half part of the impedance calculation routine for the sensor device. More specifically, FIG. 5 is a flow chart of the first frequency superimposing processing in the impedance calculation routine for the sensor device, FIGS. 6 and 7 are flow charts of interruption processing routine necessary for carrying out the first frequency superimposing processing, FIG. 8 is a flow chart of the second frequency superimposing processing in the impedance calculation routine for the sensor device, and FIGS. 9 and 10 are flow charts of the interruption processing routine necessary for carrying out the second frequency superimposing processing. The routine indicated in FIGS. 4, 5 and 8 are executed at a predetermined frequency, for example, every 1 msec.

First of all at step 401, it is determined whether or not the ignition switch IGSW (not shown) is ON. If the IGSW is ON, the process proceeds to step 402 and if the IGSW is OFF, this routine is terminated. At step 402, it is determined whether or not the DC current of Vm=0.3 V is applied to the air-fuel ratio sensor 1. If YES, the process proceeds to step 403, and if NO, the process proceeds to step 404. At step 404, the DC current of 0.3 V is applied to the air-fuel ratio sensor.

At step 403, it is determined whether or not 4 msec has elapsed since the DC current of 0.3 V is applied to the air-fuel ratio sensor, or it is determined whether or not 4 msec has elapsed since the current Ims of the air-fuel ratio sensor is read in the previous processing cycle of this routine by means of, for example, a counter. If either of these determination results is YES, the process proceeds to step S405 and if both determination results are NO, this routine is terminated.

At step 405, the current Ims of the air-fuel ratio sensor is read. As evident from these steps, the current Ims is read at every 4 msec.

At step 406, the deterioration correction processing of the air-fuel ratio sensor to be described later is carried out, at step 407, the fault determination processing of the air-fuel ratio sensor to be described later is carried out and at step 408, the activation determination processing of the air-fuel ratio sensor to be described later is carried out.

Next, referring to FIGS. 5–7, the flow chart of the first frequency superimposing processing of the impedance calculation routine for the sensor device will be described.

In this example, it is assumed that 5 KHz is used as the first frequency. First of all, it is determined whether or not this processing cycle has elapsed for k×64 msec (k: odd number, 1, 3, 5, . . . ) since this routine is started by means of, for example, the counter.

If YES, that is, this processing cycle has elapsed for 64 msec, 192 msec, 320 msec, . . . from the start of this routine, the process proceeds to step 502. If NO, the processing proceeds to step 801 (see FIG. 8). At step 502, a pulse voltage of −0.2 V is superimposed on the voltage Vm (=0.3 V) applied to the air-fuel ratio sensor. Therefore, the voltage Vm1 applied to the air-fuel ratio sensor is 0.1 V. At step 502, the first timer interruption shown in FIG. 6 is started.

Here, the first timer interruption processing of FIG. 6 will be described. At step 601, it is determined whether or not 85 μs has elapsed since the aforementioned first timer interruption is started. If YES, the process proceeds to step 602 where the output current Im1 of the air-fuel ratio sensor is read. If NO, the process proceeds to step 601.

At step 603, it is determined whether or not 100 μs has elapsed since the aforementioned first timer interruption is started. If YES, the process proceeds to step 604 where the voltage of Vm=0.5 V is applied to the air-fuel ratio sensor. If NO, the process is returned to step 601. At step 604, the second timer interruption shown in FIG. 7 is started.

Here, the second timer interruption processing of FIG. 7 will be described. At step 701,it is determined whether or not 100 μs has elapsed since the second timer interruption is started. If YES, the process proceeds to step 702 where the voltage of Vm=0.3 V is applied to the air-fuel ratio sensor so as to return to normal air-fuel ratio detecting state. If NO, the process is returned to step 701.

Referring to FIG. 5 again, at step 503, it is determined whether or not this processing cycle has elapsed for (k×64+4) msec (k: odd number, 1, 3, 5, . . . ) since this routine is started. If YES, the process proceeds to step 504. If NO, this routine is terminated.

At step 504, the first (high frequency) impedance Zac1 at the time when the first frequency voltage is applied is calculated from the following formula.

$$Zac1=Vm/Im=0.2/(Im1-Ims)$$

At step 505, the guard processing of Zac1 or a processing for incorporating the Zac1 in the range between the lower limit guard value KREL1 and the upper guard value KREH1 so as to ensure KREL1≦Zac1≦KREH1 is carried out. More specifically, if KREL1≦Zac1≦KREH1, it is kept unchanged, and if Zac1<KREL1, Zac1=KREL1=1(Ω). If KREH1<Zac1, the process to reach Zac1=KREH1=200(Ω) is carried out. The guard processing is ordinarily carried out to neglect data because of disturbance, A/D conversion error and the like.

Next, the flow chart of the second frequency superimposing processing of the impedance calculation routine for the sensor device will be described with reference to FIGS. 8–10. It is assumed that 500 Hz is used as the second frequency. If NO at step 501 of FIG. 5, step 801 is carried out. At step 801, it is determined whether or not k×64 msec (k: even number, 2, 4, 6, . . . ) has elapsed since this routine is started by means of, for example, the counter. If YES or the elapsing time is 128 msec, 256 msec, 384 msec, . . . , the process proceeds to step 802, and if NO, this routine is terminated. At step 802, a pulse voltage of −0.2 V is superimposed on the voltage Vm (=0.3 V) applied to the air-fuel ratio sensor. Therefore, the voltage Vm1 applied to the air-fuel ratio sensor is 0.1 V. At step 802, the third timer interruption is started.

Here, the third timer interruption processing of FIG. 9 will be described. At step 901, it is determined whether or not 0.95 msec has elapsed since the aforementioned third timer interruption is started. If YES, the process proceeds to step 902 where the output current Im2 of the air-fuel ratio sensor is read. If NO, the process is returned to step 901.

At step 903, it is determined whether or not 1 msec has elapsed since the aforementioned third timer interruption is started. If YES, the process proceeds to step 904, where the voltage of Vm=0.5 V is applied to the air-fuel ratio sensor. If NO, the process is returned to step 901. At step 904, a fourth timer interruption shown in FIG. 10 is started.

Here, the fourth timer interruption processing of FIG. 10 will be described. At step 1001, it is determined whether or not 1 msec has elapsed since the aforementioned fourth timer interruption is started. If YES, the process proceeds to step 1002 where the voltage of Vm=0.3 V is applied to the air-fuel ratio sensor so as to gain normal air-fuel ratio detecting state. If NO, the process is returned to step 1001.

Referring to FIG. 8 again, at step 803, it is determined whether or not this processing cycle elapsed for (k'64+4) msec (k: even number, 2, 4, 6, . . . ) since this routine is started. If YES, the process proceeds to step 804 and if NO, this routine is terminated.

At step 804, the second (low frequency) impedance Zac2 at the time when the second frequency voltage is applied is calculated from the following formula.

$$Zac2=Vm/Im=0.2/(Im2-Ims)$$

At step 805, the guard processing of the Zac2, namely, a processing for incorporating the Zac2 in the range between the lower limit guard value KREL2 and the upper limit guard value KREH2, i.e., KREF2≦Zac2≦KREH2, is carried out. More specifically, if the Zac2 is KREFL2≦Zac2≦KREH2, the value is kept unchanged. If Zac<KREL2, Zac2=KREL2=1(Ω). If KREH2<Zac2, the processing is carried out to establish Zac2=KREH2=200(Ω).

Next, deterioration correction processing for the air-fuel ratio sensor at step 406 on the flow chart of FIG. 4 will be described.

Figure 11:
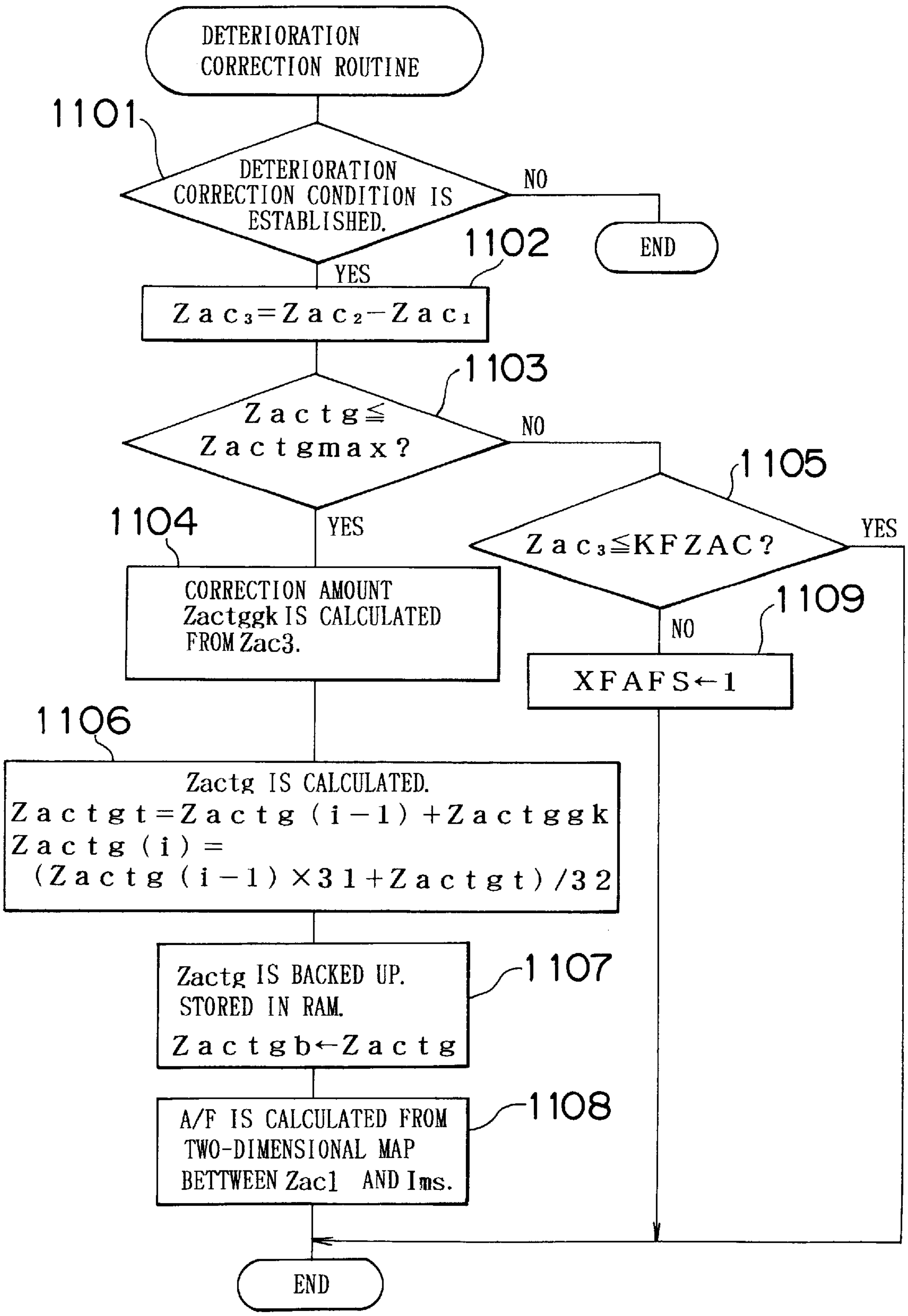
FIG. 11 is a flow chart representing deterioration correction routine for the air-fuel ratio sensor.

FIG. 11 is a flow chart of deterioration correction routine for the air-fuel ratio sensor. This routine is carried out at a predetermined cycle, for example, every 4 msec.

First, at step 1101, it is determined whether or not the deterioration correction condition is established depending on whether or not all the following conditions 1–5 are satisfied.

If YES, the process proceeds to step 1102 and if NO, this routine is terminated.

1. Rotation speed of engine NE≦1000 RPM
2. Vehicle speed VS<3 Km/h
3. Idle switch ON
4. Air-fuel ratio A/F is near 14.5 during air-fuel ratio feedback control.
5. Engine cooling water temperature THW>85° C. (engine warm-up condition)

At step 1102, a difference Zac3 (=Zac2−Zac1) between the first impedance Zac1 and the second impedance Zac2 is obtained as the parameter indicating the characteristic change of the sensor device, especially, the change thereof with the elapse of time. Hereinafter, the parameter Zac3 is called as the sensor device characteristic parameter.

Figure 12A:
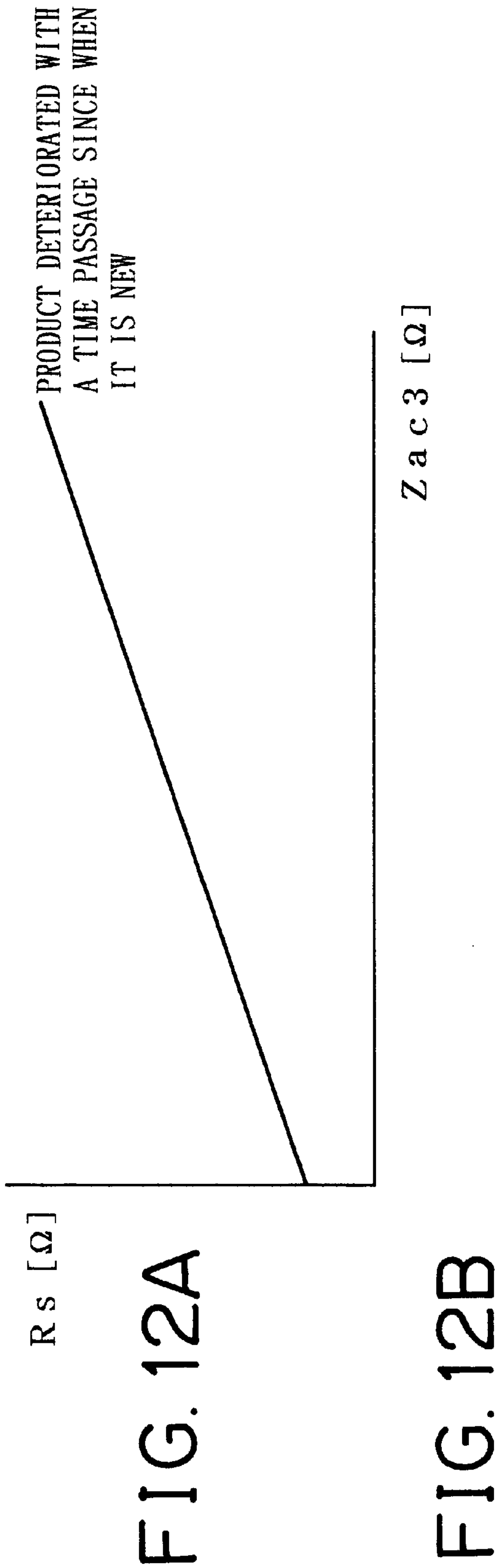
FIG. 12A is a diagram showing a relation between entire device resistance Rs and Zac3.
Figure 12B:
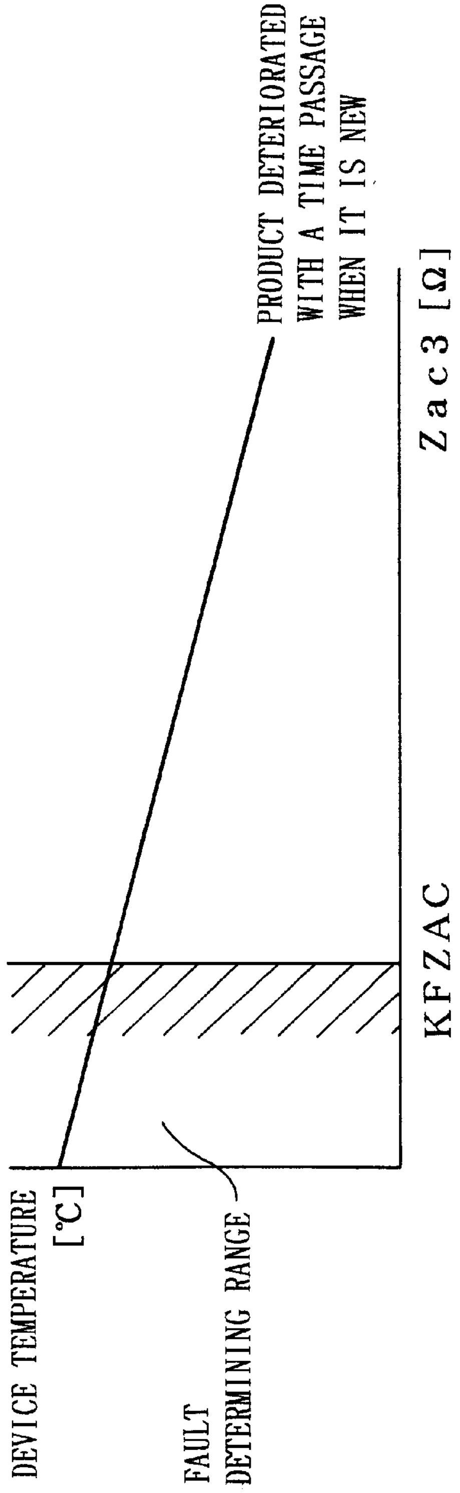
FIG. 12B is a diagram showing a relation between a device temperature of the air-fuel ratio sensor device and Zac3.

FIG. 12A is a diagram showing a relation between entire device resistance Rs (=R1+R2+R3) and Zac3 (R3) of the air-fuel ratio sensor and FIG. 12B is a diagram showing a relation between the device temperature of the air-fuel ratio sensor and Zac3. As evident from FIG. 12A, a new product and an aged product have substantially the same correlation between the Rs and Zac3. This is because the resistance component R3 of the electric field interface portion in the entire device resistance Rs of the air-fuel ratio sensor, or the Zac3 has a large occupation and further the resistance component of the electric field interface portion reflects the characteristic of the sensor device. Further, as evident from FIG. 12B, the new product and aged product have substantially the same correlation between the device temperature and Zac3. Therefore, it is apparent that the device temperature of the air-fuel ratio sensor can be estimated from the electric field interface portion R3 or Zac3.

The fault determination processing for the air-fuel ratio sensor at step 407 in the flow chart of FIG. 4 described above is achieved by executing steps 1103–1109 as follows. At step 1103, it is determined whether or not a sensor device temperature control target value is equal to or less than the lower limit value Zactgmax including the disparity of the sensor device characteristic. If YES, it is determined that the device temperature control target value can be corrected and the process proceeds to step 1104. If NO, the process proceeds to step 1105. At step 1104, the correction amount Zactggk of the device temperature control value Zactg is calculated from the Zac3 according to a map shown in FIG. 13. This map is preliminarily stored in a ROM. This device temperature control target value Zactg refers to an impedance of the device when the device temperature of the air-fuel ratio sensor reaches a target temperature. Next, at step 1106, the device temperature control target value Zactg (current value) is calculated as the average value from the following formula.

$$\text{Zactgt}=\text{Zactg}(i-1)(\text{previous value})+\text{Zactggk}\ \text{Zactg}(i)(\text{current value})=(\text{Zactg}(i-1)(\text{previous value})\times 31+\text{Zactgt})/32$$

In the heater control of the air-fuel ratio sensor 1, the Zactg (current value) calculated in this manner is set as the device temperature control target value of the sensor device impedance, and the sensor device temperature is controlled such that the sensor device impedance becomes Zactg (current value).

As shown by the map of FIG. 13, the device temperature control target value Zactg determines that the device temperature has increased if the characteristic parameter Zac3 of the sensor device is equal to or less than a predetermined value, and increases the Zactg. On the contrary, if the Zac3 equal to or greater than the predetermined value, it determines that the device temperature has decreased, and decreases the Zactg. That is, the device temperature control target value Zactg is feedback controlled such that the Zac3 becomes the predetermined value. Therefore, even after the sensor is deteriorated, the device temperature can be controlled to the same value as that of the new product. As a result, this makes it possible to prevent further deterioration and shortened service life of the sensor device due to the rise in the device temperature after deterioration of the sensor.

At step 1107, the device temperature control target value Zactg is stored in the backup RAM as the Zactgb. In the initial routine at the next engine start, the Zactgb is fetched in the Zactg and the device temperature is controlled to be near the target temperature at the next engine start.

Next, at step 1108, the air-fuel ratio A/F is calculated from a secondary map (FIG. 14) of the first impedance Zac1 and air-fuel ration sensor output current Ims. From the map shown in FIG. 14, it is apparent that when Ims is a negative value, as the first impedance Zact1 decreases, the A/F changes from the stoichiometric air-fuel ratio to the rich air-fuel ratio side. When Ims is a positive value, the A/F changes from the lean air-fuel ratio side to the stoichiometric air-fuel ratio. Further, when Ims is 0, it is apparent that the A/F assumes the stoichiometric air-fuel ratio of 14.5 regardless of the first impedance Zac1.

On the other hand, at step 1105, as shown in FIG. 12B, it is determined whether or not the sensor device characteristic parameter Zac3 is equal to or less than the fault determining value KFZAC (Zac3<KFZAC), and if YES, this routine is terminated upon determination that the air-fuel ratio sensor is normal. If NO, the process proceeds to step 1109 upon determination that the air-fuel ratio sensor is in trouble. At step 1109, the air-fuel ratio sensor fault flag XFAFS is posted. The fault determining value KFZAC shown in FIG. 12B is set to a value used for determining the excessive rise in the device temperature resulting from change in the characteristic of the sensor device.

Next, the reason for using the map shown in FIG. 14 will be described.

As described above, the device temperature control object value Zactg is calculated from a difference Zac3 (=Zac2−Zac1) between the device impedance at one frequency and the device impedance at the other frequency as described above, and the sensor device heating control is carried out so as to set the device impedance Zac to Zactg. Then, after deterioration of the device, the device temperature control target value Zactg is set to be higher than 30 of the new device, for example, 40Ω, 50Ω, such that the device impedance Zac after the deterioration is accordingly stabilized at 40Ω, 50Ω. At this time, if the air-fuel ratio A/F is calculated from the map corresponding to a device current at the device impedance of 30 when the air-fuel ratio sensor is new, the air-fuel ratio cannot be obtained accurately. Therefore, according to the present invention, the map shown in FIG. 14 is provided to calculate the air-fuel ratio accurately in accordance with the device impedance Zac or 40Ω, 50Ω after the deterioration.

As other embodiment of the present invention, it is permissible to apply a single high frequency capable of detecting the device impedance accurately, for example, only a frequency selected from 1–10 KHz to the device without using two frequencies to calculate the device impedance Zac1. Then the air-fuel ratio is calculated in accordance with the Zac1 from the map shown in FIG. 14. As a result, when it is recognized that the device has been activated by the impedance higher than that of a new device due to the deterioration, the air-fuel ratio can be calculated in accordance with this higher impedance from the map shown in FIG. 14. The air-fuel ratio sensor is activated at the impedance higher than that of the new device for a shorter period required for activation before the impedance is lowered to indicate activation state of the air to fuel sensor of the new device. As a result, the air to fuel control can be started at an earlier state, thus improving the exhaust air emission at the start of the engine is started.

Next, the activation determining processing of the air-fuel ratio sensor at step 408 in the flow chart of FIG. 4 will be described.

Figure 15:
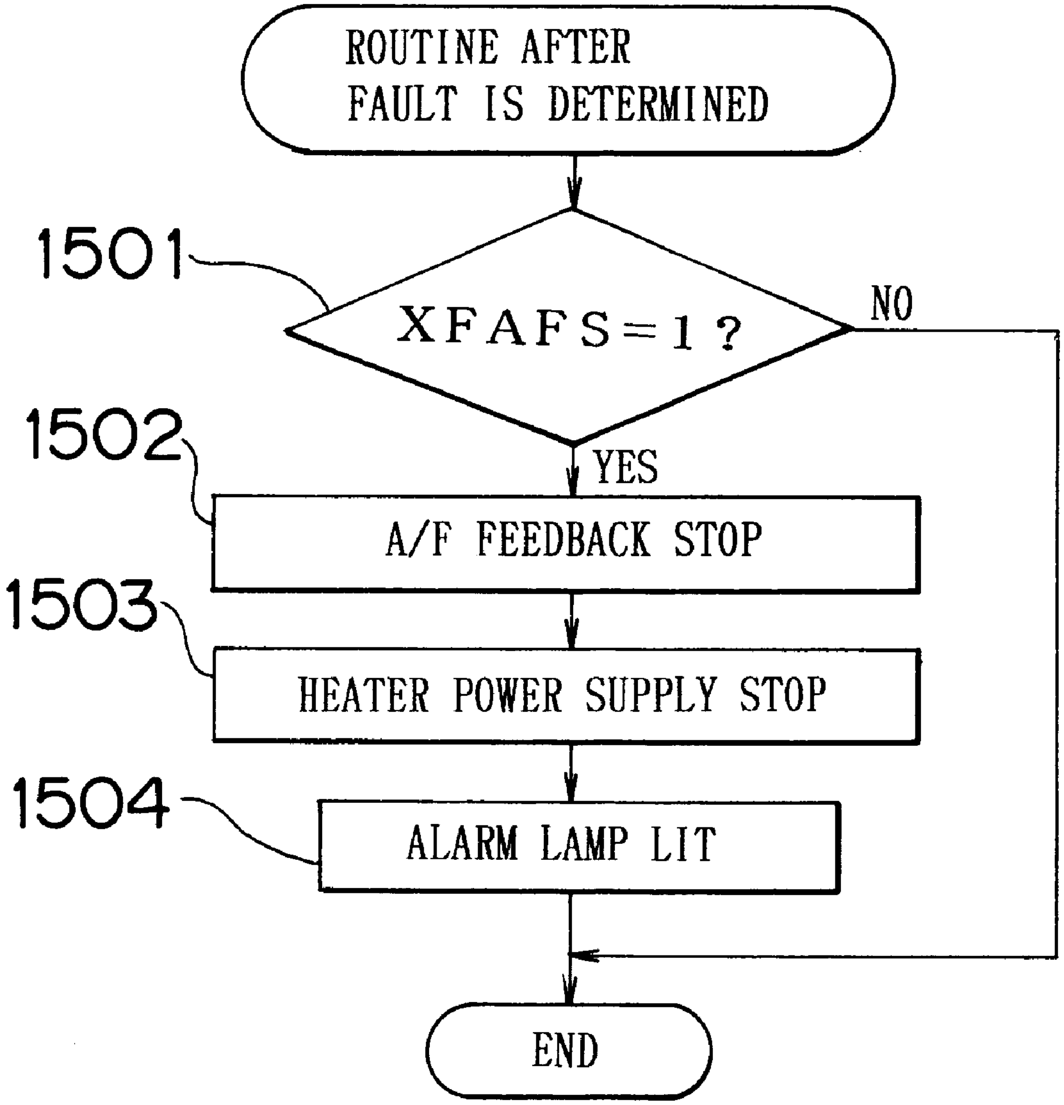
FIG. 15 is a flow chart showing processing routine after a fault of the air-fuel ratio sensor is determined.

FIG. 15 is a flow chart of a processing routine after air-fuel ratio sensor fault determination. This routine is carried at a predetermined cycle, for example, every 1 msec. At step 1501, it is determined whether or not the air-fuel ratio sensor fault flag is posted. If XFAFS=1, it is determined that the air-fuel ratio sensor is in trouble and therefore the processing proceeds to step 1502. At step 1502, the air-fuel ratio feedback is stopped because the exhaust air emission is deteriorated if the air-fuel ratio feedback is continued. At step 1503, the heater is de-energized to prevent over temperature of the heater. At step 1504, an alarm lamp (not shown) is lit. On the other hand, if XFAFS=0 at step 1501, it is determined that the air-fuel ratio sensor is not in trouble and therefore this routine is terminated.

Figures 16, 17:
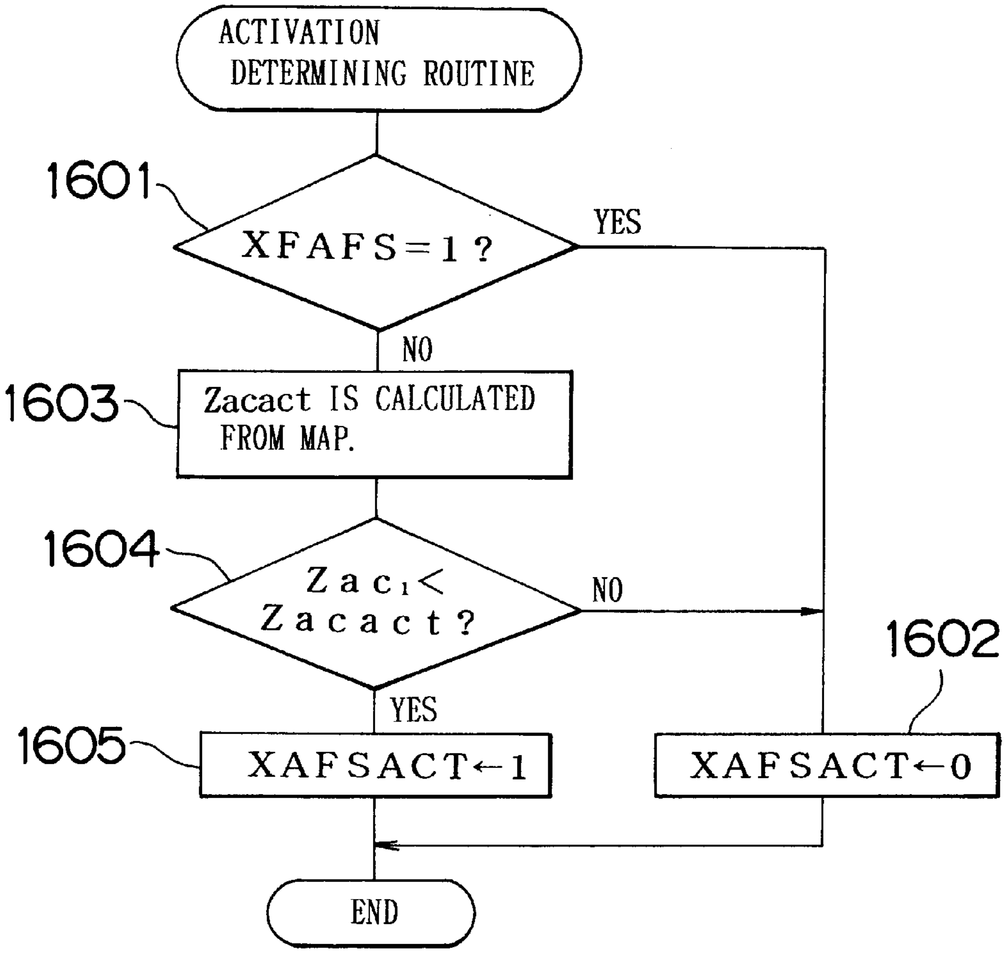
FIG. 16 is a flow chart showing the activation determining routine of the air-fuel ratio sensor.
FIG. 17 is a map showing a relation between the device temperature control target value Zactg and activation determining value Zacact.

FIG. 16 is a flow chart of the activation determining routine for the air-fuel ratio sensor. This routine is carried out at a predetermined cycle, for example, every 1 msec. First at step 1601, it is determined whether or not the air-fuel ratio sensor fault flag is posted. If XFAFS=1 indicating the determination that the device is in trouble, the process proceeds to step 1602. If XFAFS=0 indicating the determination that the device is not in trouble, the process proceeds to step 1603.

At step 1602, the air-fuel ratio activation flag XAFSACT is turned OFF. At step 1603, the activation determining value Zacact is calculated from the device temperature control target value Zactg after the correction of the deterioration according to the map shown in FIG. 17. As shown in FIG. 17, to provide the device temperature control target value with an allowance, namely, to determine activation of the device at a temperature slightly lower than the target temperature, the activation determining value is set to be slightly larger than the device temperature control target value Zactg.

At step 1604, it is determined that whether or not the first impedance Zac1 is smaller than the Zacact. If YES, it is recognized that the air-fuel ratio sensor is activated and then the process proceeds to step 1605. If NO, it is recognized that the air-fuel ratio sensor is not activated and then the process proceeds to step 1602. At step 1605, the air-fuel ratio activation flag XAFSACT is turned ON.

As described above, the aforementioned determination of the activation is carried out by calculating the device temperature control target value Zactg from a difference Zac3 (=Zac2−Zac1) of the device impedance at one frequency and the device impedance at the other frequency, then calculating the activation determining value Zacact from the Zactg, and comparing Zacact with the first impedance Zac1, as the device impedance Zac1 at the high frequency.

Figure 18:
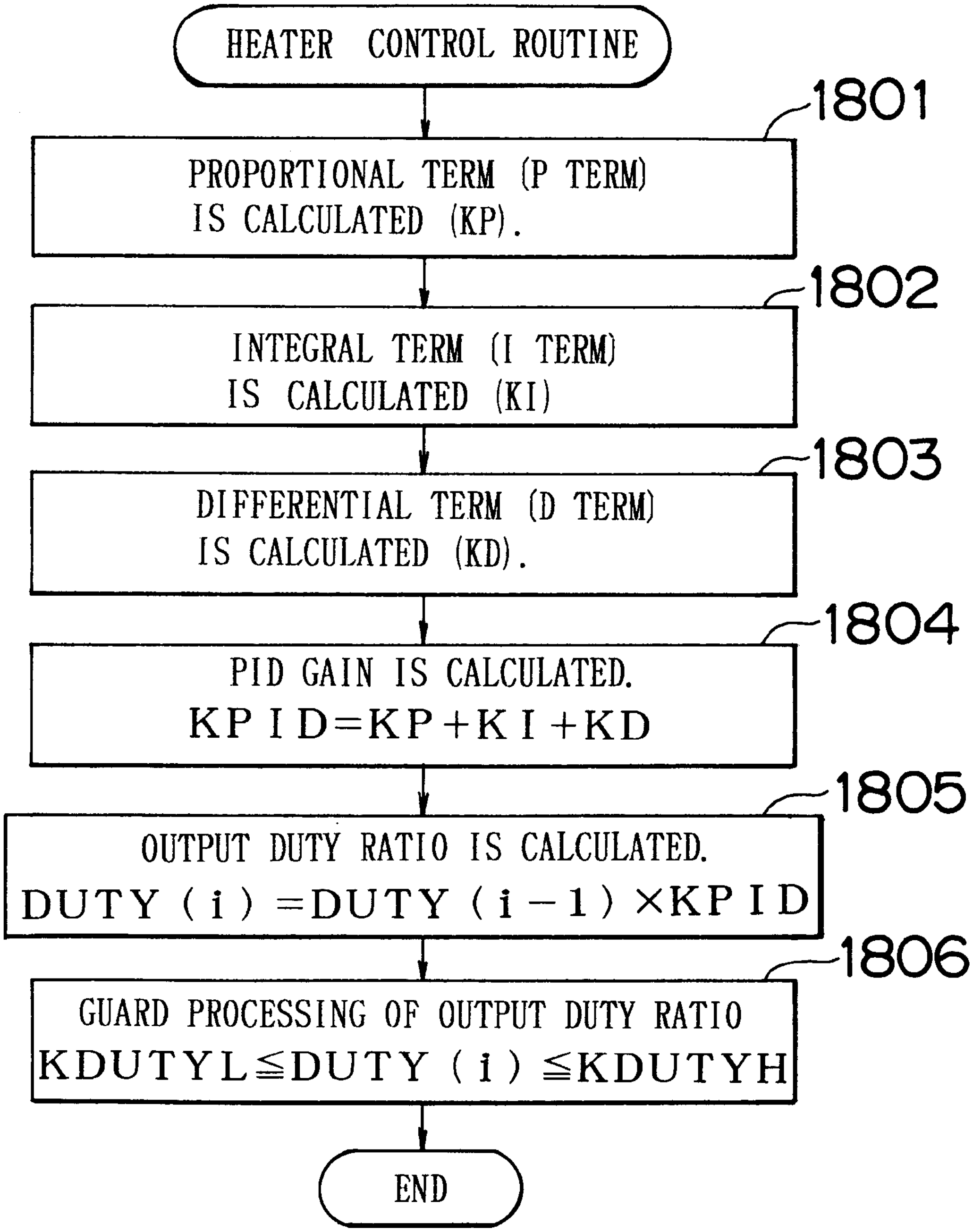
FIG. 18 is a flow chart representing the heater control routine.
Figure 19:
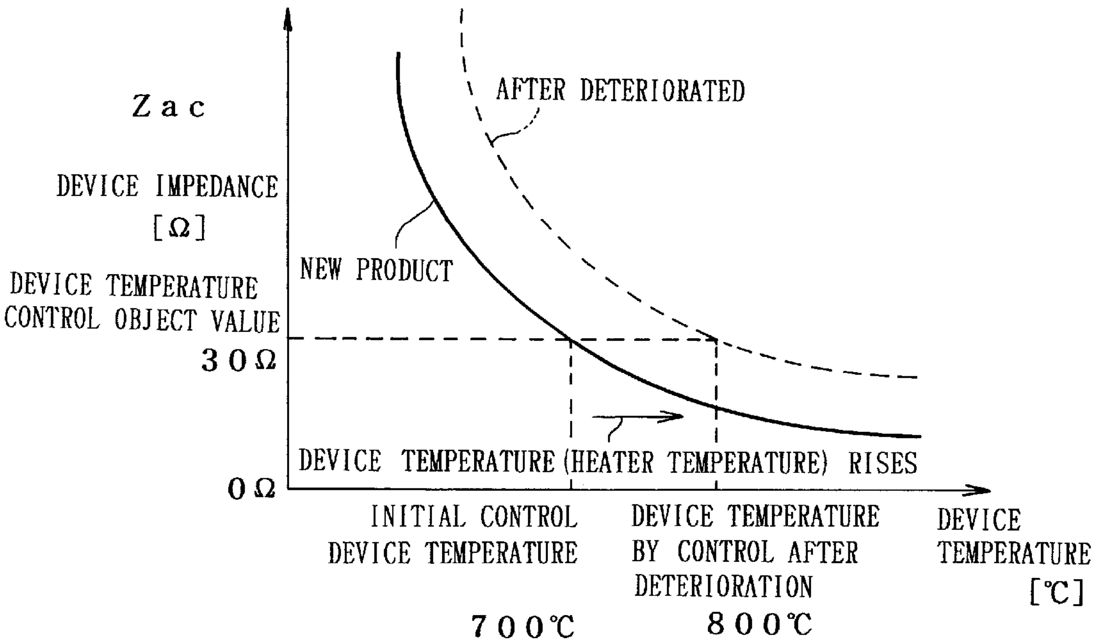
FIG. 19 is a diagram showing a correlation between the temperature of the oxygen concentration detecting device and impedance.
Figure 20A:
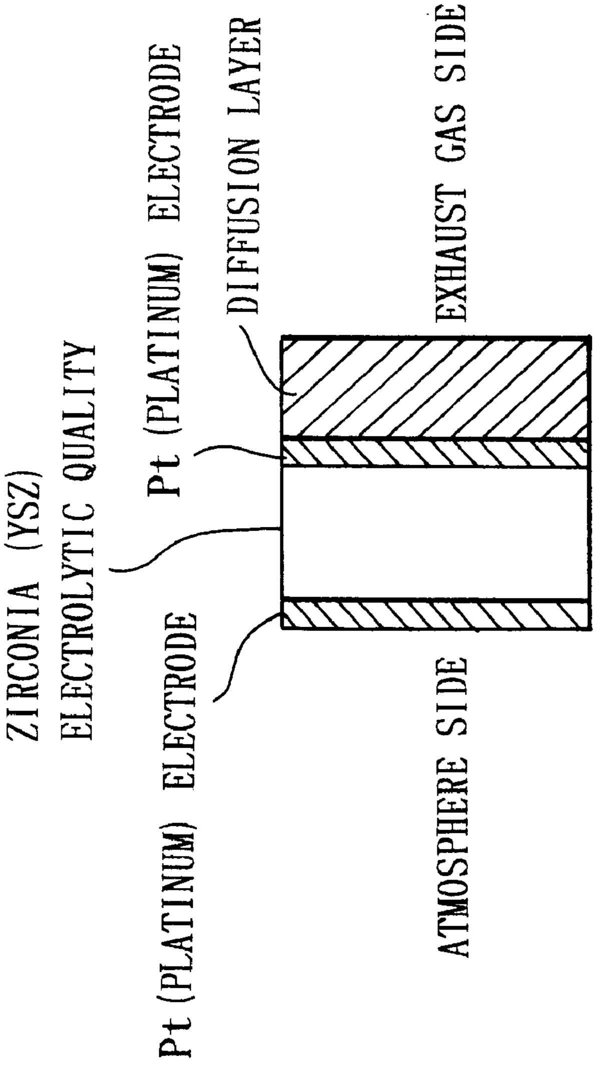
FIG. 20A is a sectional view thereof.
Figure 20B:
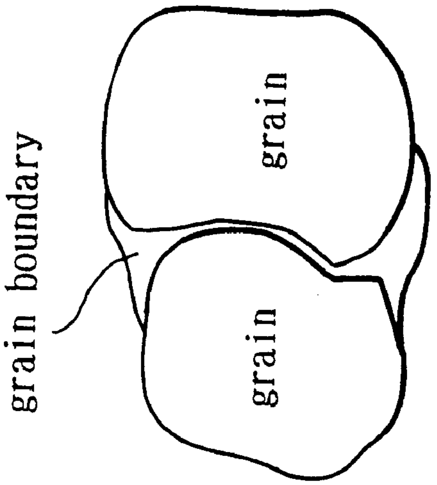
FIG. 20B is a partially enlarged view of the electrolyte.

FIG. 18 is a flow chart of the heater control routine. This routine is carried out at a predetermined cycle, for example, every 128 msec. In this routine, the PID control on the duty ratio of energizing the heater 4 is carried out based on the deviation Zacerr (=Zactg−Zac1) of the impedance Zac1 of the air-fuel ratio sensor 1 to the high frequency from the device temperature control target value Zactg. First at step 1801, a proportional term KP is calculated in the following formula.

$$KP = \text{Zacerr} \times K1 \; (K1\text{: constant})$$

At step 1802, an integral term K1 is calculated in the following formula.

$$K1 = \text{Zacerr} \times K2 \; (K2\text{: constant})$$

At step 1803, differential term KD is calculated in the following formula.

$$KD = (\text{Zacerr}/t) \times K3 \; (K3\text{: constant})$$

At step 1804, PID gain KPID is calculated from the following formula.

$$KPID = KP + K1 + KD$$

At step 1805, output duty ratio is calculated in the following formula.

$$DUTY(i) = DUTY(i-1) \times KPID$$

At step 1806, the guard processing of the output duty ratio DUTY (i) is carried out to incorporate the DUTY (i) in the ratio between the lower limit value KDUTYL and the upper limit value KDUTYH, i.e., KDUTYL≦DUTY(i)≦KDUTYH. More specifically, if KDUTYL≦DUTY(i)≦KDUTYH, the relation is kept unchanged. If DUTY(I)<KDUTYL, DUTY(i)=KDUTYL is established. If KDUTYH<DUTY(i), DUTY(i)=KDUTYH is established for the processing.

In the heater control shown in FIG. 18 according to the present invention, in order to prevent the over temperature of the heater 4 and the sensor device 2, it is determined whether or not the air-fuel ratio impedance Zac1 to the high frequency exceeds the device temperature control target value Zactg after the correction of the deterioration by a predetermined value, for example, 5Ω(Zac1<Zactg−5(Ω)). If YES, it is recognized normal, that is, each temperature of the heater 4 and sensor device 2 does not rise to excessive temperature. Then the heater control routine shown in the flow chart of FIG. 18 is executed. If NO, it is recognized abnormal, that is, each temperature of the heater 4 and sensor device 2 rises to excessive temperature. Then the processing for setting DUTY (i)=0 is executed. Here, the device temperature control target value Zactg is calculated from the difference Zac3 (=ZaC2−Zac1) between the device impedance at one frequency and the device impedance at the other frequency.

Figure 21:
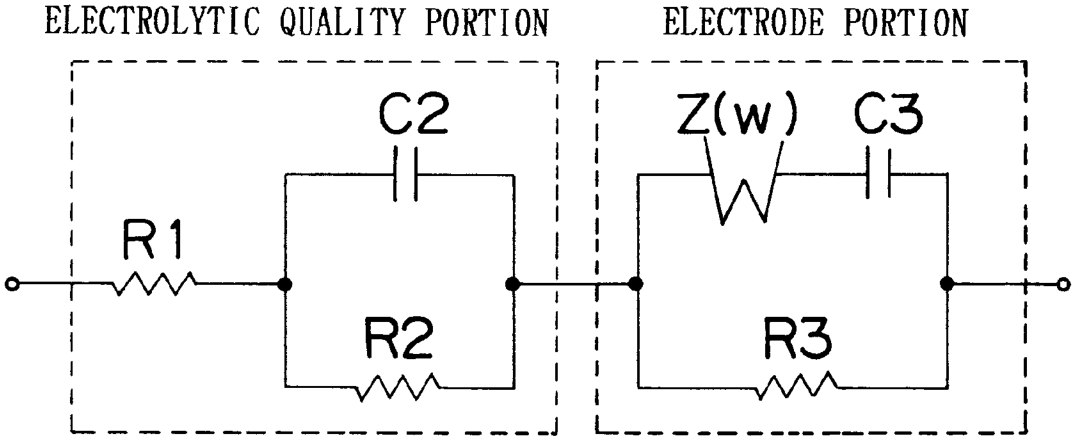
FIG. 21 is a diagram showing an equivalent circuit of the air-fuel ratio sensor device.

Although in the above described embodiments, 5 KHz and 500 KHz are used as the first frequency and second frequency respectively, the present invention is not restricted to this example. These frequencies may be selected appropriately considering the electrolyte of the air-fuel ratio sensor, material of the electrodes and the like, characteristic of the sensor circuit, application voltage, ambient temperature. As the first frequency, the frequency allowing the alternating impedance of R1(bulk resistance of electrolyte)+R2 (grain boundary resistance of electrolyte) in FIG. 21, for example, the one ranging from about 1 KHz to 10 KHz may be used. As the second frequency, any frequency can be used as far as it is lower than the first frequency and capable of detecting an impedance up to R1+R2+R3 (electrode interface resistance).

Although in the above embodiments, the example using only two frequencies is described, it is permissible to apply alternating voltages of a plurality of, for example, three or more frequencies and detect an impedance from the detected plural sensor output voltages and current values. Of course, it is permissible to use a method of selecting optimum two from plural impedances or a statistical method based on plural impedances, for example, of calculating an impedance from the average value.

Next, other embodiment in which the LPF filter constant is switched between the first (high frequency) and second (low frequency) will be described in detail.

Figure 24:
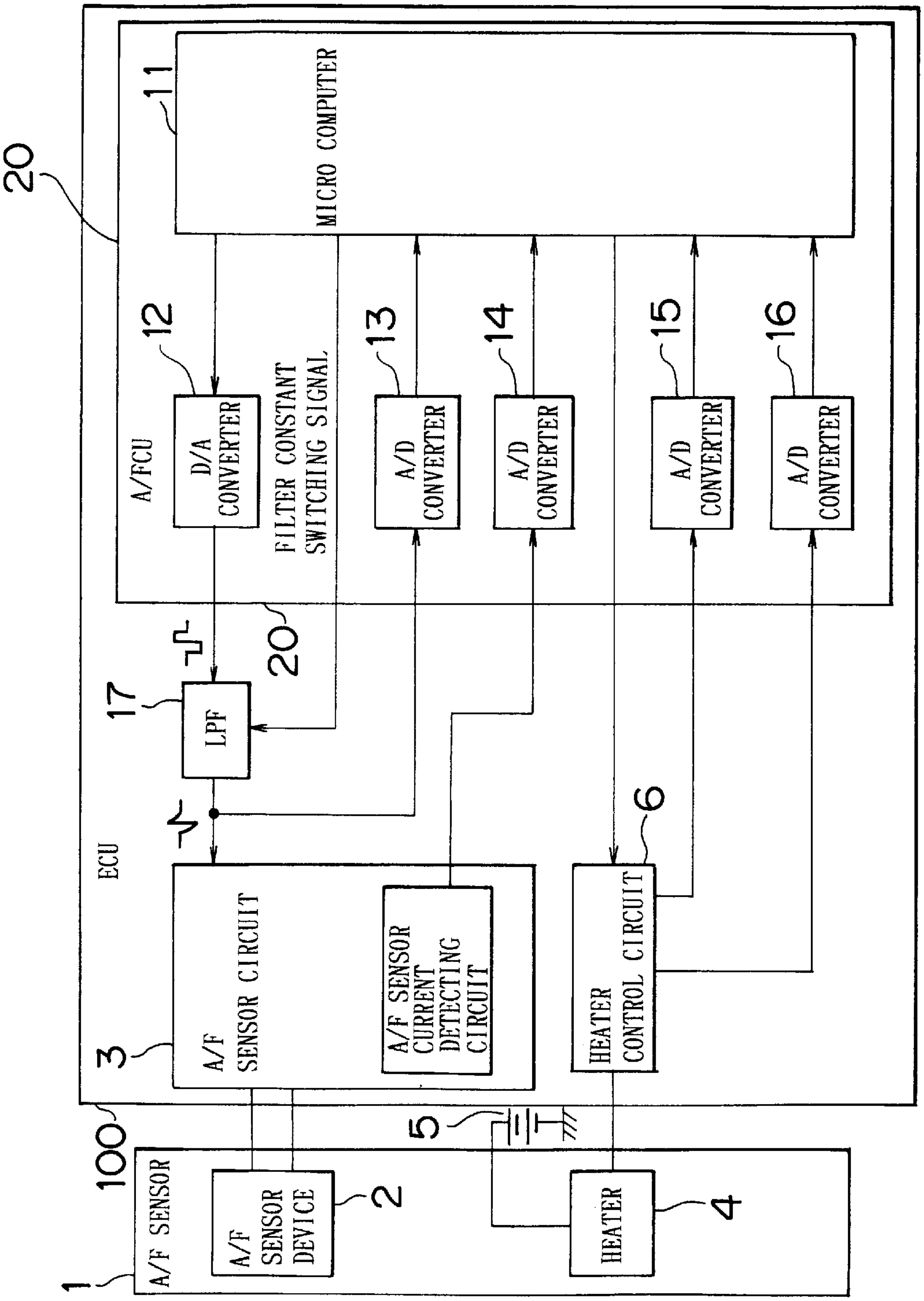
FIG. 24 is a block diagram of other embodiment of the control device for the air-fuel ratio sensor according to the present invention shown in FIG. 1.

FIG. 24 is a block structure drawing of other embodiment of the air-fuel ratio control unit of the present invention shown in FIG. 1. The air to fuel sensor control unit shown in FIG. 24 is different from the air-fuel ratio sensor control unit shown in FIG. 1 in that the LPF 17 capable of switching the filter constant is provided in place of the LPF 7 in FIG. 1 and a micro computer 11 is provided for executing the following processing to detect an impedance with high accuracy from the voltage and current of the sensor device in response to switching of the filter constant. Further, the air-fuel ratio control unit (A/FCU) 10 is indicated in a state where the D/A converter and A/D converter for the air-fuel ratio sensor circuit 3 and heater control circuit 6 are provided internally. In the air-fuel ratio control unit (A/FCU) 20, the micro computer 11 of the A/FCU 10 of FIG. 1 is shown in a state where the micro computer 1 1, D/A converter 12 and A/D converters 13–16 are separately provided.

Figure 25:
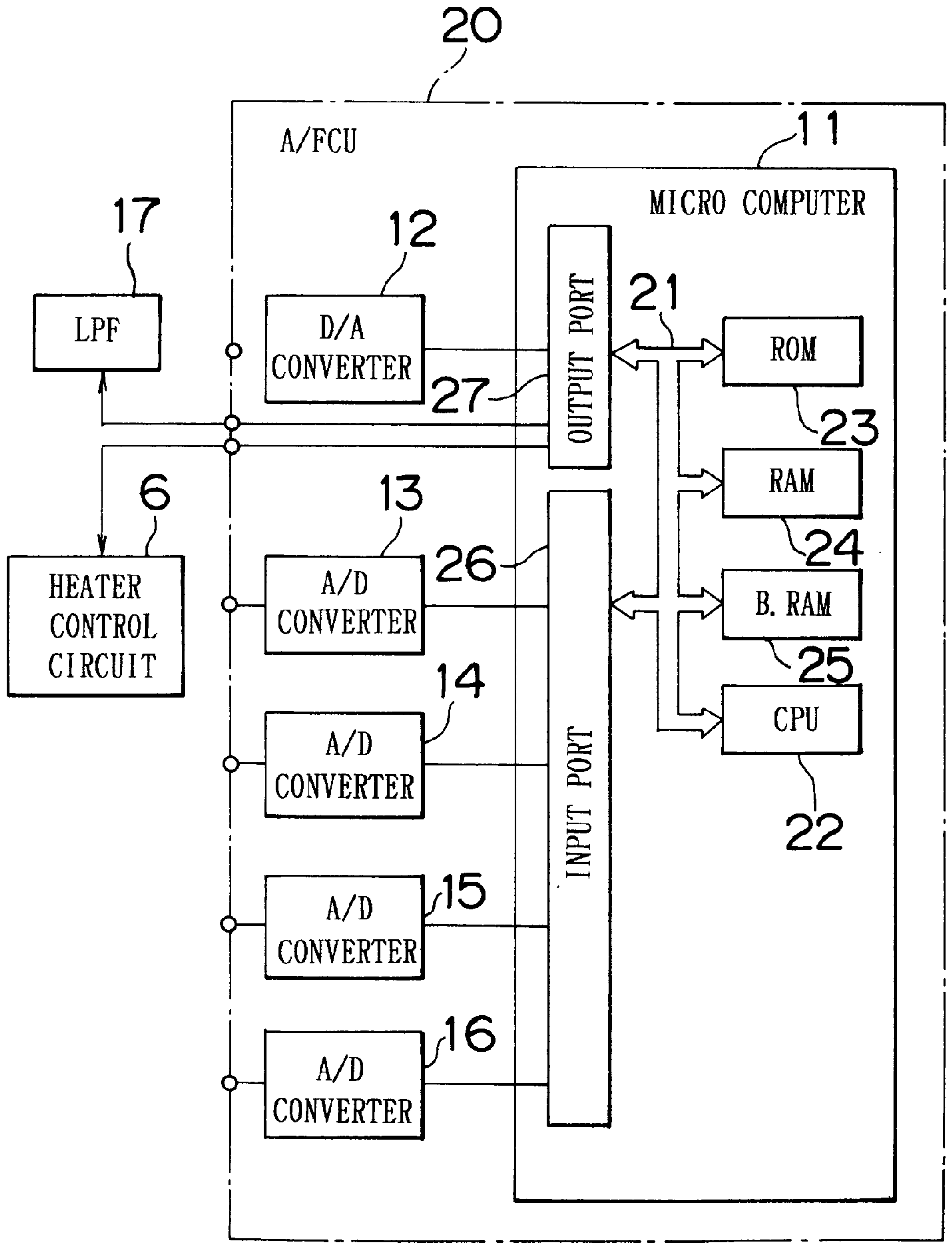
FIG. 25 is an explanatory diagram of the air-fuel ratio control unit 20 of FIG. 24.

FIG. 25 is an explanatory view of the air-fuel ratio control unit 20 of FIG. 24. This unit will be described with reference to FIGS. 24 and 25. The air-fuel ratio control unit 20 contains a micro computer 11, a D/A converter 12 and an AID converters 13–16. The micro computer 11 includes a CPU 22, a ROM 23, a RAM 24, a battery backup (B), a RAM 25, an input port 26 and an output port 27, which are connected through a bi-directional bus 21, so as to control the air-fuel ratio sensor to be described later. The D/A converter 12 is connected to the output port 27 so as to convert digital data computed by the CPU 22 to analog voltage. The A/D converters 13, 14 are connected to the input port 26 so as to convert analog voltage applied to the sensor circuit 3 and analog voltage proportional to a current detected by the A/F sensor current detecting circuit to digital data, respectively. Likewise the AID converters 15, 16 convert voltage and current of the heater 4 to digital data through the heater control circuit 6. The CPU 22 reads these digital data as the voltage and current of the sensor device 2 and those of the heater 4 respectively. Further, a signal for switching the filter constant is output to the LPF 17 through the output port 27. A DUTY signal for controlling an amount of power supply to the heater 4 is output to the heater control circuit 6 through the output port 27.

Figure 26:
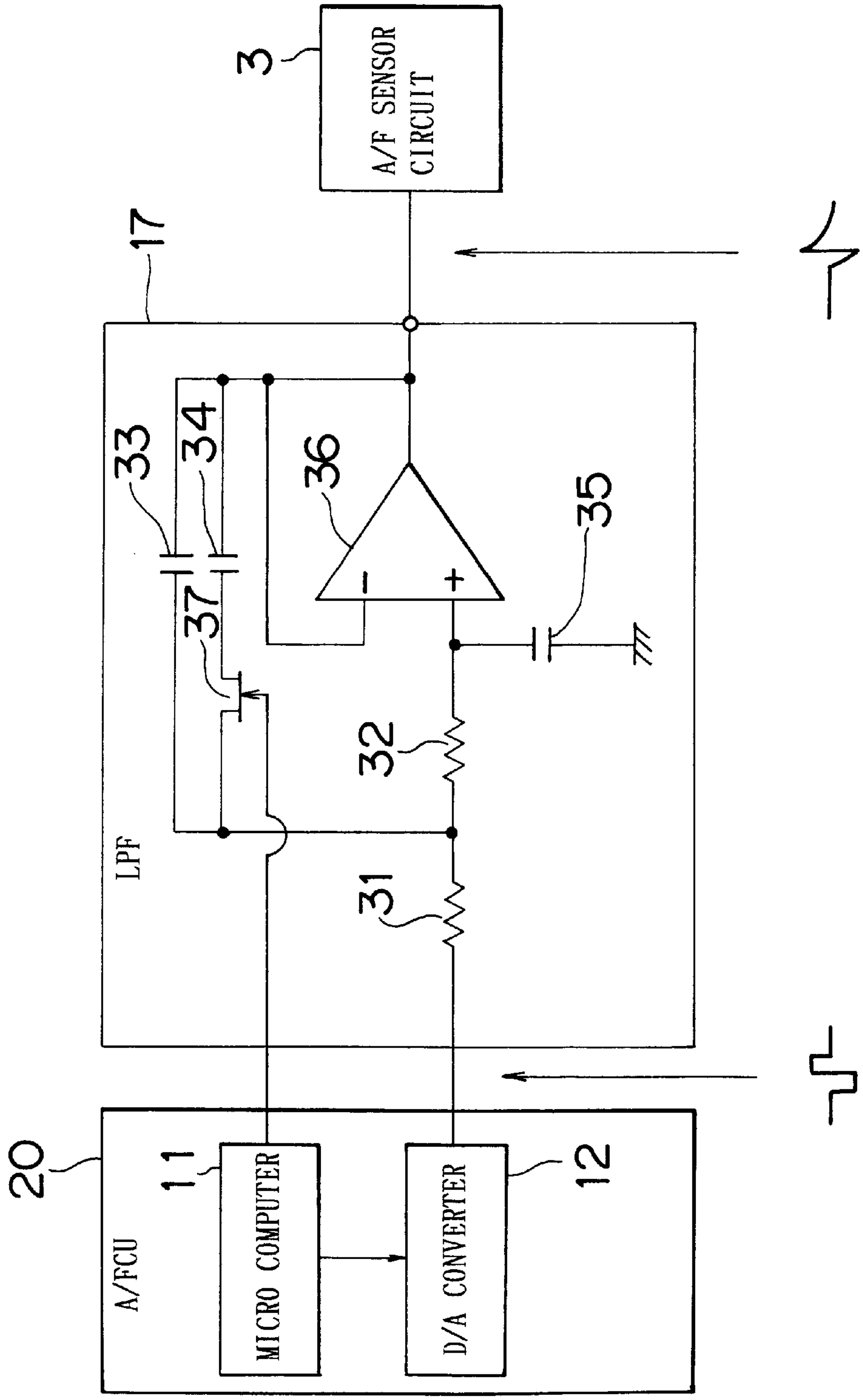
FIG. 26 is an explanatory diagram of the LPF 17 shown in FIG. 24.

FIG. 26 is an explanatory view of the LPF 17 shown in FIG. 24. An instruction for changing an application voltage to the sensor circuit 3 is outputted from the micro computer 11 of the A/FCU 20 and a rectangular pulse is outputted from the D/A converter 12. The LPF 17 receives this signal and outputs a voltage of raw signal in which the high frequency component is removed so as to apply this voltage to the sensor circuit 3. The LPF 17 includes resistors 31, 32, capacitors 33, 34, 35, an operational amplifier (OP amplifier) 36, and a field effect transistor (FET) 37. A signal for turning ON at a low frequency and turning OFF at a high frequency is transmitted from the micro computer 11 to the FET 37. As a result, the filter constant of the LPF 17 is switched such that the time constant is small when a first (high frequency) alternating voltage is applied and small when a second (low frequency) alternating voltage is applied.

Figure 27:
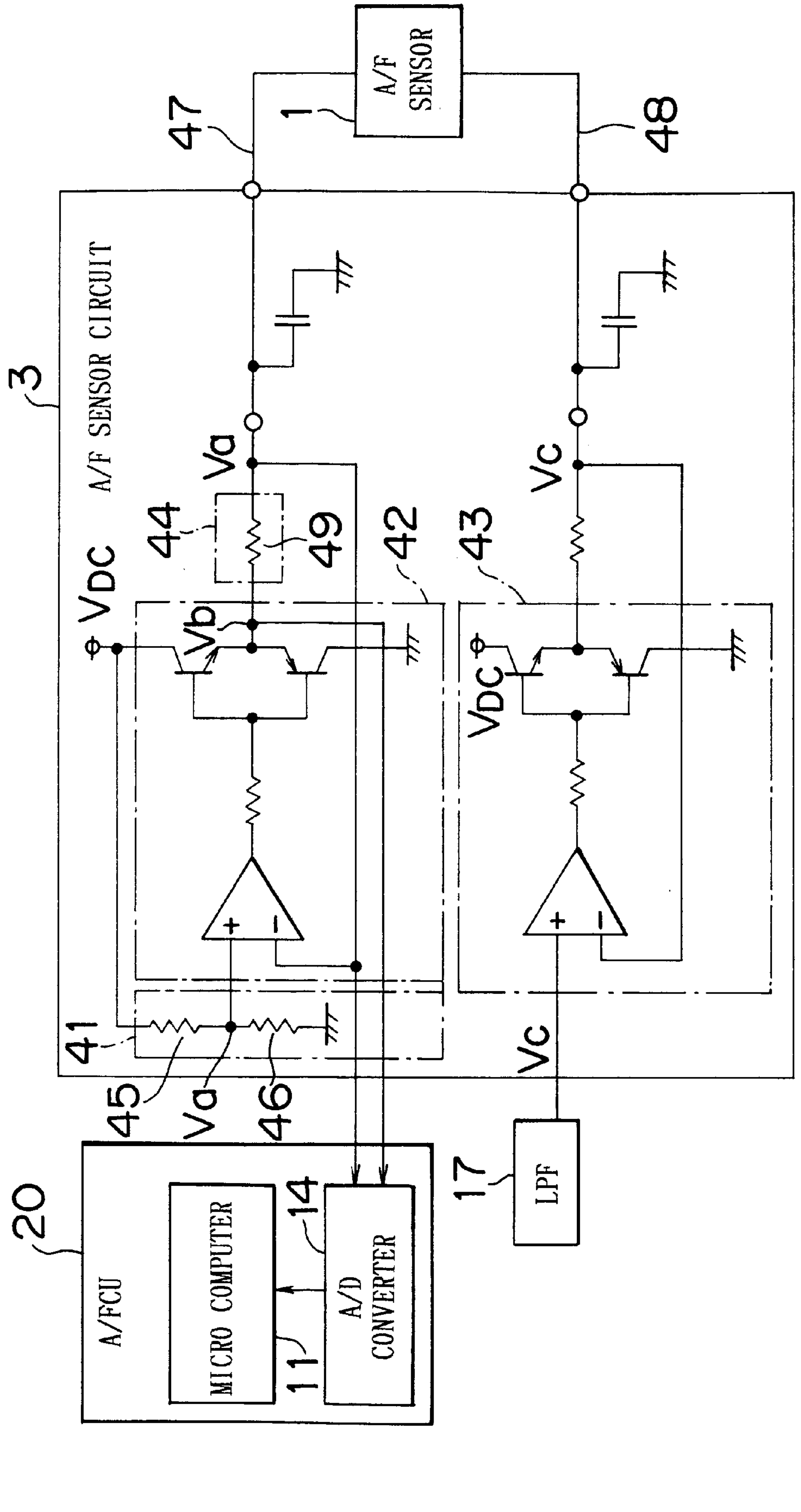
FIG. 27 is an explanatory diagram of the air-fuel ratio sensor circuit 3 shown in FIG. 24.

FIG. 27 is an explanatory diagram of the air-fuel ratio sensor circuit 3 of FIG. 24. The sensor circuit 3 includes a reference voltage 41, a first voltage supply circuit 42, a second voltage supply circuit 43 and a current detecting circuit 44. The reference voltage circuit 41 employs a voltage Va produced by dividing the constant voltage VDc by resistors 45, 46, for example, 0.6 V as the reference voltage. The first voltage supply circuit 42 is constituted as a voltage follower and supplies the reference voltage Va to a terminal 47 of the A/F sensor 1. The second voltage supply circuit 43 is connected to the LPF 17, constituted as a voltage follower like the first voltage supply circuit and supplies an output voltage Vc (0.3+0.2(V)) to another terminal 48 of the A/F sensor 1. Although the output voltage Vc of the LPF 17 is usually 0.3 (V), when a device impedance of the A/F sensor is measured by the micro computer 11, ±0.2(V) is superimposed on 0.3 V and output. As a result, the voltage ranging from 0.1 to 0.5 (V) is applied to the A/F sensor. The current detecting circuit 44 is constituted of a resistor 49 and detects a current flowing through the A/F sensor 1 by reading a voltage (Vb-Val) on both ends of the resistor 49 through the A/D converter 13.

Next, the impedance calculation routine for the sensor device in the air-fuel ratio control unit according to the second embodiment of the present invention shown in FIG. 24 will be described in detail.

Figure 28:
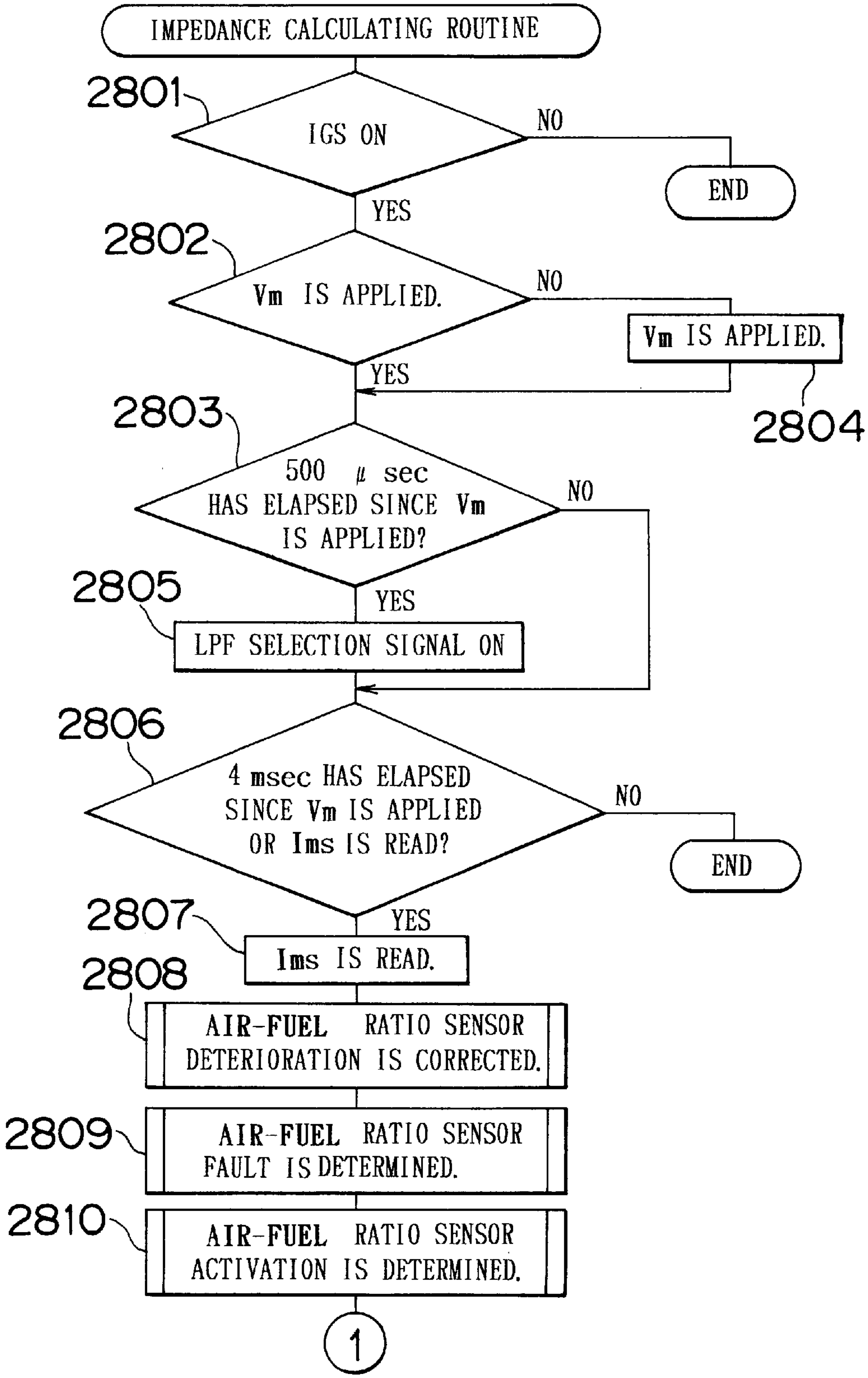
FIG. 28 is a flow chart representing the first half of the first frequency superimposing processing in the impedance calculation routine for the sensor device.
Figure 29:
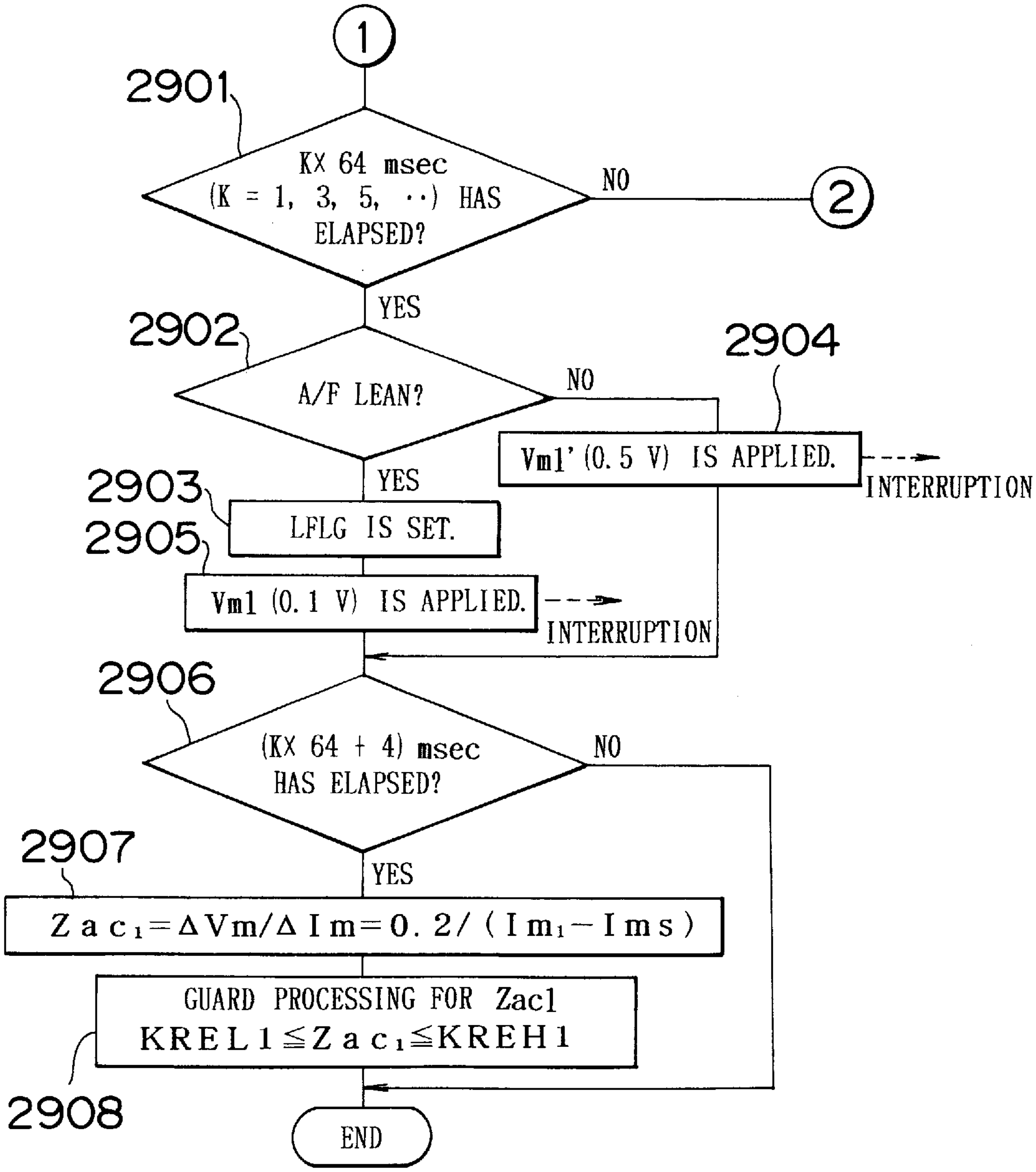
FIG. 29 is a flow chart representing the first frequency superimposing processing in the impedance calculation routine for the sensor device.
Figure 30:
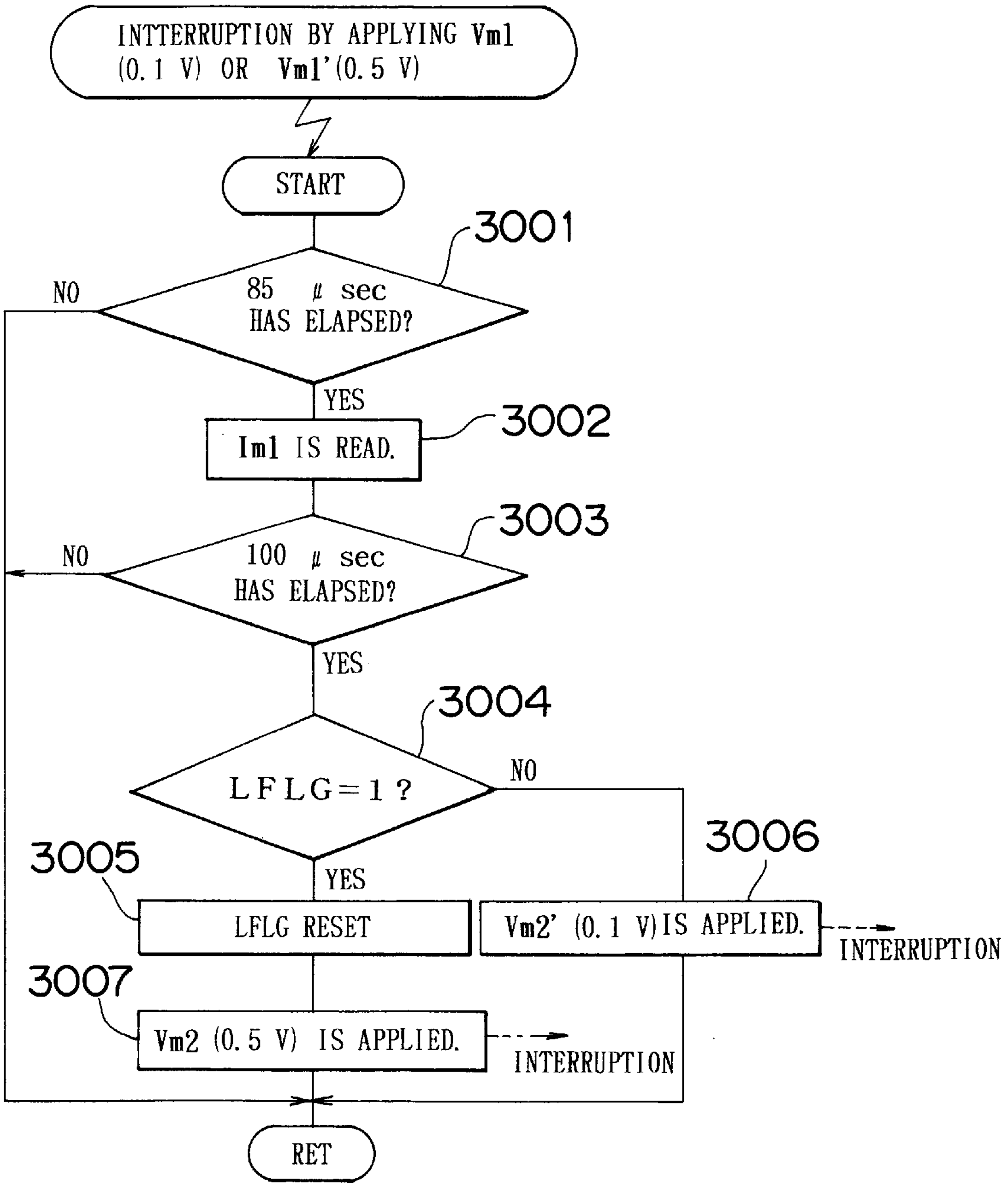
FIG. 30 is a flow chart representing the first interruption processing routine required for executing the first frequency superimposing processing.
Figure 31:
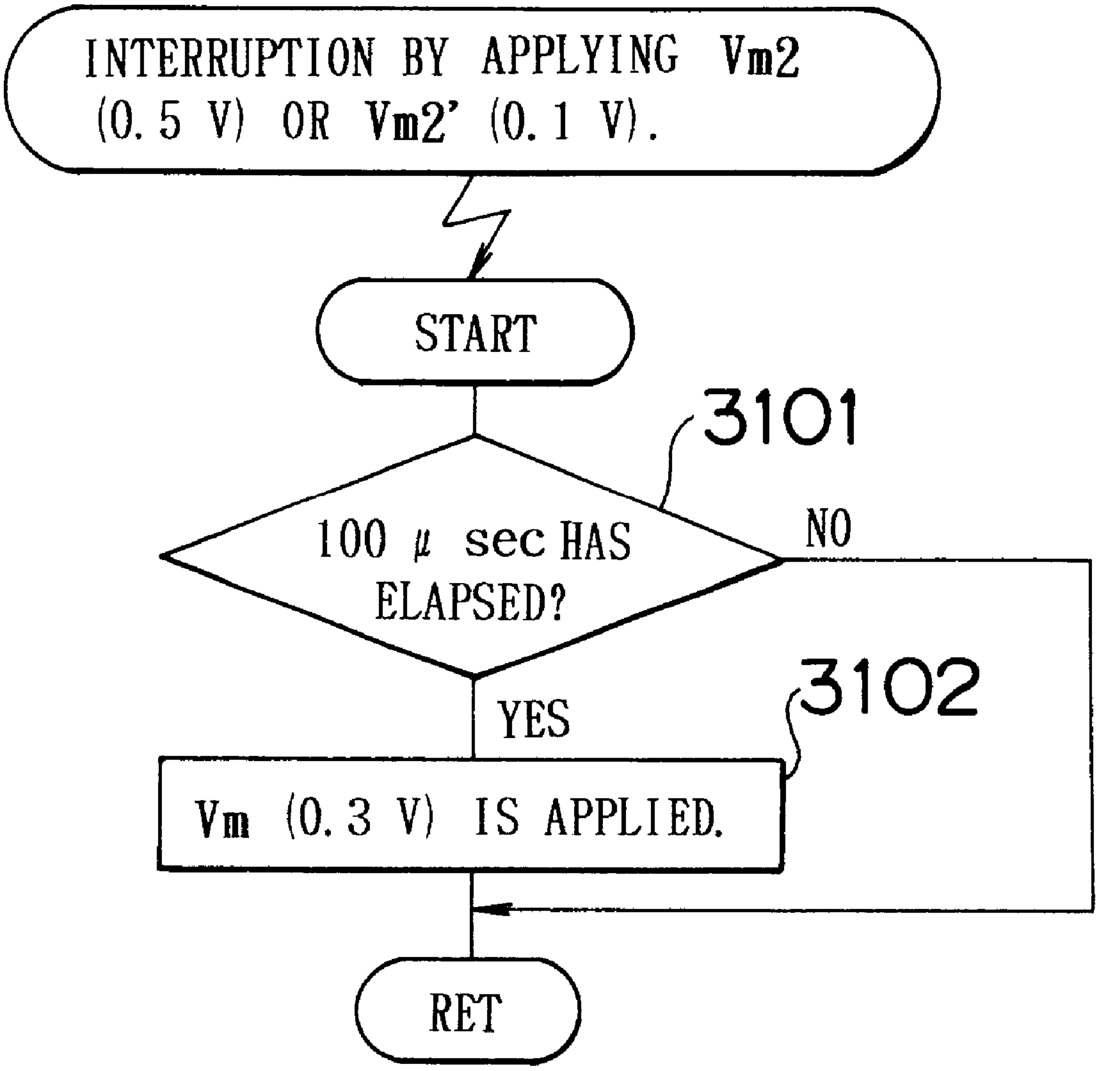
FIG. 31 is a flow chart representing the second interruption processing routine required for executing the first frequency superimposing processing.
Figure 32:
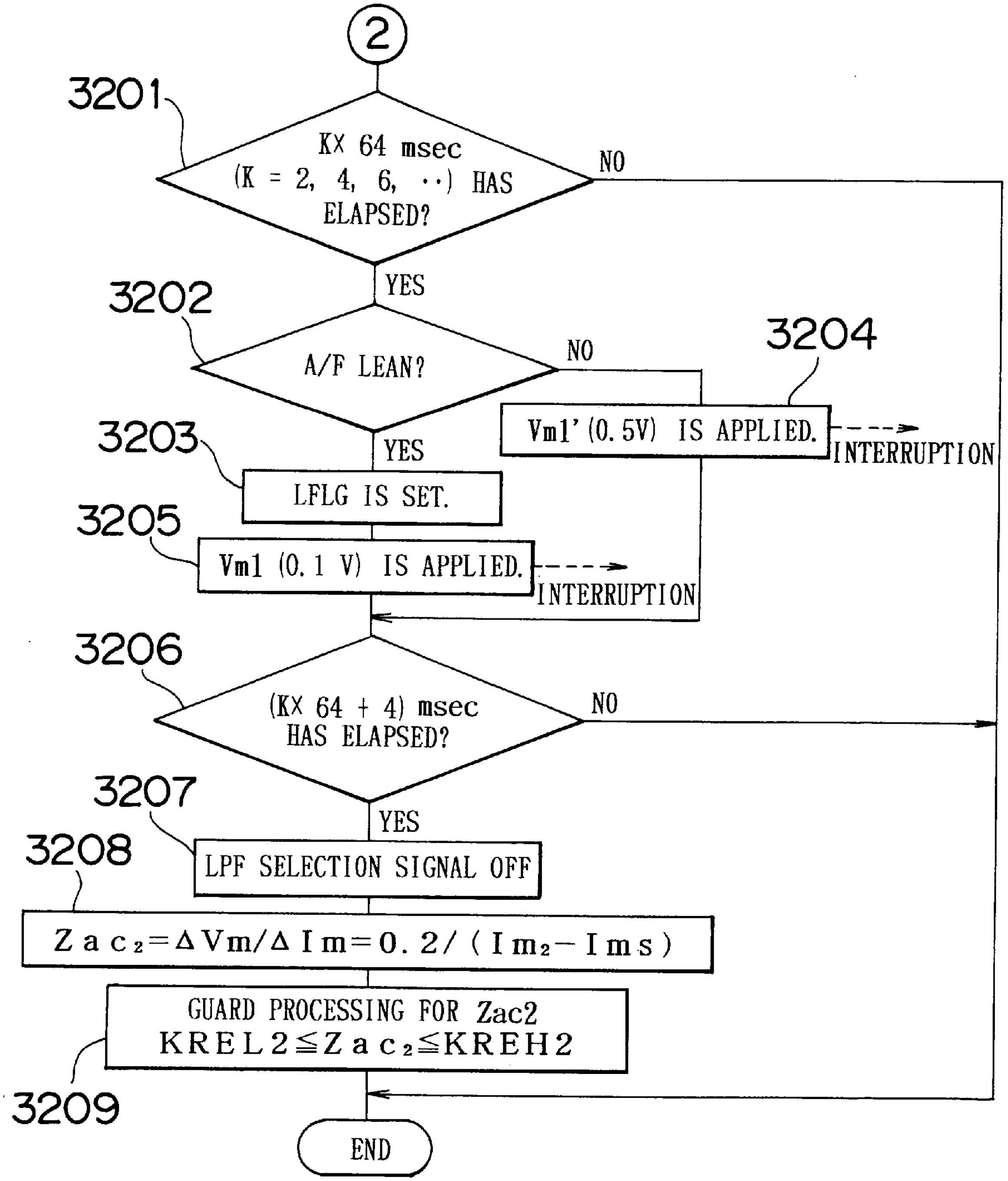
FIG. 32 is a flow chart representing the second frequency superimposing processing in the impedance calculation routine for the sensor device.
Figure 33:
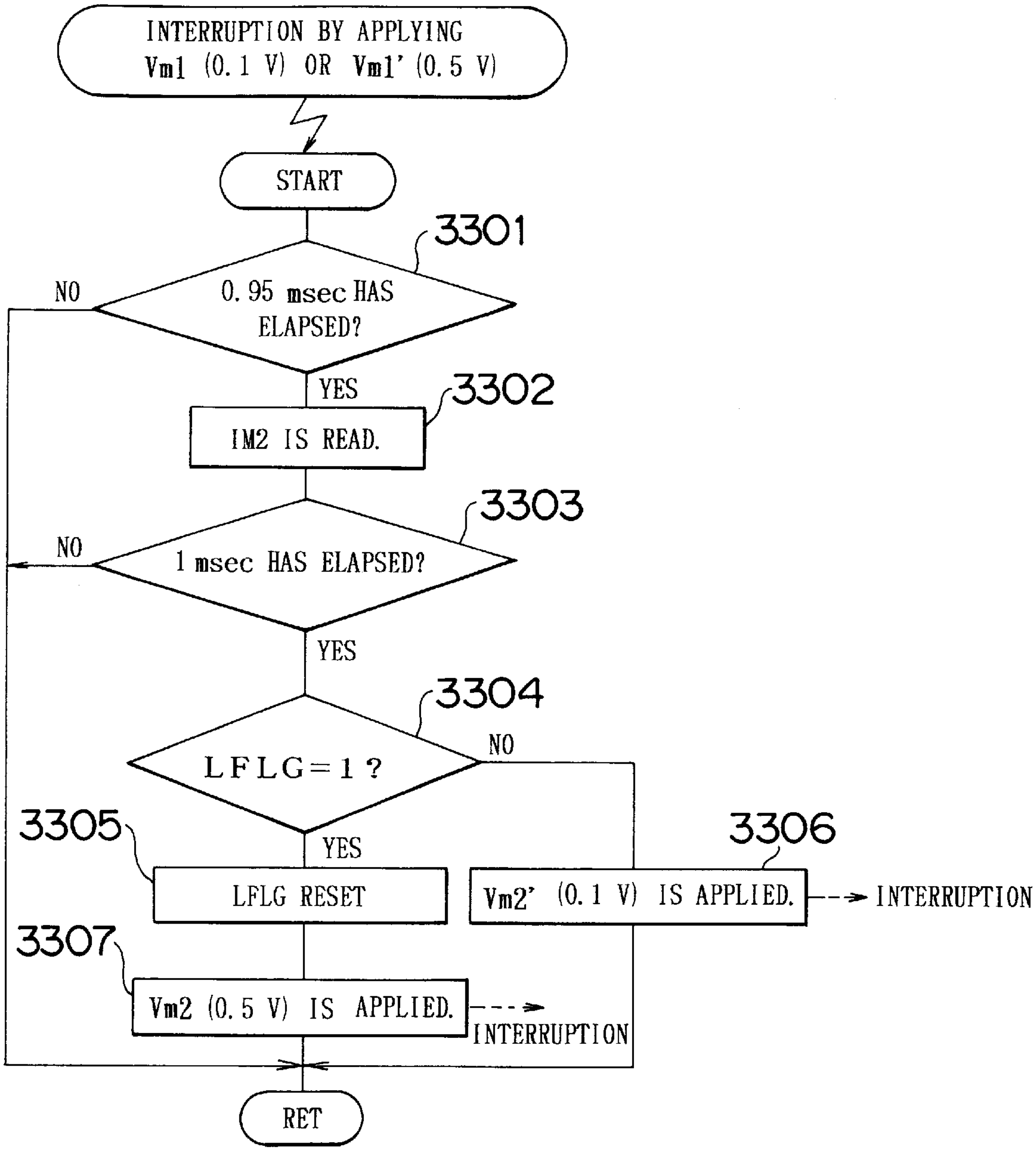
FIG. 33 is a flow chart representing the third interruption processing routine required for executing the second frequency superimposing processing.
Figure 34:
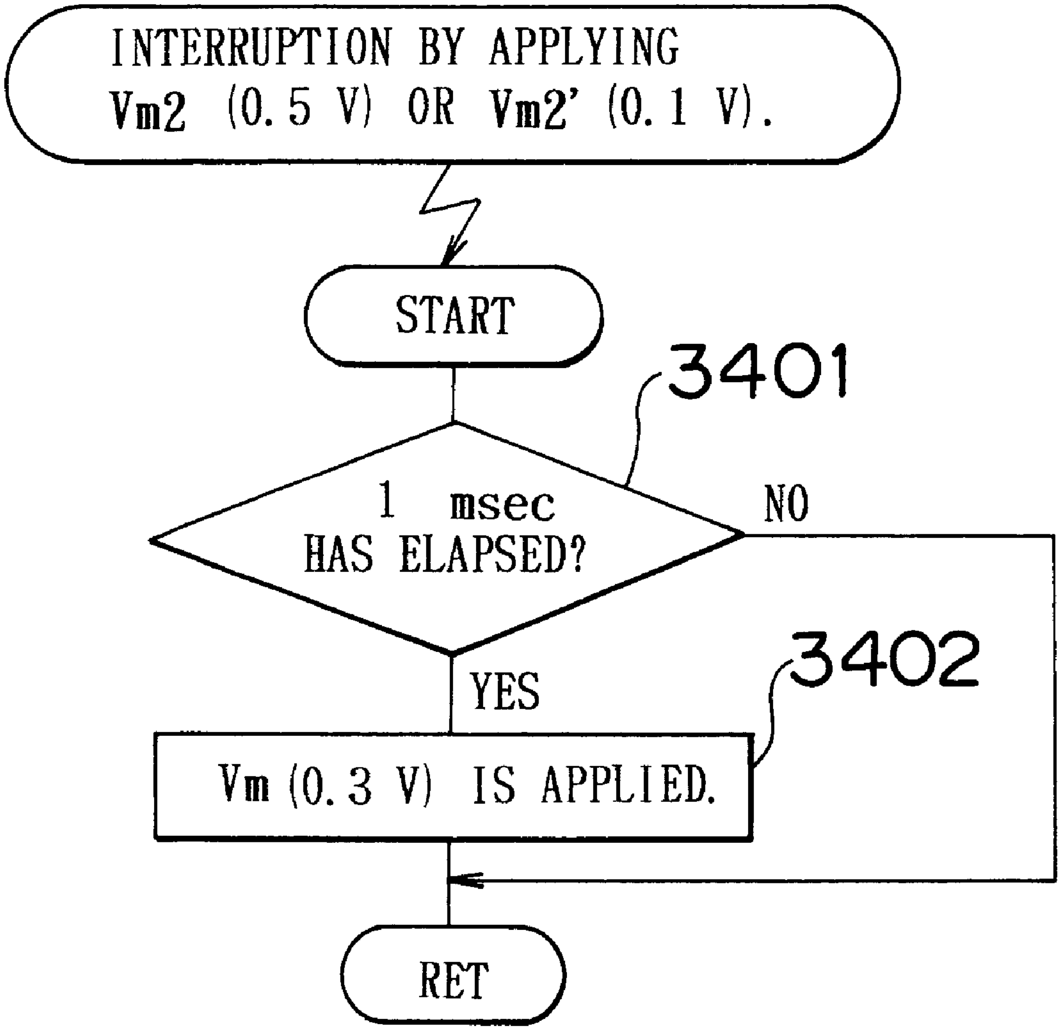
FIG. 34 is a flow chart representing the fourth interruption processing routine required for executing the second frequency superimposing processing.

FIG. 28 is a flow chart of the impedance calculation routine as a former half for the sensor device according to the second embodiment of the present invention and FIGS. 29–34 show the flow chart of the same routine as the latter half thereof. More specifically, FIG. 29 is a flow chart of the first frequency superimposing processing in the impedance calculation routine for the sensor device, FIGS. 30, 31 are flow charts of an interruption processing routine necessary for achieving the first frequency superimposing processing, FIG. 32 is a flow chart of the second frequency superimposing processing in the impedance calculation routine for the sensor device, and FIGS. 33, 34 are flow charts of the interruption processing routine necessary for achieving the second frequency superimposing processing. A routine shown in FIGS. 28, 29, 32 is carried out at a predetermined cycle, for example every 100 μsec.

Figure 35:
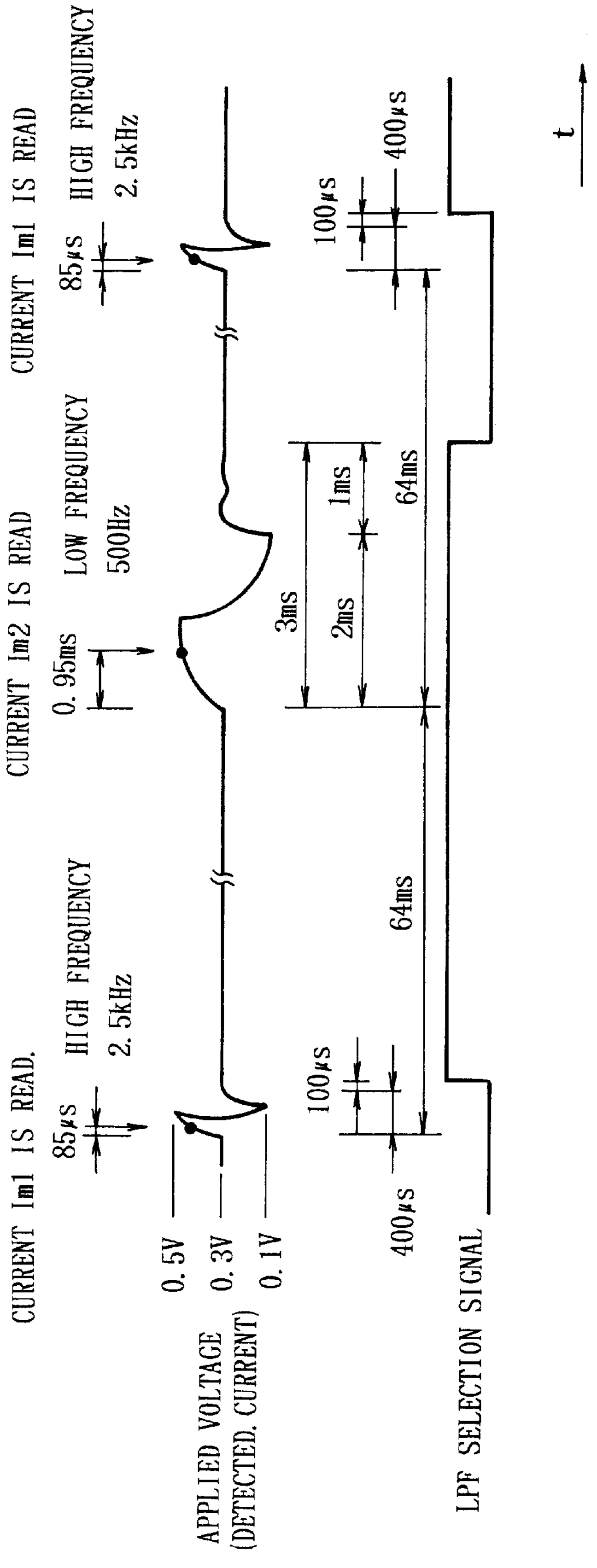
FIG. 35 is a timing chart explaining the impedance calculation routine for the sensor device according to the second embodiment of the present invention.

FIG. 35 is a timing chart for explaining the impedance calculation routine for the sensor device according to the second embodiment of the present invention. The abscissa indicates time. Its upper row indicates an application voltage to the sensor device 2 and its lower row indicates ON/OFF state of the LPF selection signal for switching the setting of the filter constant of the LPF 17. A change of the current flowing in the sensor device 2 is substantially the same as the change of the application voltage. The calculation of the impedance of the sensor device 2 according to the second embodiment shown in the timing chart of FIG. 35 is carried out in the following manner. Usually, the direct current of 0.3 V is applied between electrodes of the sensor device 2. The first frequency (high frequency), for example, 2.5 KHz high frequency pulse is applied to the sensor device 2 at every 128 msec and then the first frequency (low frequency), for example 500 Hz low frequency pulse is applied to the sensor device 2 each time when 64 msec elapse after application of the high frequency pulse. The first (high frequency) impedance Zac1 detects a current Im1 flowing in the sensor device 2 after application of the high frequency pulse is applied, for example, 85 s pass, so as to make the following calculation according to an increment Vm (0.3−0.1=0.2 (V)) of the sensor device application voltage and current increment Im (Im−Ims). Zac1=Vm/Im=0.2/(Im1−Ims) where Ims is a limit current of the sensor device detected every 4 msec.

The second (low frequency) impedance Zac2 detects a current Im2 flowing in the sensor device after the low frequency is applied, for example, elapse of 0.95 msec, so as to make the following calculation according to an increment Vm (0.3–0.1=0.2 (V)) in the sensor device application voltage and a current increment Im (Im2–Ims). Zac2=Vm/Im=0.2/(Im2–Ims)

As for the LPF selection signal ON/OFF timing, this signal is turned ON after the high frequency pulse is applied, for example, elapse of 500 μs and turned OFF after elapse of 3 msec after application of the low frequency pulse, which is carried out 64 msec after application of the high frequency pulse. In the low frequency pulse application interval including a period of 2 msec of the low frequency pulse and its converging time 1 msec, the filter constant assumes a large value.

The impedance calculation routine for the sensor device based on the above timing chart will be described with reference to FIGS. 28–34.

In the flow chart shown in FIG. 28, as compared with the flow chart shown in FIG. 4, the steps 401, 402, 403, 404 and 405–408 of FIG. 4 are substantially corresponding to steps 2801, 2802, 2804, 2806 and 2807–2810 of FIG. 28 and the same processing is carried out therein. Therefore, the description thereof is omitted and only the steps 2803, 2805 which are added to the flow chart of FIG. 4 will be described.

At step 2803, it is determined whether or not 500 μs has been elapsed after application of Vm. If YES, the process proceeds to step 2805, and if NO, the process proceeds to step 2806. At step 2805, a selection signal for increasing the filter constant is output from the micro computer 11 to the LPF 17.

A flow chart shown in FIGS. 29, 30 concerns a processing for maintaining the output of the A/F sensor 1 in the dynamic range shown in FIG. 3. In this processing, by maintaining the output of the A/F sensor in the dynamic range, the limit current of the sensor device can be always detected. Thus, the voltage to be applied to the sensor device 2 in accordance with the air-fuel ratio of the engine is applied from the negative side (step 2905) to the positive side (step 3007) when the A/F is lean and then from the positive side (step 2904) to the negative side (step 3006) when the A/F is stoichiometric or rich. Next, flow charts shown in FIGS. 29, 30 will be explained separately.

In the flow chart shown in FIG. 29, as compared with the flow chart shown in FIG. 5, the steps 501, 503–505 of FIG. 5 are substantially corresponding to steps 2901, 2906–2908 of FIG. 29 and the same processing is carried therein. Therefore, the description thereof is omitted. Therefore, only the steps 2902–2904 added to the flow chart of FIG. 5 and modified step 2905 will be explained.

At step 2902, it is determined whether or not the air-fuel ratio (A/F) is lean (stoichiometric or rich) in accordance with the output of the air-fuel ratio sensor 1. If it is determined that the A/F is lean, the process proceeds to step 2903 where the lean determining flag LFLG is set to 1 and the process proceeds to step 2905. At step 2902, if it is determined that the A/F is stoichiometric or rich, the process proceeds to step 2904 where Vm1' is applied to the air to fuel sensor 1. At step 2905, Vm1=0.1 V is applied to the air-fuel ratio sensor 1.

In the flow chart shown in FIG. 30, as compared with the flow chart shown in FIG. 6, steps 601–603, 604 of FIG. 6 are substantially corresponding to steps 3001–3003, 3007 of FIG. 30 and the same processing is carried out. Therefore, the description thereof is omitted and only the steps 3004–3006 added to the flow chart of FIG. 6 will be described.

At step 3004, it is determined whether or not the lean determining flag LFLLG is set at step 2903 of FIG. 29. If it is determined that LFLG=1, the process proceeds to step 3005 where the lean determining flag LFLG is reset to 0 and the process proceeds to step 3007. If it is determined that LFLG=0 at step 3004, the process proceeds to step 3006 where Vm2'=0.1 V is applied to the air to fuel sensor 1. At step 3007, Vm2=0.5 V is applied to the air-fuel ratio sensor 1.

The flow chart shown in FIG. 31 is substantially the same as the flow chart shown in FIG. 7. The steps 701, 702 of FIG. 7 corresponds to steps 3101,3102 of FIG. 31 and the same processing is carried out. Therefore, the description thereof is omitted.

The flow charts shown in FIGS. 32, 33 concern a processing for maintaining the output of the A/F sensor 1 in a dynamic range shown in FIG. 3. This processing intends to allow detection of the limit current in the sensor device 2 by maintaining the output of the air-fuel ratio sensor 1 in the dynamic range. Thus, the voltage to be applied to the air-fuel ratio sensor 1 depending on the air-fuel ratio of the engine is applied from the negative side (step 3205) to the positive side (step 3307) when the A/F is lean and applied from the positive side (step 3204) to the negative side (step 3306) when the A/F is stoichiometric or rich. Then, the flow charts of FIGS. 32, 33 will be described separately.

In the flow chart shown in FIG. 32, as compared with the flow chart shown in FIG. 8, the steps 801, 802, 804, 805 of FIG. 8 are substantially corresponding to steps 3201, 3205, 3208, 3209 of FIG. 32 and the same processing is carried out. Therefore, the description thereof is omitted and only the steps 3202, 3204, 3206 and 3207 added to the flow chart of FIG. 8 will be described.

At step 3202, it is determined whether or not the air-fuel ratio (A/F) is lean (stoichiometric or rich) in accordance with the output of the air-fuel ratio sensor 1. If it is determined that the A/F is lean, the process proceeds to step 3203 where the lean determining flag LFLG is set to 1 and then the process proceeds to step 3205. If it is determined that the A/F is stoichiometric or rich at step 3202, the process proceeds to step 3204 where Vm1'=0.5 V is applied to the air-fuel ratio sensor 1. At step 3205, Vm1=0.1 V is applied to the air-fuel ratio sensor 1.

At step 3206, it is determined whether or not this processing cycle has been elapsed for (k×64+4) (k: even number, 2, 4, 6, . . . ) msec since this routine is started, and if YES, the process proceeds to step 3207. If NO, this routine is terminated. The time 3 msec in FIG. 35 represents the time obtained by adding a pulse converging time 1 msec to the low frequency pulse cycle 2 msec, which is shorter than the reading cycle at the current Ims of the air-fuel ratio sensor of 4 msec.

At step 3207, the LPF selection signal switched at step 2805 of FIG. 28 by the micro computer 11 is turned OFF and a selection signal for returning the filter constant to the one for detection of the high frequency impedance is output to the LPF 17.

In the flow chart shown in FIG. 33, as compared with the flow chart shown in FIG. 9, steps 901, 903, 904 are substantially corresponding to steps 3301, 3303, 3307 of FIG. 33 and the same processing is carried out. Therefore, the description thereof is omitted and only the steps 3304–3306 added to the flow chart of FIG. 9 will be described.

At step 3304, it is determined whether or not the lean determining flag LFLG is set at step 3203 of FIG. 32. If it is determined that LFLG=1, the process proceeds to step 3305 where the lean determining flag LFLG is set to 0 and then the process proceeds to step 3307. If it is determined that LLFLG 0 at step 3304, the process proceeds to step 3306 and then Vm2' is applied to the air-fuel ratio sensor 1 at step 3306. At step 3307, Vm2=0.5 V is applied to the air-fuel ratio sensor 1.

The flow chart shown in FIG. 34 is substantially the same as the flow chart shown in FIG. 10. The steps 1001, 1002 of FIG. 10 correspond to the steps 3401, 3402 of FIG. 34 and the same processing is carried out. Therefore, a description thereof is omitted.

The reason for applying the low frequency pulse in the middle of the application of the high frequency pulse at every 128 msec in the above described embodiment is to equalize a load balance of the CPU. As other embodiment, it is permissible to apply the low frequency pulse after the elapse of, for example, 4 msec so as to detect the low frequency pulse. Further, the detecting processing of the second (low frequency) impedance may be carried out at every 10 processings where the first (high frequency) impedance is detected. Further, the detection processing of the low frequency impedance may be carried out only when the atmosphere of the air-fuel ratio sensor 1 is stabilized during, for example, idling of the engine and the like.

In the above embodiments, the air-fuel ratio detection from the air-fuel ratio sensor 1 is disabled in an interval of 4 msec since the low frequency pulse for detecting the low frequency impedance is applied. This is apparent from the fact that reading of the limit current Itts of the sensor device 2 at step 2807 of FIG. 28 is carried out at every 4 msec as shown in FIG. 2806. In the measurement of the low frequency impedance, it has been confirmed that as a lower frequency pulse near the direct current is applied, more stabilized output can be obtained through experiments. Therefore, the frequency of 500 Hz of the low frequency pulse used in the above embodiment is desired to be changed to, for example, 25 Hz. However, in addition to the cycle 20 msec, the converging time is increased by, for example, 8 msec owing to the electrostatic capacity of the electrode interface of the sensor device 2, such that the output of the air to fuel sensor is used for totally 28 msec for detection of the low frequency impedance. Therefore, this interval must be assumed to be air-fuel ratio detection disable time. In this interval, as the value detected when the low frequency pulse is applied is maintained and used for air-fuel ratio control, the air-fuel ratio is inaccurate. Therefore, there may worsen the exhaust air emission of the engine.

Other embodiment of the present invention concerning the processing for solving this problem, namely, detecting the low frequency impedance of the sensor device 2 by applying, for example, the low frequency pulse at 25 Hz to the sensor device 2 and at the same time, reduce the low frequency impedance detection time of the sensor device 2, in other words, the processing for reducing the air-fuel ratio detection disable time of the air-fuel ratio sensor in the air-fuel ratio control, will be described referring to FIGS. 36–38 and 39–40.

Figure 36A:
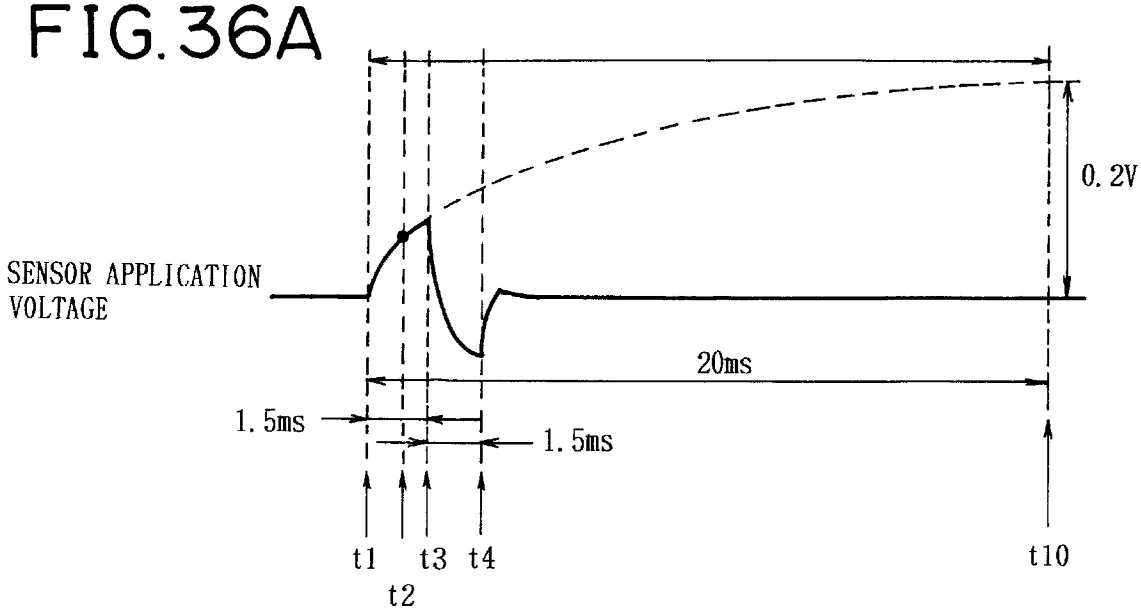
FIG. 36A is diagram showing an application voltage on the sensor device and FIG. 36B is a diagram showing a current in the sensor device.
Figure 36B:
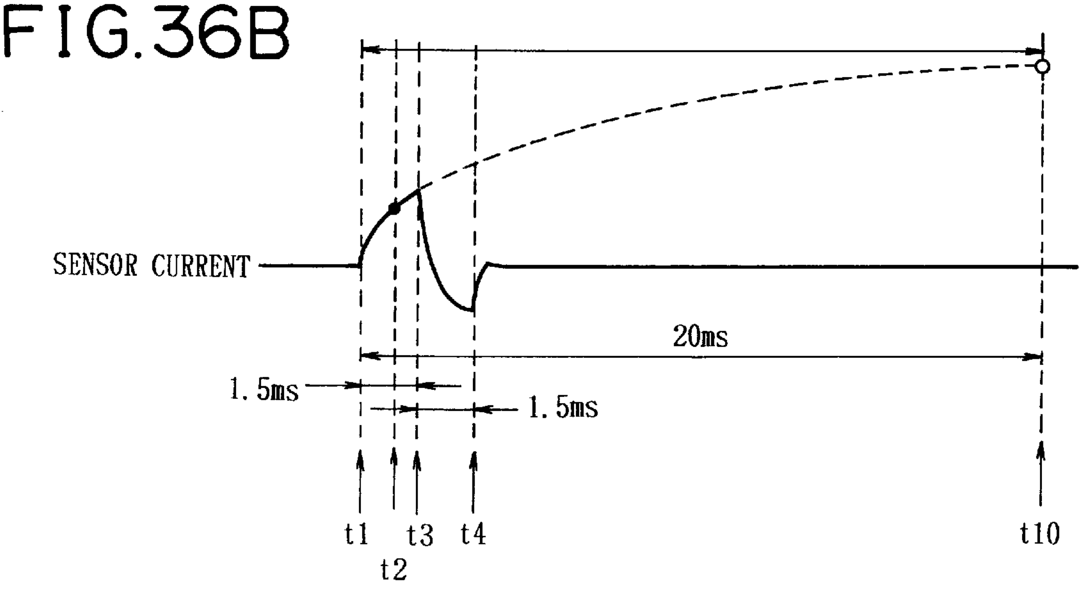

FIG. 36 is a diagram showing an output of the sensor device at the low frequency impedance measurement according to the 1-point detection method, FIG. 36A is a diagram showing an application voltage on the sensor device, and FIG. 36B is a diagram showing a current in the sensor device. As shown in FIG. 36, the positive side low frequency pulse at 25 Hz is applied to the sensor device 2 through the LPF 17 at time t1 and then at time t2 at the elapse of 1 msec after that, a current of the sensor device 2 is detected. At the time t3 at the elapse of 1.5 msec after the time t1, a negative side low frequency pulse is applied to the sensor device 2 through the LPF 17 and at the time t4 at the elapse of 3 msec after the time t1, the application of the negative side low frequency pulse to the LPF 17 is released. The application voltage to the sensor device 2 is converged within about 1 msec after the time t4.

If the negative side low frequency pulse is not applied at the time t3 after the positive side low frequency pulse is applied to the sensor device 2 through the LPF 17 at the time t1, the application voltage of the sensor device 2 is converged to the positive side pulse width at the time t10 at the elapse of 20 msec from the time t1, namely 0.5 V obtained by adding an increment V (0.2 V) to the application voltage 0.3 V at the time t1. The low frequency impedance Zac2 is calculated according to the current value and application voltage of the sensor device 2 measured at the time t2 at step 3208. According to this 1-point detecting method, although the time constant of the low frequency application pulse is large, the detection time for the low frequency impedance of the sensor device 2 can be reduced by releasing the application of the low frequency pulse by the time t4. However, the current value of the sensor device 2 is detected at the time t2 before the time t10 when the low frequency application pulse is converged. As a result, the detection accuracy becomes unstable and the detection accuracy on the low frequency impedance is insufficient. To solve this problem, it has been made apparent that the method for calculating a current value of the sensor device 2 at the time of convergence of the low frequency application pulse is desirable. This 2-point detecting method will be described.

Figure 37A:
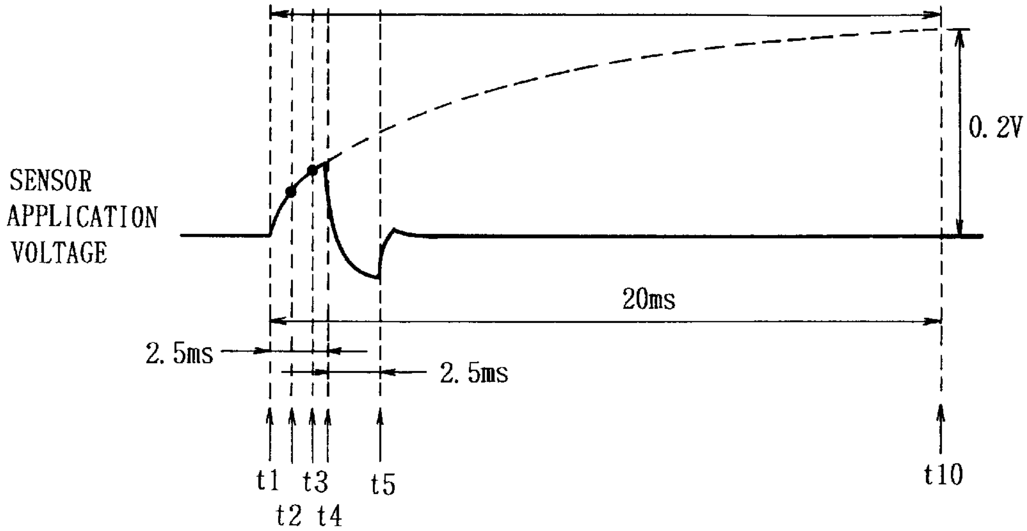
FIG. 37A is a diagram showing an application voltage on the sensor device and FIG. 37B is a diagram showing a current in the sensor device.
Figure 37B:
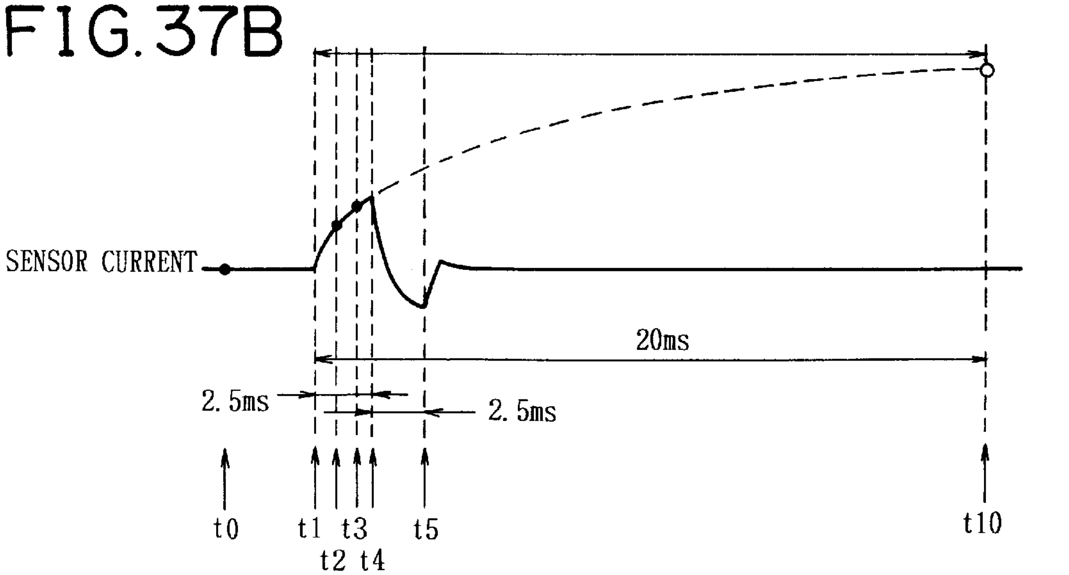
Figure 38:
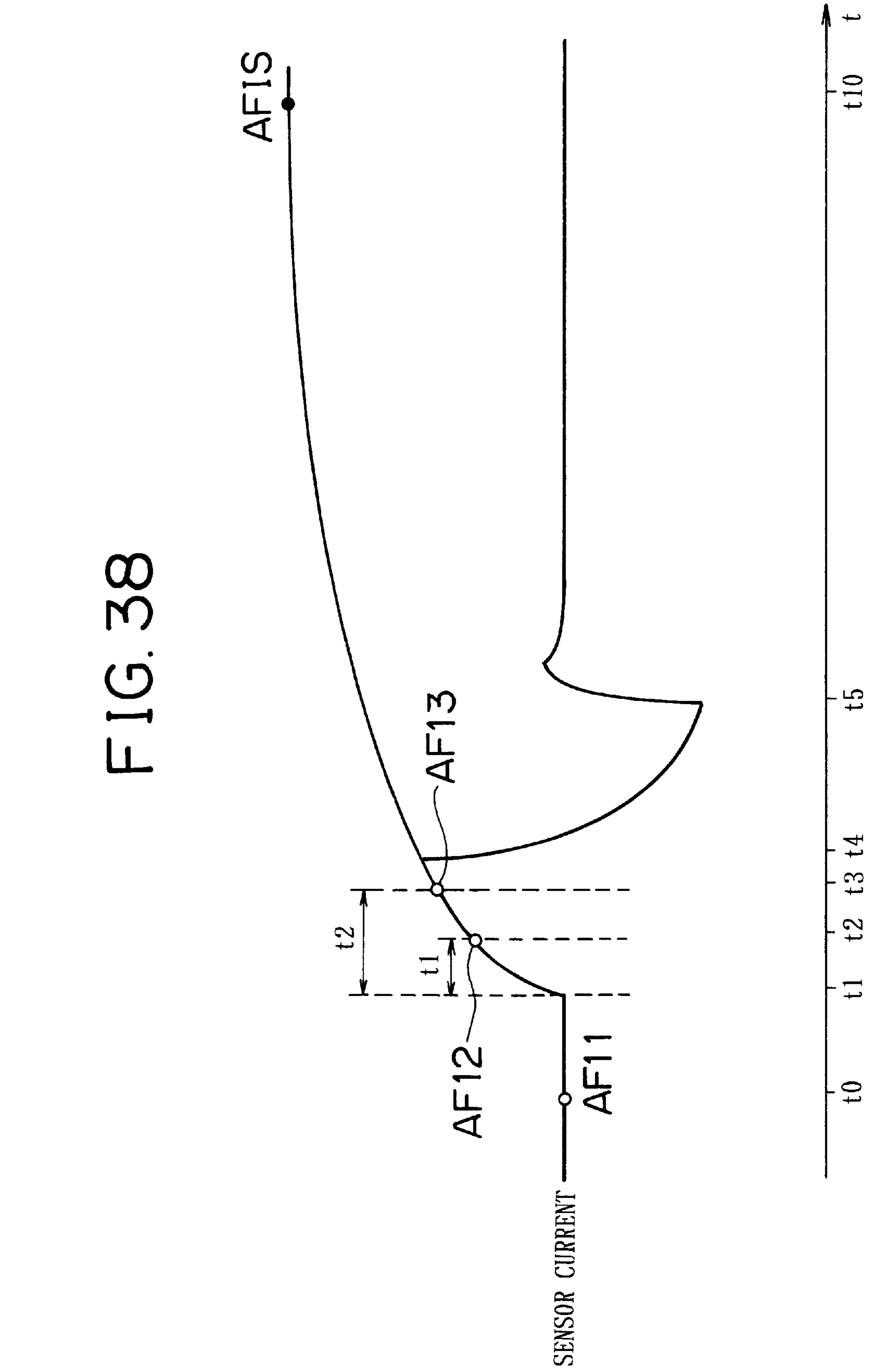
FIG. 38 is an enlarged diagram of FIG. 37B.

FIG. 37 is a diagram showing the output of the sensor device at the low frequency impedance measurement based on the 2-point detecting method. FIG. 37A is a diagram showing an application voltage on the sensor device and FIG. 37B is a diagram showing a current of the sensor device. FIG. 38 is an enlargement diagram of FIG. 37B. As shown in FIGS. 37, 38, prior to the time t1, the current AFI1 of the sensor device 2 is detected at every 4 msec. For example, the current AFI1 of the sensor device 2 is detected at the time t0 and at the time t1, the positive side low frequency pulse at 25 Hz is applied to the sensor device 2 through the LPF17 and then at the times t2, t3 when 1 msec and 2 msec respectively have elapsed, the currents AFI2, AFI3 of the sensor device are detected. At the time t4 when 2.5 msec have elapsed from the time t1, the negative side low frequency pulse is applied to the sensor device 2 through the LPF 17 and at the time t5 when 5 msec have elapsed from the time t1, the negative side low frequency pulse to the LPF 17 is released. The application voltage to the sensor device 2 is converged within about 1 msec after the time t5.

If the negative side low frequency pulse is not applied at the time t4 after the positive side low frequency pulse at 25 Hz is applied to the sensor device 2 through the LPF 17 at the time t1, the application voltage of the sensor device 2 is converged to the positive side low frequency pulse width at the time t10 when 20 msec have elapsed from the time t1, namely 0.5 V obtained by adding an increment V (0.2 V) to the application voltage 0.3 V at the time t1. In this 2-point detecting method, although the time constant of the low frequency application pulse is large, the detection time for the low frequency impedance of the sensor device 2 can be reduced by releasing an application of the low frequency pulse until the time t5. Then, by using the current values AFI1, AFI2, AFI3 of the sensor device 2 detected at the times t0, t2, t3 long before the time t10 when the low frequency application pulse is converged, the current value AFIs of the sensor device 2 which is converged at the time t10 is calculated as follows. A current flowing through the sensor device 2 after the low frequency pulse is applied to the sensor device 2 is expressed in a following formula.

$$i=I0+(Is-I0)e^{(-t/T)}$$

where i is a device current value after the low frequency pulse is applied, 10 is an initial phase current value before the low frequency pulse is applied, Is is a converging current value, t is an elapsed time after the low frequency pulse is applied and T is the time constant CR of the LPF. If the current values AFI1, AFI2, AFI3 of the sensor device 2 are substituted in the above formula, the following simultaneous equations are obtained.

$$AFI2=AFI1+(Is-AFI1)e^{(-t1/T)}$$

$$AFI3=AFI1+(Is-AFI1)e^{(-t2/T)}$$

By solving the above simultaneous equations, the converging current value Is can be obtained. The low frequency impedance Zac2 is calculated according to the current value Is of the sensor device 2 calculated in the above manner at step 3208 of FIG. 32 and the increment V of the application voltage. If this 2-point detecting method is used, the detection accuracy for the low frequency impedance is improved.

Next, a processing for reducing the converging time t1P of the sensor device current after the low frequency pulse is applied will be described with reference to FIGS. 39, 40, 41–44.

Figure 39:
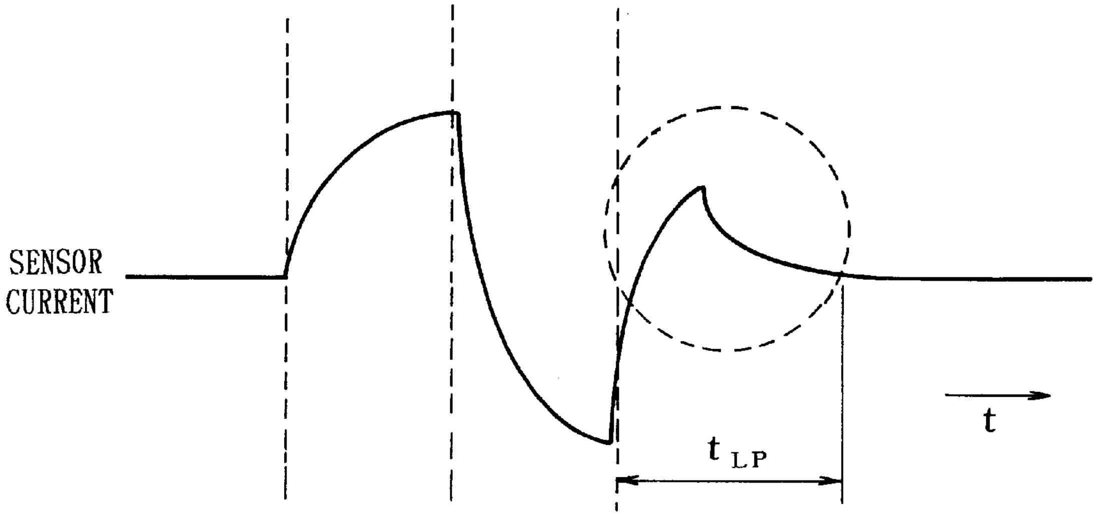
FIG. 39 is a diagram showing a sensor current waveform when a low frequency pulse is applied.
Figure 40:
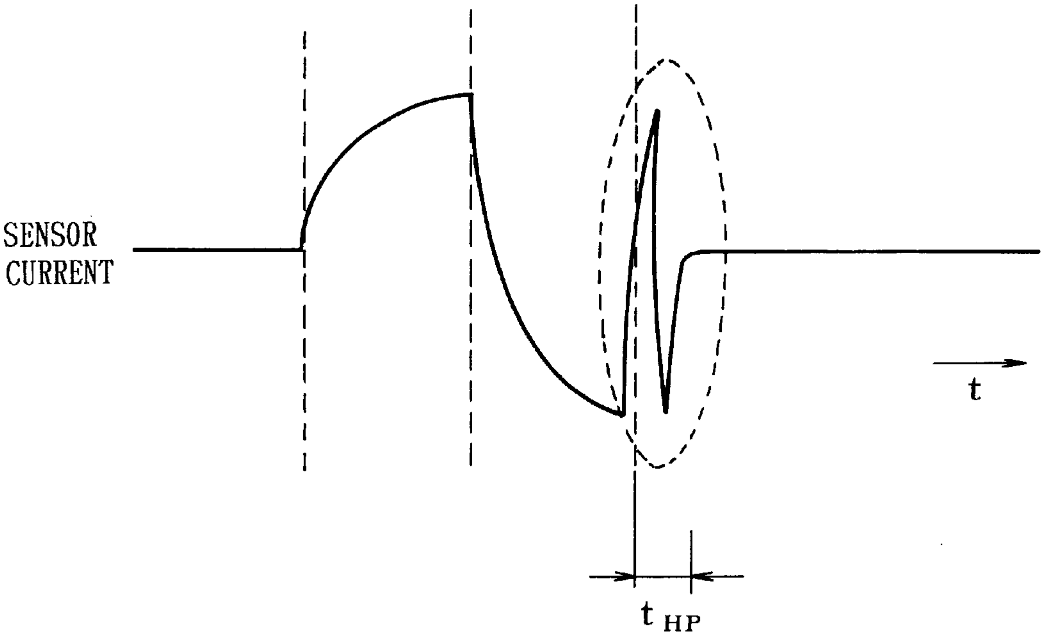
FIG. 40 is a diagram showing a sensor current waveform when a high frequency pulse applied just after the low frequency pulse is applied.

FIG. 39 is a diagram showing a sensor current waveform when the low frequency pulse is applied, FIG. 40 is a diagram showing a sensor current waveform when a high frequency pulse is applied just after the low frequency pulse is applied. As shown in FIG. 40, apparently, the time tHP until the current of the sensor device 2 is converged after the application of the low frequency pulse is switched to the application of the high frequency pulse is shorter than the time tLP until the current of the sensor device 2 is converged after the application of the low frequency pulse is released as shown in FIG. 39. That is, it is evident that by carrying out the first (high) frequency superimposing processing again just after the second (low) frequency superimposing processing is carried out, the converging time tLP of the sensor device current after the application of the low frequency pulse can be reduced. Next, this processing will be explained.

Figure 41:
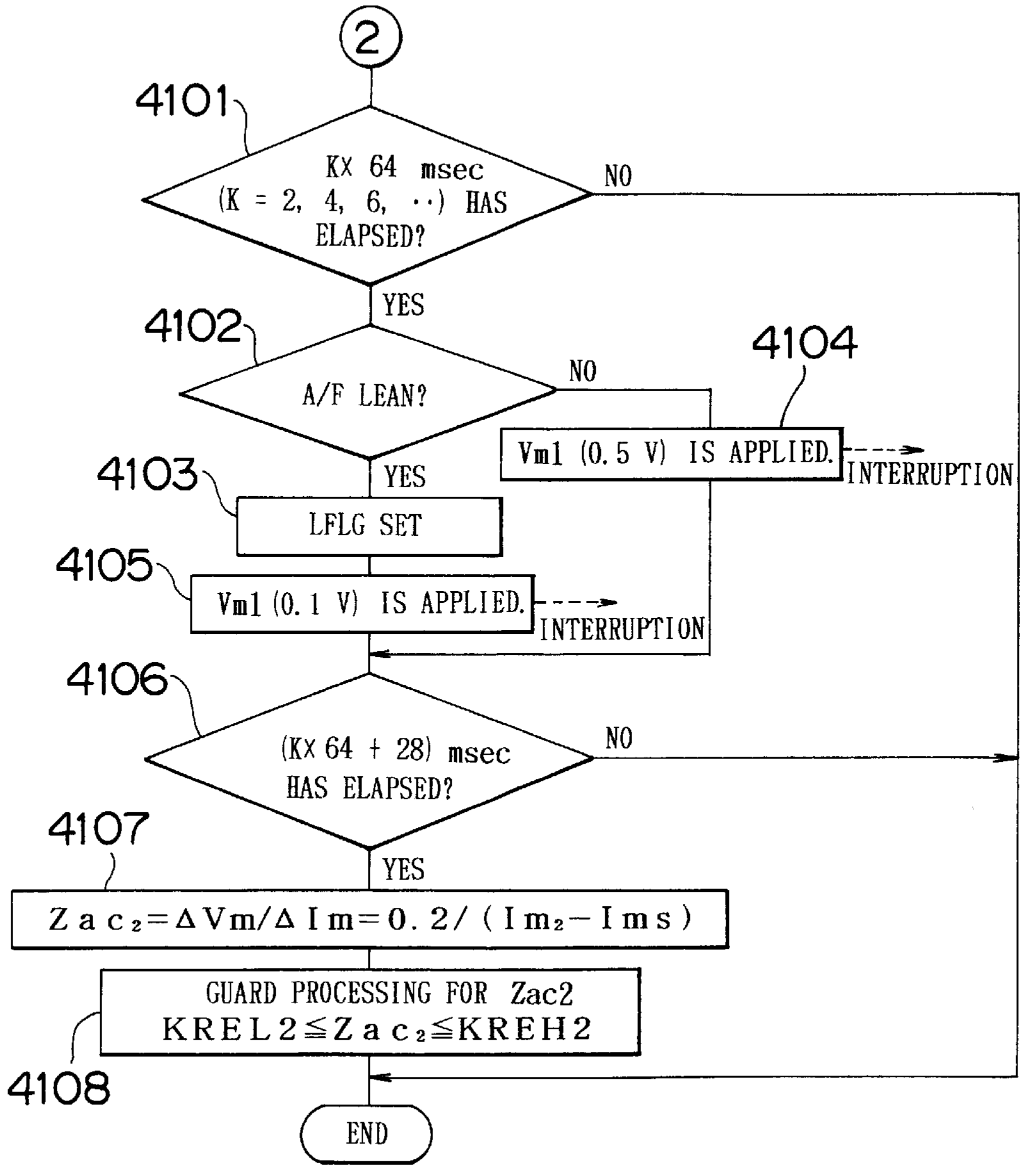
FIG. 41 is a flow chart representing the second frequency superimposing processing in the impedance calculation routine for the sensor device required for executing the first frequency superimposing processing again just after the second frequency superimposing processing is executed.

FIG. 41 is a flow chart of the second frequency superimposing processing in the impedance calculation routine for the sensor device necessary for executing the first frequency superimposing processing again just after the second frequency superimposing processing is executed. A flow chart of FIG. 41 is the flow chart of FIG. 32 excluding step 3207. The steps 4101, 4106, 4107, 4108 of FIG. 41 correspond to the steps 3201–3206, 3208, 3209 of FIG. 32 and the same processing is carried out. Therefore, the description thereof is omitted.

Figure 42:
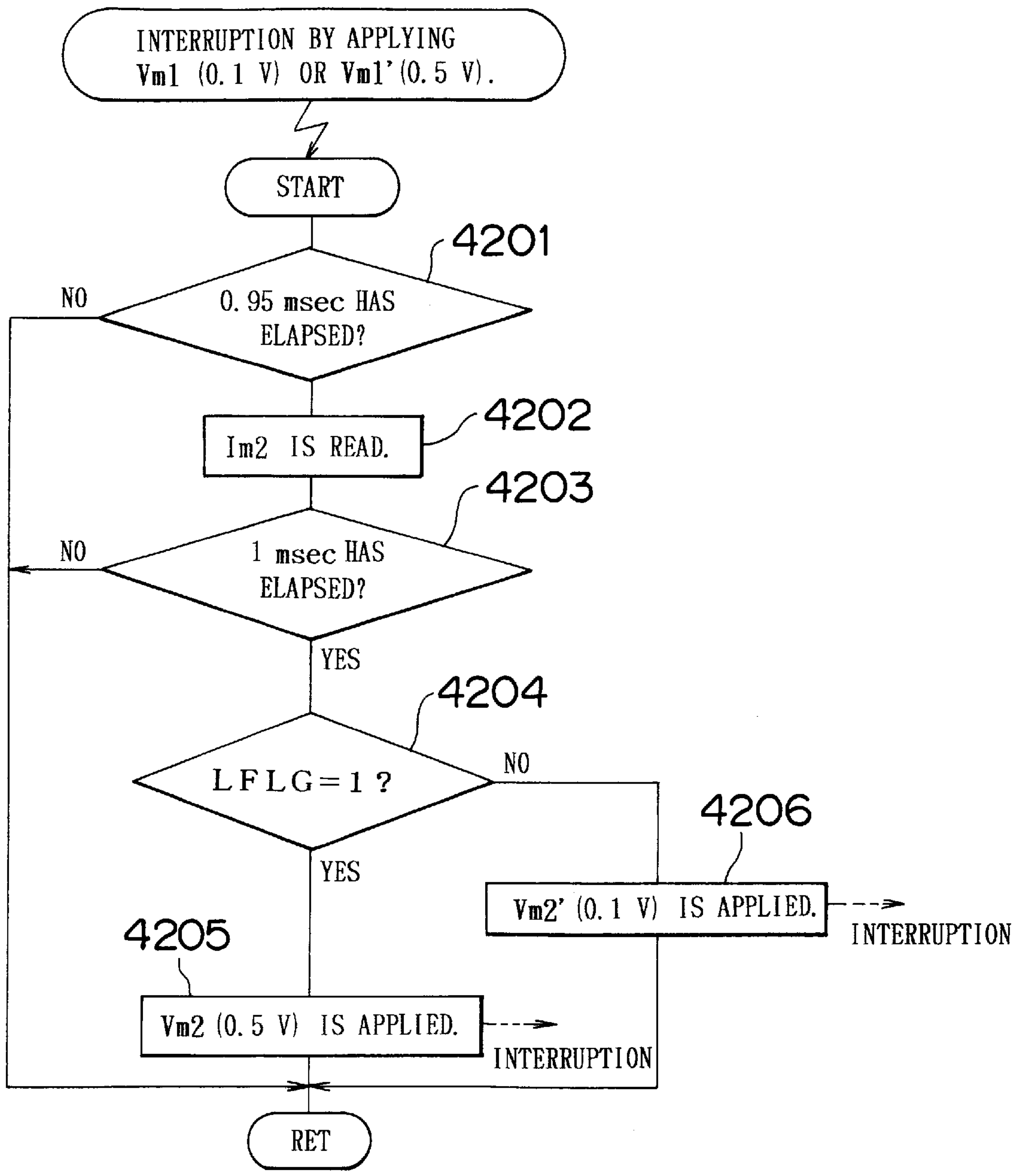
FIG. 42 is a flow chart of the third interruption processing routine required for executing the first frequency superimposing processing again just after the second frequency superimposing processing is executed.

FIG. 42 is a flow chart of the third interruption processing routine necessary for executing the first frequency superimposing processing again just after the second frequency superimposing processing is executed. A flow chart shown in FIG. 42 is the flow chart of FIG. 33 excluding the step 3205. The steps 4201–42, 4205, 4206 of FIG. 42 correspond to the steps 3301–3304, 3307, 3306 of FIG. 33 and the same processing is carried out. Therefore, the description thereof is omitted.

Figure 43:
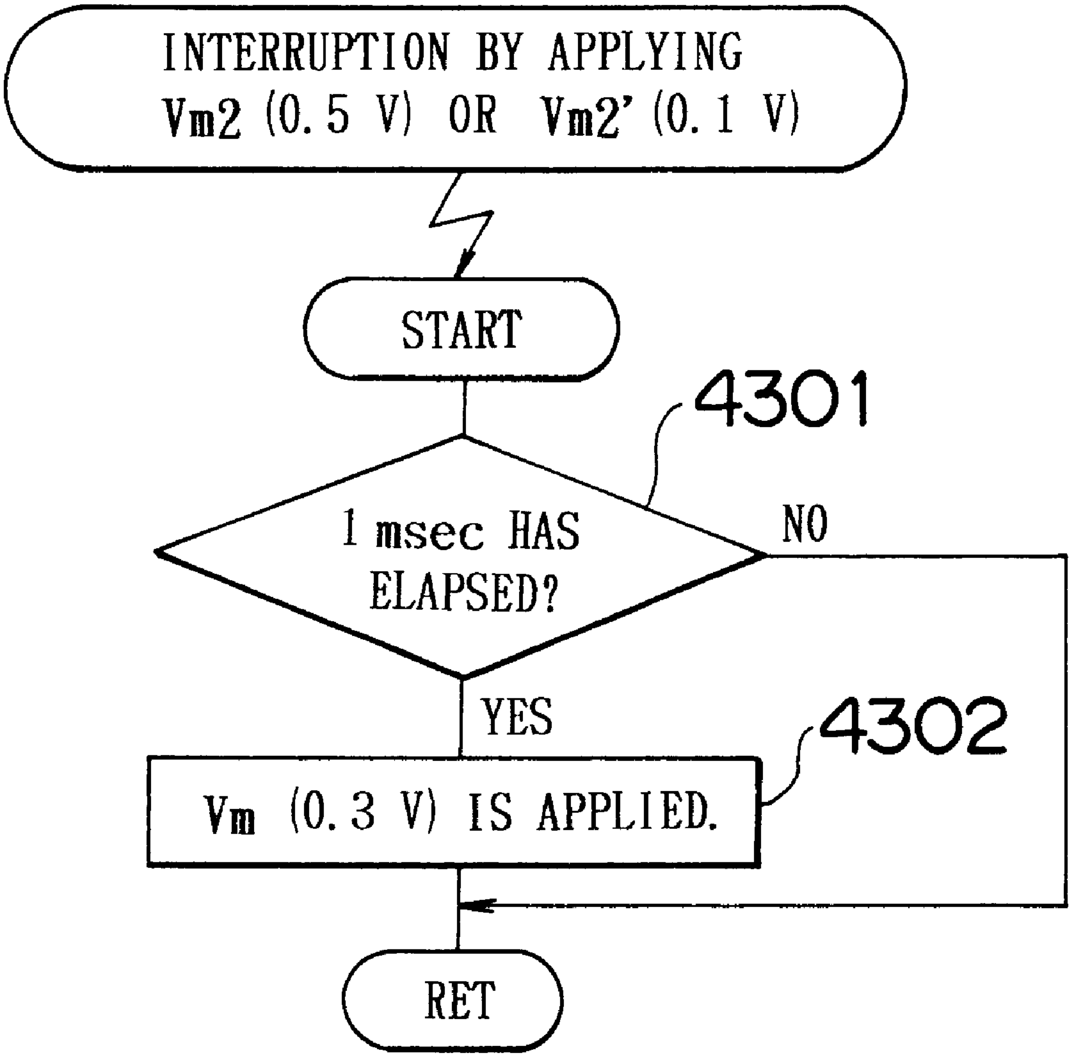
FIG. 43 is a flow chart showing the fourth interruption processing routine required for executing the first frequency superimposing processing again just after the second frequency superimposing processing is executed.

FIG. 43 is a flow chart of the fourth interruption processing routine necessary for executing the first frequency superimposing processing just after the second frequency superimposing processing is executed. The steps 4301, 4302 of FIG. 43 correspond to the steps 3401, 4302 of FIG. 34 and the same processing is carried out. Therefore, the description thereof is omitted.

Figure 44:
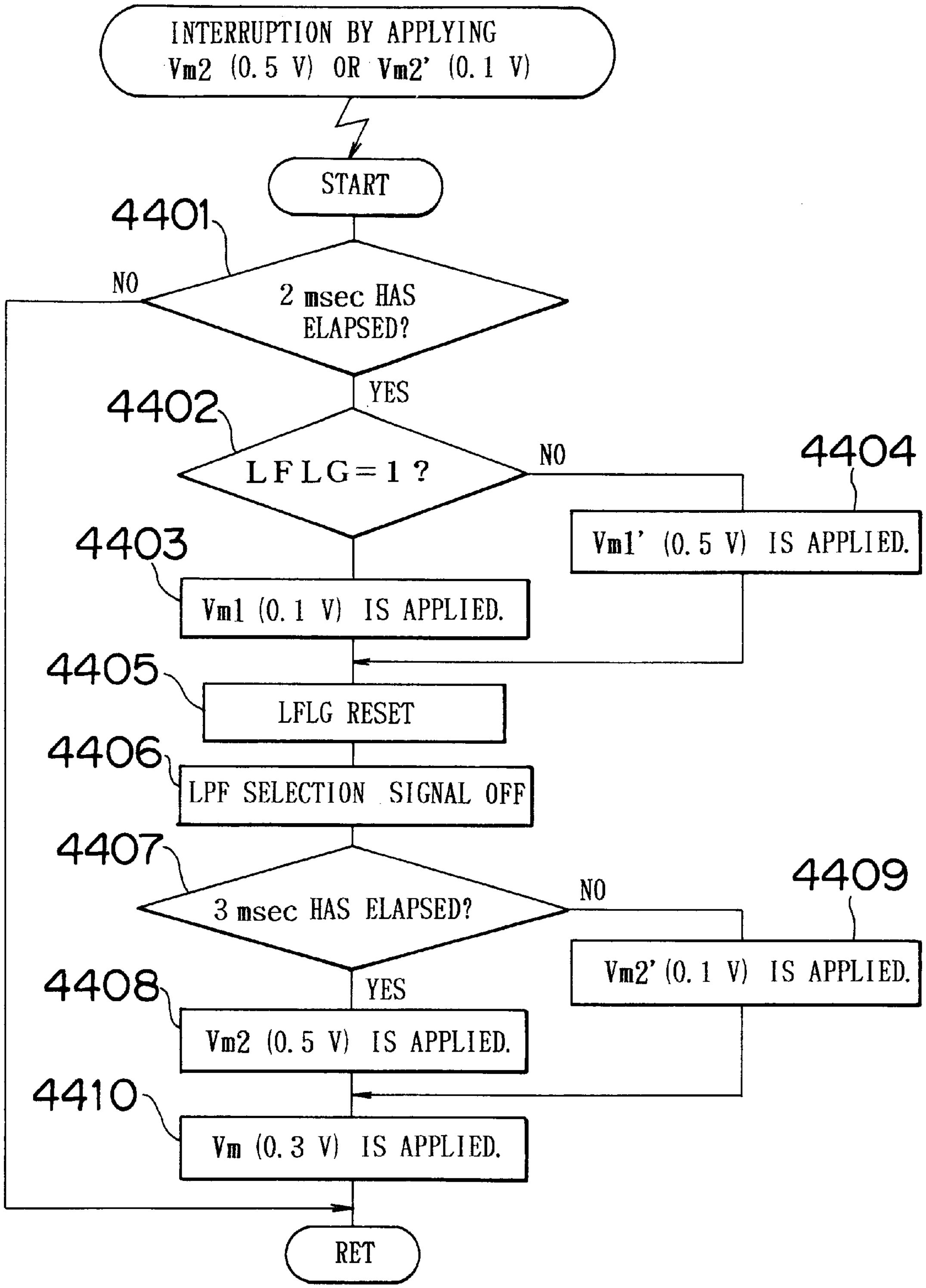
FIG. 44 is a flow chart representing the fifth interruption processing routine required for executing the first frequency superimposing processing again just after the second frequency superimposing processing is executed.

FIG. 44 is a flow chart of the fifth interruption processing necessary for executing the first frequency superimposing processing just after the second frequency superimposing processing is carried out. At first, it is determined whether or not 2 msec have elapsed from the fourth timer interruption is started at step 4401 and if YES, the process proceeds to step 4402. If NO, the process is returned to step 4401.

At step 4402, it is determined whether or not the lean determining flag LFLG is set at step 4103 of FIG. 41. If it is determined that LFLG=1, the process proceeds to step 4403 where Vm1=0.1 V is applied to the air-fuel ratio sensor 1 at step 4403. If it is determined that LFLG=0 at step 4402, the process proceeds to step 4404 where Vm1'=0.5 V is applied to the air-fuel ratio sensor 1 at step 4404.

Next, at step 4405, the lean determining flag LFLG is reset to 0 and at step 4406, the LPF selection signal is turned OFF and the process proceeds to step 4407. At step 4407, it is determined whether or not 3 msec have elapsed from the fourth timer interruption is started. If YES, the process proceeds to step 4408 where a voltage of Vm2=0.5 V is applied to the air-fuel ratio sensor. If NO, the process proceeds to step 4409,where a voltage of Vm2'=0.1 V is applied to the air-fuel ratio sensor. Then, the process proceeds to step 4410. At step 4410, a voltage of Vm=0.3 V is applied to the air-fuel ratio sensor to return to normal air to fuel detecting state.

Figure 45:
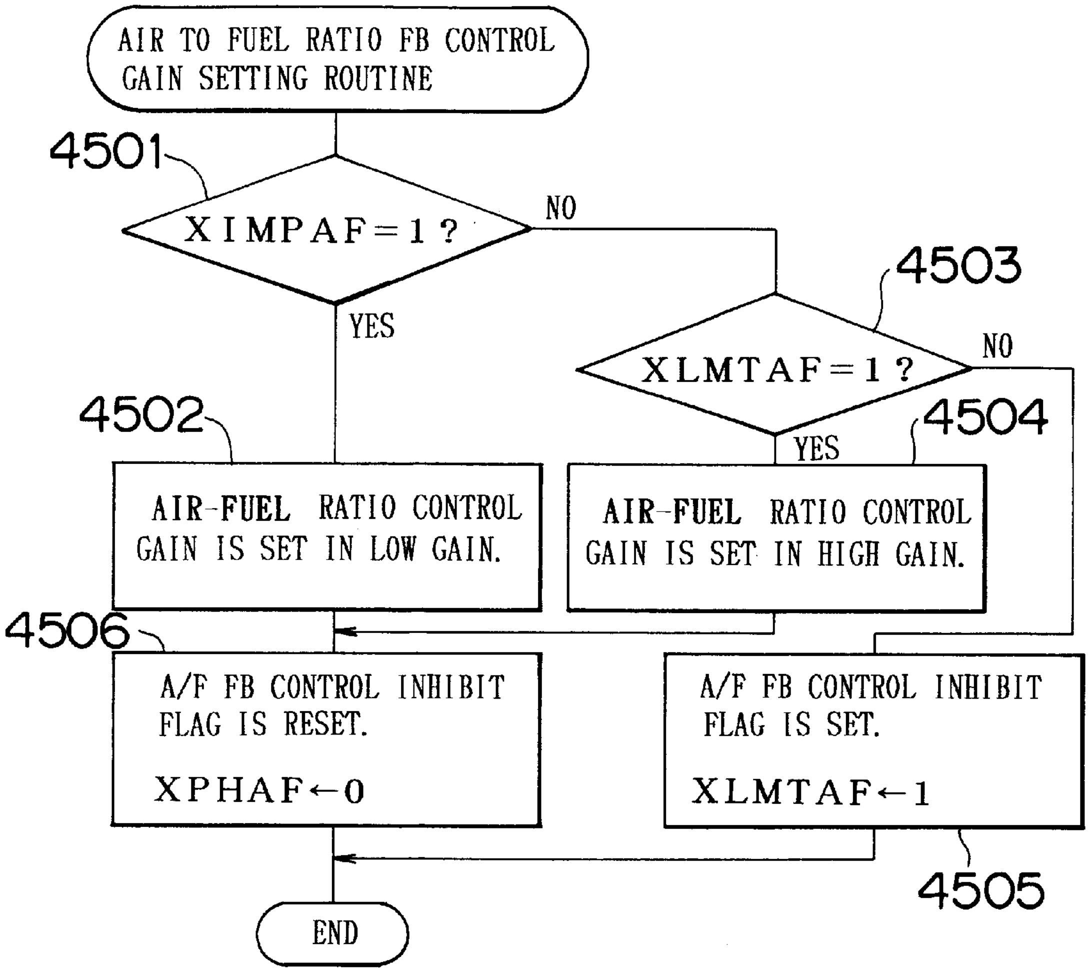
FIG. 45 is a flow chart representing the setting routine for the air-fuel ratio feedback control gain.

A flow chart of the air-fuel ratio feedback control gain setting routine shown in FIG. 45 will be described. In this routine, as the output response of the air-fuel ratio sensor 1 is delayed when the sensor device 2 is at a low temperature, when the air-fuel ratio feedback control is carried out based on the low frequency impedance (when YES at step 4501), each gain of the proportional term P, integral term I and differential term D in the air-fuel ratio feedback control is set to LOW gain at step 4502. If the flag XLMTAF indicating that the air-fuel ratio feedback control is being executed based on the limit current after the sensor device is activated is set (when NO at step 4501 and YES at step 4503), each gain of the above PID is set to HIGH at step 4504. The XIMPAF indicated at step 4501 is a flag to be set when the air-fuel ratio is calculated from the low frequency impedance Zac2 of the sensor device 2. If NO at step 4501 and NO at step 4503, the sensor device temperature is less than 500° C., which cannot detect the air-fuel ratio. Thus, the air-fuel ratio feedback control inhibit flag XPHAF is set to 1 at step 4505. After the air-fuel ratio control gain is set to LOW and HIGH at step 4502 and step 4504, the air-fuel ratio feedback control inhibit flag XPHAF is reset to 0 at step 4506.

Next, the impedance calculation routine according to the third embodiment, in which the calculation of the low frequency impedance is restricted to a predetermined condition like idling time in order to minimize the air-fuel ratio control disable time concerning the low frequency impedance calculation processing to reduce the load on the CPU will be described with reference to FIGS. 46, 47.

Figure 46:
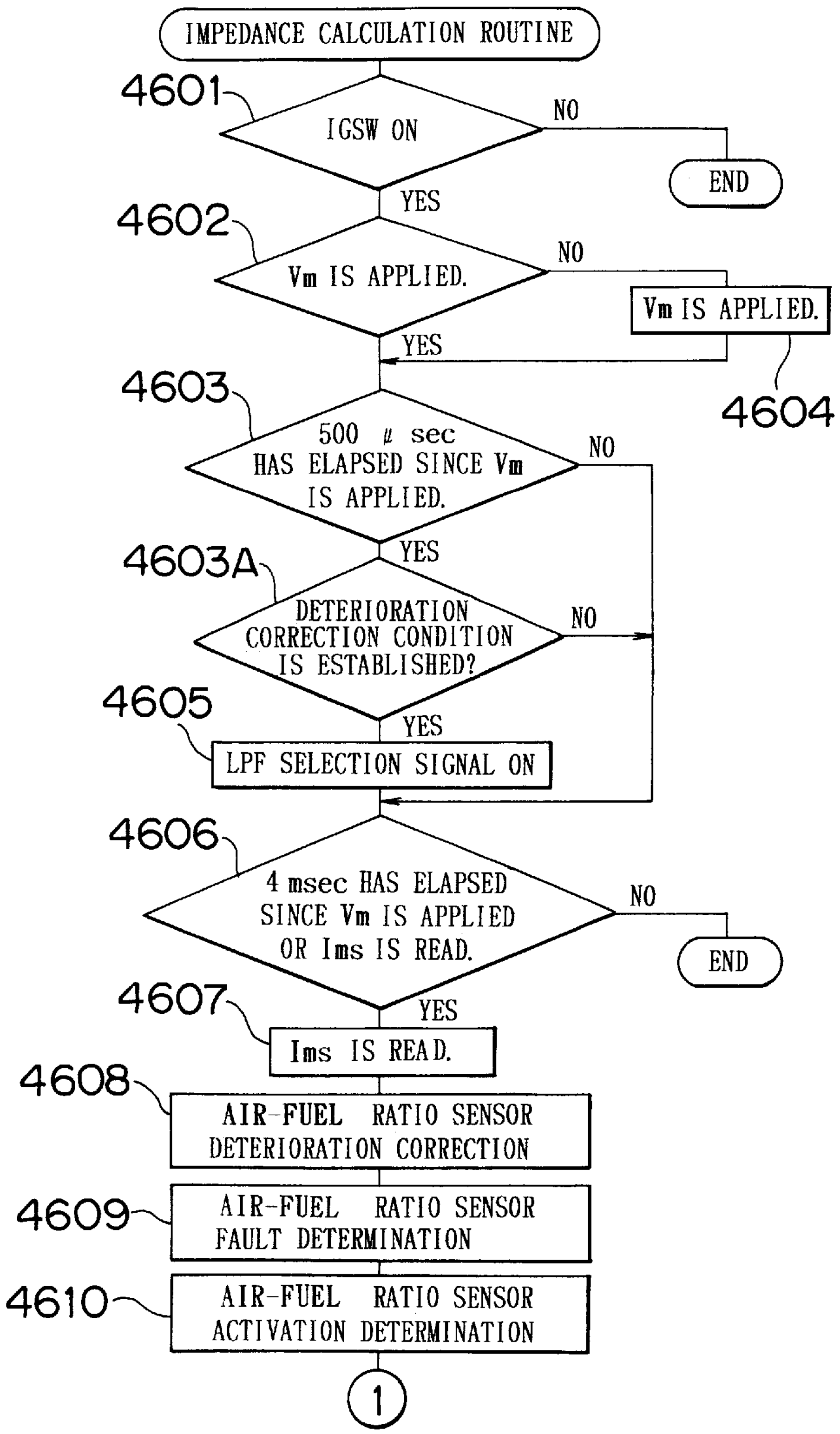
FIG. 46 is a flow chart representing a first half of the impedance calculating routine for the sensor device according to the third embodiment of the present invention.

FIG. 46 is a flow chart of the impedance calculation routine as a former half thereof for the sensor device according to the third embodiment of the present invention. In the step No. of FIG. 46, the upper two digits 28 of the step number of FIG. 28 are replaced with 46 and only the step 4603A of FIG. 46 is inserted between the steps 2803 and 2805 of FIG. 28. The step 4603A is carried out for determining whether or not calculation of the low frequency impedance is executed. Here, that determination is done depending on whether or not the deterioration correction condition of the sensor device 2 has been established. The deterioration correction condition is determined depending on whether or not all the conditions below 1–5 that the engine is warmed up and a change of the exhaust air velocity is reduced are satisfied. If YES, the process proceeds to step 4605 and if NO, the process proceeds to step 4606.

1. Rotation speed of engine NE<1000 RPM
2. Vehicle speed VS<3 Km/h
3. Idle switch ON
4. Air-fuel ratio A/F is near 14.5 during execution of air-fuel ratio feedback control.
5. Engine cooling water temperature THW>85° C. (engine warm-up condition)

The first (high) frequency impedance calculation routine subsequent to step 4601 is carried out according to FIGS. 29–31.

Figure 47:
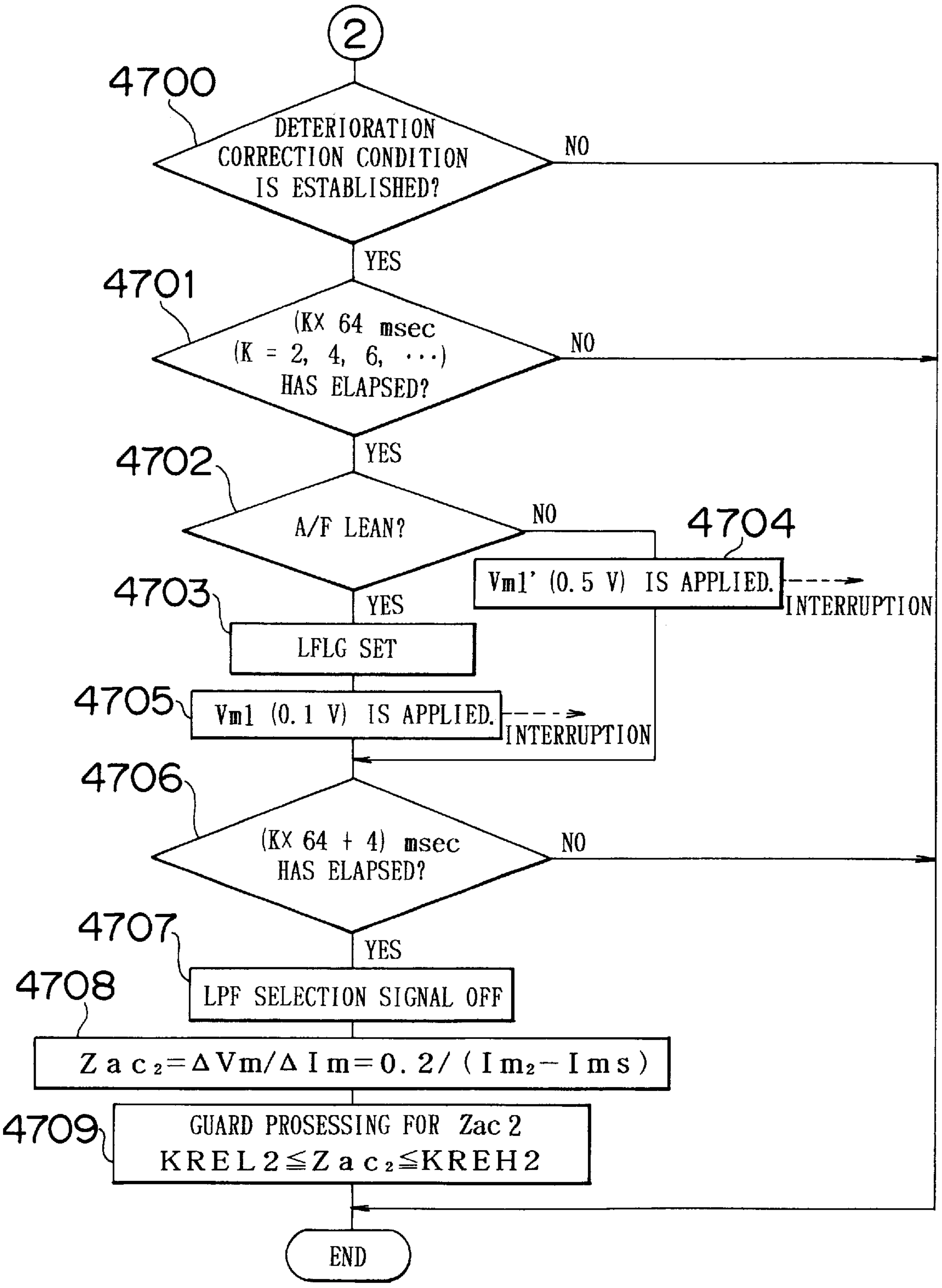
FIG. 47 is a flow chart representing the second frequency superimposing processing in the impedance calculation routine for the sensor device according to the third embodiment of the present invention.

FIG. 47 shows a flow chart of the second (low) frequency superimposing processing in the impedance calculation routine for the sensor device according to the third embodiment of the present invention. In the step number of FIG. 47, the upper two digits 32 of the step number of FIG. 32 are replaced with 47 and only the step 4700 of FIG. 47 is inserted before NO at step 3201 of FIG. 32 and step 2901 of FIG. 29. The step 4700 is a step for determining whether or not calculation of the low frequency impedance is carried out and that determination is done depending on whether or not the deterioration correction condition of the sensor device 2 has been established like step 4603A shown in FIG. 46. At step 4700, whether or not all the deterioration correction conditions have been established is determined. If the determination result is YES, the processing proceeds to step 4701 and if the determination result is NO, this routine is terminated.

The invention claimed is:

1. A control device for an air-fuel ratio sensor based on a current from an oxygen concentration detecting device, the current corresponding to a concentration of oxygen in a gas when a voltage is applied to the oxygen concentration detecting device, the air-fuel ratio sensor control device comprising:

means for detecting an alternating impedance of the oxygen concentration detecting device corresponding to each of a plurality of frequencies applied to the oxygen concentration detecting device, the impedance detecting means applying to the oxygen concentration detecting device alternating voltages of two different frequencies selected from the plurality of frequencies; and means for analyzing the detected alternating impedance corresponding to the to a plurality of frequencies to calculate a parameter indicating a change over time of a characteristic of the oxygen concentration detecting device, wherein the parameter calculating means calculates the parameter based on a difference between the alternating impedance of the oxygen concentration detecting device corresponding to two different frequencies selected from the plurality of frequencies.

2. A control device for an air-fuel ratio sensor based on a current from an oxygen concentration detecting device, the current corresponding to a concentration of oxygen in a gas when a voltage is applied to the oxygen concentration detecting device, the air-fuel ratio sensor control device comprising:

means for detecting an alternating impedance of the oxygen concentration detecting device corresponding to each of a plurality of frequencies applied to the oxygen concentration detecting device, the impedance detecting means applying to the oxygen concentration detecting device alternating voltages of two different frequencies selected from the plurality of frequencies; and means for analyzing the detected alternating impedance corresponding to the to a plurality of frequencies to calculate a parameter indicating a change over time of a characteristic of the oxygen concentration detecting device, wherein a first one of the two frequencies is selected from a frequency band in which a resistance of an electrolytic quality of the oxygen concentration detecting device is detected and a second one of the two frequencies is selected from a frequency band in which an impedance including an electrode interface resistance of the oxygen concentration detecting device is detected.

3. A control device for an air-fuel ratio sensor based on a current from an oxygen concentration detecting device, the current corresponding to a concentration of oxygen in a gas when a voltage is applied to the oxygen concentration detecting device, the air-fuel ratio sensor control device comprising:

means for detecting an alternating impedance of the oxygen concentration detecting device corresponding to each of a plurality of frequencies applied to the oxygen concentration detecting device, the impedance detecting means applying the alternating voltages through a filter having a variable filter constant; and means for analyzing the detected alternating impedance corresponding to the to a plurality of frequencies to calculate a parameter indicating a change over time of a characteristic of the oxygen concentration detecting device, wherein, during an interval from the application of a voltage of a predetermined frequency to the oxygen concentration detecting device until that application is terminated and a current value detected from the oxygen concentration detecting device is converged, the impedance detecting means sets a filter constant of the filter based on the frequency.

4. A control device for an air-fuel ratio sensor based on a current from an oxygen concentration detecting device, the current corresponding to a concentration of oxygen in a gas when a voltage is applied to the oxygen concentration detecting device, the air-fuel ratio sensor control device comprising:

means for detecting an alternating impedance of the oxygen concentration detecting device corresponding to each of a plurality of frequencies applied to the oxygen concentration detecting device, the impedance detecting means applying the plurality of frequencies to the oxygen concentration detecting device in a predetermined order; and means for analyzing the detected alternating impedance corresponding to the to a plurality of frequencies to calculate a parameter indicating a change over time of a characteristic of the oxygen concentration detecting device, wherein during an interval from the application of an alternating voltage of a predetermined frequency to the oxygen concentration detecting device until that application is terminated and a current value detected from the oxygen concentration detecting device is converged, the impedance detecting means inhibits switching to an alternating voltage of a frequency different from the predetermined frequency.

5. A control device for an air-fuel ratio sensor based on a current from an oxygen concentration detecting device, the current corresponding to a concentration of oxygen in a gas when a voltage is applied to the oxygen concentration detecting device, the air-fuel ratio sensor control device comprising:

means for detecting an alternating impedance of the oxygen concentration detecting device corresponding to each of a plurality of frequencies applied to the oxygen concentration detecting device; and means for analyzing the detected alternating impedance corresponding to the to a plurality of frequencies to calculate a parameter indicating a change over time of a characteristic of the oxygen concentration detecting device, wherein during an interval from the application of an alternating voltage of a predetermined frequency to the oxygen concentration detecting device until that application is terminated and a current value detected from the oxygen concentration detecting device is converged, the impedance detecting means inhibits calculation of the air-fuel ratio of the gas.

6. A control device for an air-fuel ratio sensor based on a current from an oxygen concentration detecting device, the current corresponding to a concentration of oxygen in a gas when a voltage is applied to the oxygen concentration detecting device, the air-fuel ratio sensor control device comprising:

means for detecting an alternating impedance of the oxygen concentration detecting device corresponding to each of a plurality of frequencies applied to the oxygen concentration detecting device;

means for analyzing the detected alternating impedance corresponding to the to a plurality of frequencies to calculate a parameter indicating a change over time of a characteristic of the oxygen concentration detecting device; and means for calculating an air-fuel ratio of the gas based on the current and the parameter, wherein the air-fuel ratio calculating means calculates an air-fuel ratio based on a value of the alternating impedance of the oxygen concentration detecting device corresponding to a highest frequency of the plurality of frequencies.

7. A control device for an air-fuel ratio sensor based on a current from an oxygen concentration detecting device, the current corresponding to a concentration of oxygen in a gas when a voltage is applied to the oxygen concentration detecting device, the air-fuel ratio sensor control device comprising:

means for detecting an alternating impedance of the oxygen concentration detecting device corresponding to each of a plurality of frequencies applied to the oxygen concentration detecting device;

means for analyzing the detected alternating impedance corresponding to the to a plurality of frequencies to calculate a parameter indicating a change over time of a characteristic of the oxygen concentration detecting device; and means for determining whether the oxygen concentration detecting device is activated depending on the parameter, wherein the activation determining means determines whether the oxygen concentration detecting means is activated based on an alternating impedance of the oxygen concentration detecting device corresponding to the highest frequency.

8. A control device for an air-fuel ratio sensor based on a current from an oxygen concentration detecting device, the current corresponding to a concentration of oxygen in a gas when a voltage is applied to the oxygen concentration detecting device the air-fuel ratio sensor control device comprising:

means for detecting an alternating impedance of the oxygen concentration detecting device corresponding to each of a plurality of frequencies applied to the oxygen concentration detecting device; and means for analyzing the detected alternating impedance corresponding to the to a plurality of frequencies to calculate a parameter indicating a change over time of a characteristic of the oxygen concentration detecting device, wherein the impedance detecting means, when applying an alternating voltage of a predetermined frequency to the oxygen concentration detecting device by a single cycle, switches to a second half cycle during a first half cycle of the alternating voltage, releases the application of the alternating voltage during the second half cycle, and measures a voltage applied to the oxygen concentration detecting device in the first half cycle and a current flowing in the oxygen concentration detecting device so as to calculate the alternating impedance.

9. A control device for an air-fuel ratio sensor based on a current from an oxygen concentration detecting device, the current corresponding to a concentration of oxygen in a gas when a voltage is applied to the oxygen concentration detecting device, the air-fuel ratio sensor control device comprising:

means for detecting an alternating impedance of the oxygen concentration detecting device corresponding to each of a plurality of frequencies applied to the oxygen concentration detecting device; and means for analyzing the detected alternating impedance corresponding to the to a plurality of frequencies to calculate a parameter indicating a change over time of a characteristic of the oxygen concentration detecting device, wherein the impedance detecting means, when applying an alternating voltage of a predetermined frequency to the oxygen concentration detecting device by a single cycle, switches to a second half cycle during a first half cycle of the alternating voltage, releases the application of thealternating voltage during the second half cycle, and measures a current flowing in the oxygen concentration detecting device in the first half cycle at least twice so as to calculate a converging current value of the oxygen concentration detecting device caused by the application of the alternating voltage to calculate an alternating impedance from the alternating voltage and converging current value.

10. A control device for an air-fuel ratio sensor based on a current from an oxygen concentration detecting device, the current corresponding to a concentration of oxygen in a gas when a voltage is applied to the oxygen concentration detecting device, the air-fuel ratio sensor control device comprising:

means for detecting an alternating impedance of the oxygen concentration detecting device corresponding to each of a plurality of frequencies applied to the oxygen concentration detecting device; and means for analyzing the detected alternating impedance corresponding to the to a plurality of frequencies to calculate a parameter indicating a change over time of a characteristic of the oxygen concentration detecting device, wherein immediately after the application of a low frequency alternating voltage to the oxygen concentration detecting device by a single cycle, the impedance detecting means applies an alternating voltage of a single cycle having a frequency higher than the low frequency.

* * * * *